(12) United States Patent
Suryadi

(10) Patent No.: US 12,493,600 B1
(45) Date of Patent: Dec. 9, 2025

(54) REARRANGING NODES FOR CONJOINED TREE DATA STRUCTURE

(71) Applicant: Workday, Inc., Pleasanton, CA (US)

(72) Inventor: Edward Suryadi, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/676,086

(22) Filed: May 28, 2024

(51) Int. Cl.
| | | |
|---|---|---|
| *G06F 16/22* | (2019.01) | |
| *G06F 16/23* | (2019.01) | |
| *G06F 16/2455* | (2019.01) | |

(52) U.S. Cl.
CPC ...... *G06F 16/2264* (2019.01); *G06F 16/2246* (2019.01); *G06F 16/2358* (2019.01); *G06F 16/24556* (2019.01); *G06F 16/24561* (2019.01)

(58) Field of Classification Search
CPC ............ G06F 16/2264; G06F 16/2246; G06F 16/24556; G06F 16/24561; G06F 16/2358
USPC ........................................................ 707/741
See application file for complete search history.

(56) References Cited

U.S. PATENT DOCUMENTS

| | | |
|---|---|---|
| 5,884,320 A | 3/1999 | Agrawal |
| 6,122,443 A | 9/2000 | Nishikawa |
| 8,316,060 B1 | 11/2012 | Snyder, II |
| 10,061,862 B2 | 8/2018 | Pogmore |
| 10,331,753 B1 | 6/2019 | Zhang |
| 11,080,336 B2 | 8/2021 | Van Dusen |
| 2002/0085002 A1 | 7/2002 | Lamping |
| 2004/0064475 A1 | 4/2004 | Maeda |
| 2009/0019067 A1 | 1/2009 | Furusho |
| 2009/0234802 A1* | 9/2009 | Shinjo .................. G06F 16/322 |
| 2010/0169307 A1 | 7/2010 | Chen |
| 2011/0238694 A1 | 9/2011 | Carlsson |
| 2012/0020223 A1 | 1/2012 | Sonnier |
| 2014/0136498 A1* | 5/2014 | Finis .................. G06F 16/2329 |
| | | 707/695 |
| 2016/0154860 A1 | 6/2016 | Bender |
| 2017/0213127 A1 | 7/2017 | Duncan |
| 2017/0235848 A1 | 8/2017 | Van Dusen |
| 2018/0218407 A1 | 8/2018 | He |
| 2018/0329958 A1 | 11/2018 | Choudhury |
| 2020/0320130 A1 | 10/2020 | Korpman |
| 2021/0117428 A1 | 4/2021 | Dalgliesh |

(Continued)

OTHER PUBLICATIONS

Author Unknown, "Breadth-first search", Wikipedia article retrieved from <https://en.wikipedia.org/wiki/Breadth-first_search> on May 22, 2024.

(Continued)

*Primary Examiner* — Giovanna B Colan
(74) *Attorney, Agent, or Firm* — Cooper Legal Group, LLC

(57) ABSTRACT

A system, method, and device for managing updates to a hypercube is provided. The method includes (i) obtaining a tree data structure to represent the data, (ii) receiving a request to rearrange data stored in the N-conjoined tree data structure, (iii) enforcing a first rule that requires each leaf node to have an associated linkage to each tree in the N-conjoined tree data structure while rearranging the N-conjoined tree data structure in accordance with the request, and (iv) providing a rearranged N-conjoined tree data structure. The tree data structure is an N-conjoined tree data structure, and N is a positive integer.

19 Claims, 36 Drawing Sheets

(56) References Cited

U.S. PATENT DOCUMENTS

| | | |
|---|---|---|
| 2021/0209309 A1 | 7/2021 | Tian |
| 2021/0311640 A1 | 10/2021 | Elad |
| 2023/0075116 A1 | 3/2023 | Minaudo |
| 2023/0317284 A1 | 10/2023 | Pronk |
| 2024/0144543 A1 | 5/2024 | Ramasubramonian |
| 2024/0281439 A1 | 8/2024 | Arnold |
| 2024/0378243 A1 | 11/2024 | Nhan |

OTHER PUBLICATIONS

Author Unknown, "Linked list", Wikipedia article retrieved from <https://en.wikipedia.org/wiki/Linked_list> on May 22, 2024.

\* cited by examiner

1400

1425

1475

1700

REARRANGING NODES FOR CONJOINED TREE DATA STRUCTURE

BACKGROUND OF THE INVENTION

Query evaluation systems, which capture and model future outcomes, are typically built based on multi-dimensional databases, usually called hypercubes, to facilitate analysis. Data in a hypercube is associated with a coordinate tuple, having a value in each of a set of defined dimensions. Dimensions used in planning are usually hierarchical in nature. Dimensions can have attributes which are also often hierarchical. Parent elements represent the rollup, or aggregation, of all of the elements "beneath" them in the hierarchy. Some of these hierarchies can be quite high and/or wide (a single parent may represent a rollup of thousands or even millions of children). Query evaluation systems have long had challenges dealing with large and complex models, especially when the amount of data in hypercubes is increasing.

Systems are generally constrained with respect to storing data obtained in connection with evaluating planning models, such as for analysis across a plurality of forecasts generated by the planning models.

BRIEF DESCRIPTION OF THE DRA WINGS

Various embodiments of the invention are disclosed in the following detailed description and the accompanying drawings.

DETAILED DESCRIPTION

Figure 1:
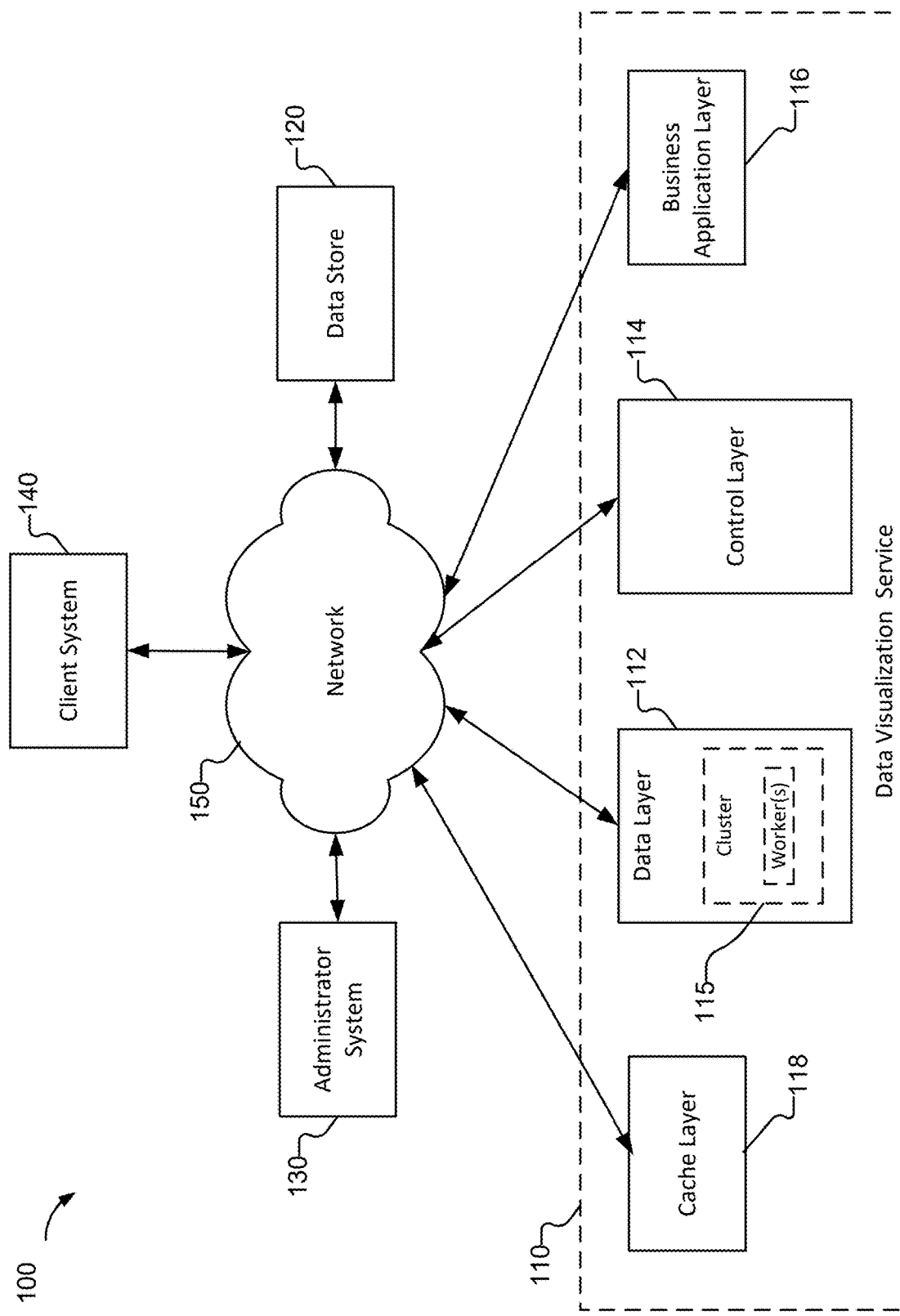
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art systems that generate reports on multi-dimensional datasets generally report the form of a chart, a table, a spreadsheet (e.g., a pivot table), etc. A table used to represent data from the multi-dimensional dataset is usually only read only. Such a reporting system receives a query, such as via a query made to a portal, and returns to the back end system (e.g., the query system) and generates a result (e.g., a table, chart, etc.) to report in response to the query (e.g., to present the user). A simple table (e.g., a table that provides a financial reporting analysis) has single headers and columns with rows.

In some cases, to build a report, the user navigates to a reporting tool, selects a data source, and chooses a visualization type, such as a report (e.g., a pivot table). The report can be multidimensional in which the columns or vertical dimensions can comprise a plurality of columns under a particular dimension or the rows or horizontal dimensions can comprise a plurality of different rows along a particular dimension. As an illustrative example of a visualization that reports workers within an organization, a pivot table can comprise a first column for an ethnicity code (e.g., Asian, Caucasian—British, Caucasian—Other European, Hispanic, African American, etc.), a second column for gender (e.g., Female, Male, etc.), and a dimension for a particular role (e.g., contingent work), which comprises a plurality of sub-columns, such as a set of sub-columns respectively corresponding to different age groupings (e.g., 20 and under, 31-40, 41-50, etc.). The report is populated with data obtained from a data source.

Under a related art system, when a data table is projected into a spreadsheet and a user wants to insert data, the manipulation of the table becomes very difficult. In the case of inserting a row to the table, related art systems need complex algorithms to shift all rows below the inserted row. As another illustrative example, in the case that a column is to be inserted in the table, inserting the column includes adding that dimension for every row in the table. A further illustrative example of a complex manipulation of the table is switching all rows to be columns and for all columns to be rows (e.g., to flip/rotate the table). However, even if such related art systems can perform these manipulations of the table, related art systems suffer from performance issues.

According to various embodiments, the system uses an N-conjoined tree data structure as temporary data to be used in the manipulation for display or creation of a report (e.g., a pivot table). The report is used to convey data to a user (e.g., via a user interface). The N-conjoined tree data structure stores linkage data that can persist through data structure manipulations and a location mapping that can be used to map dataset values to locations based at least in part on the linkage data. In some embodiments, the N-conjoined tree data structure comprises an intermediate data structure (e.g., a temporary data structure). For example, the N-conjoined tree data structure comprises an intermediary between an existing data source (e.g., a relational database, a no structured query language (SQL) database, a query language (QL) database, big data, object oriented database) and a visualization system (e.g., a system produced display—for example, a graph, a pivot table, etc.) or for any other appropriate data manipulation. In some embodiments, the N-conjoined tree data structure is not used as a main data structure, however, the N-conjoined tree data structure is cached either temporarily or permanently.

In some embodiments, the N-conjoined tree data structure comprises a primary data (permanent) structure that stores the data for a new database system, whose data is provided to an application or software system (e.g., a spreadsheet application or report application).

Various embodiments provide a system, method, and device for providing a data structure to be used in connection with manipulating or representing data. The method includes (i) receiving a request for manipulating or representing data comprised in a dataset, (ii) in response to receiving the request, determining to generate a tree data structure to represent the data, wherein the tree data structure is an N-conjoined tree data structure, where N is a positive integer, (iii) determining a set of dimensions for the data, and (iv) providing the N-conjoined tree data structure. Generating the N-conjoined tree data structure includes: (a) determining a root node for each tree in the N-conjoined tree data structure, (b) determining a set of branches (e.g., which represent the data dimensions of any given axes) for each tree in the N-conjoined tree data structure, (c) obtaining the data from the dataset, and (d) storing the data (e.g., data values—for example, numbers, aggregations like a sum, an average, etc., or simply text) in the N-conjoined tree data structure as leaf nodes including storing a piece of data in a leaf node that comprises setting a linkage to each tree in the N-conjoined tree data structure. Each branch is associated with a root node for one tree. Each leaf node is associated with N branches, and the N branches include one branch node for each tree in the N-conjoined tree data structure.

Various embodiments provide a system, method, and device for changing a data structure to be used in connection with manipulating or representing data. The method includes (i) obtaining a tree data structure to represent the data, (ii) receiving a request to change the N-conjoined tree data structure, (iii) enforcing a rule that requires each leaf node to have an associated linkage to each tree in the N-conjoined tree data structure while changing the N-conjoined tree data structure in accordance with the request, and (iv) providing an updated N-conjoined tree data structure. The tree data structure is an N-conjoined tree data structure, and N is a positive integer.

Various embodiments provide a system, method, and device for rearranging a data structure to be used in connection with manipulating or representing data. The method includes (i) obtaining a tree data structure to represent the data, (ii) receiving a request to rearrange data stored in the N-conjoined tree data structure, (iii) enforcing a first rule that requires each leaf node to have an associated linkage to each tree in the N-conjoined tree data structure while rearranging the N-conjoined tree data structure in accordance with the request, and (iv) providing a rearranged N-conjoined tree data structure. The tree data structure is an N-conjoined tree data structure, and N is a positive integer.

Although the examples described herein pertain to a conjoined twin tree having two orthogonal trees (e.g., a vertical tree and a horizontal tree), various embodiments implement an N-conjoined tree data structure to represent data obtained from a dataset with more trees for additional dimensions (e.g., where N is a positive integer greater than 2). In the case of N=3, for example, the N-conjoined tree data structure is a cube of data (e.g., three conjoined trees).

FIG. 1 is a block diagram of a network system according to various embodiments of the present application. In some embodiments, system 100 implements one or more of processes 1900-3300 of FIGS. 19-33. System 100 may be implemented at least in part by system 200 of FIG. 2.

In the example illustrated in FIG. 1, system 100 includes data visualization service 110, administrator system 130 and/or client system 140. System 100 may additionally include one or more data stores, such as data store 120, and network 150 over which one or more of data visualization service 110, client system 140, administrator system 130, and data store 120 are connected. In some embodiments, data visualization service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

In some embodiments, data visualization service 110 is configured to: (a) receive a request to generate an N-conjoined tree data structure or receive a request to visualize/represent data stored in a dataset (e.g., from which system 100 determines to generate the N-conjoined tree data structure); (b) determine a set of data to obtain from a dataset (e.g., a dataset in data store 120) based on the request to generate the N-conjoined tree data structure or otherwise represent data from a dataset; (c) generate the N-conjoined tree data structure (e.g., to be used as a data structure for the manipulation or representation of data); (d) receive a request to change certain data stored in the N-conjoined tree data structure (e.g., a request to add, insert, or delete certain data); (e) receive a request to rearrange data stored in the N-conjoined tree data structure (e.g., to sort or filter certain data, etc.); (f) manipulate the N-conjoined tree data structure or certain data stored therein based on the request(s) to change and/or rearrange the data; (g) enforce one or more rules pertaining to the structure of the N-conjoined tree data structure through manipulation operations; (h) traverse the N-conjoined tree data structure, such as in connection with performing a search or retrieval, or generating a representation of the data (e.g., a pivot table); (i) generate a mapping of node values to locations of a representation such as a table in which the data is to be presented; (j) generate the visualization/representation of the data (e.g., a table such as a pivot table); and/or (k) provide the visualization/representation of the data, such as by display via a user interface.

In some embodiments, data visualization service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources (e.g., virtual machines).

Data layer 112 obtains a query received by data visualization service 110 and processes the query to provide result data, such as in the form of a report (e.g., a forecast generated by executing a planning model). Data layer 112 receives the query, determines a set of data stored in a dataset (e.g., a dataset stored in data store 120), obtains the set of data, generates an N-conjoined tree data structure to be used as a data structure for manipulating data and generating the report (e.g., a table), and generates the report such as based on a mapping of values to locations for data stored in the N-conjoined tree data structure. The generating the report includes traversing the N-conjoined tree data structure to obtain the values stored in the N-conjoined tree data structure. Data visualization service 110 (e.g., control layer 114) can divide the traversal of the N-conjoined tree data structure into a plurality of parallel processes (e.g., a plurality of threads) that contemporaneously or simultaneously traverse different trees in the N-conjoined tree data structure. Data layer 112 can use cluster 115 to implement a plurality of workers to collectively traverse the N trees. Data layer 112 traverses at least a subset of the N-trees in the N-conjoined tree data structure in parallel and generates a result data.

Data visualization service 110 provides the result (e.g., responsive data, the report, the table, etc.) for the query to client system 140. For example, data visualization service 110 uses business application layer 116 to configure a user interface to display the results (e.g., provide a report or a sheet to client system 140), such as in the form of a report.

In some embodiments, data layer 112 manages a cluster of compute resources to execute the business logic of the query (e.g., to process the set of requests/subqueries against the applicable data) and/or to generate and maintain/manipulate the N-conjoined tree data structure. For example, data layer 112 establishes the connections between the set of compute resources and the data source(s) and allocates the workload for the business logic across the set of compute resources. In some embodiments, data layer 112 stores the N-conjoined tree data structure in cache layer 118 (e.g., in cases where data does not change in data store 120).

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator using administrator system 130 uses an interface provided/configured by business application layer 116 to configure (e.g., define) one or more security policies including access permissions to information stored on data store 120, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure data visualization service 110 and/or one or more of data stores (e.g., data store 120). For example, an administrator uses administrator system 130 to start and/or stop services on data visualization service 110 and/or data store 120, to reboot data store 120, to install software on data visualization service 110 and/or data store 120, to add, modify, and/or remove data on data store 120, etc. Administrator system 130 communicates with data visualization service 110 and/or data store 120 via a web-interface. For example, administrator system 130 communicates with data visualization service 110 and/or data store 120 via a web-browser installed on administrator system 130. As an example, administrator system 130 communicates with data visualization service 110 and/or data store 120 via an application running on administrator system 130.

In various embodiments, an administrator (or other user associated with a tenant or entity with which the tenant is associated such as a customer) uses administrator system 130 to configure a service provided to a tenant (e.g., an instantiation for an organization associated with a particular hypercube or planning model). As an example, the administrator uses administrator system 130 to communicate with data visualization service 110 to configure the service provided to the tenant. For example, administrator system 130 may communicate with data visualization service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for data visualization service 110, such as one or more security policies and/or one or more compute resource policies, etc.

Data store 120 stores one or more datasets (e.g., raw data sets). In various embodiments, the one or more datasets comprise human resources data, financial data, organizational planning data, or any other appropriate data. In some embodiments, data store 120 stores one or more datasets for a plurality of tenants. In various embodiments, a tenant comprises an organization such as a company, a government entity, a sub-organization of an organization (e.g., a department), or any other appropriate organization. For example, data store 120 comprises one or more database systems for storing data (e.g., big data) in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to data visualization service 110 via network 150) to define business logic and/or to execute such business logic with respect to data (e.g., one or more datasets) stored on data store 120. As an example, a user inputs to client system 140 one or more requests for a planning session to be communicated to data visualization service 110 for data visualization service 110 to load a planning session and enable the user to edit hypercube versions. As another example, a user inputs to client system 140 one or more queries to be run against a dataset. In response to receiving the business logic, data visualization service 110 uses data layer 112 (e.g., a cluster of compute resources) to execute the business logic (e.g., with respect to data stored by data store 120) and provides a result to the user (e.g., via a user interface provided on client system 140). In some embodiments, the result comprises information or a set of information that is responsive to the execution of the business logic. Data visualization service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, and/or a sheet.

In some embodiments, data layer 112, control layer 114, and/or business application layer 116 are implemented on a single server or a plurality of servers. For example, data layer 112 and business application layer 116 are different modules running on a same server or set of servers.

Figure 2:
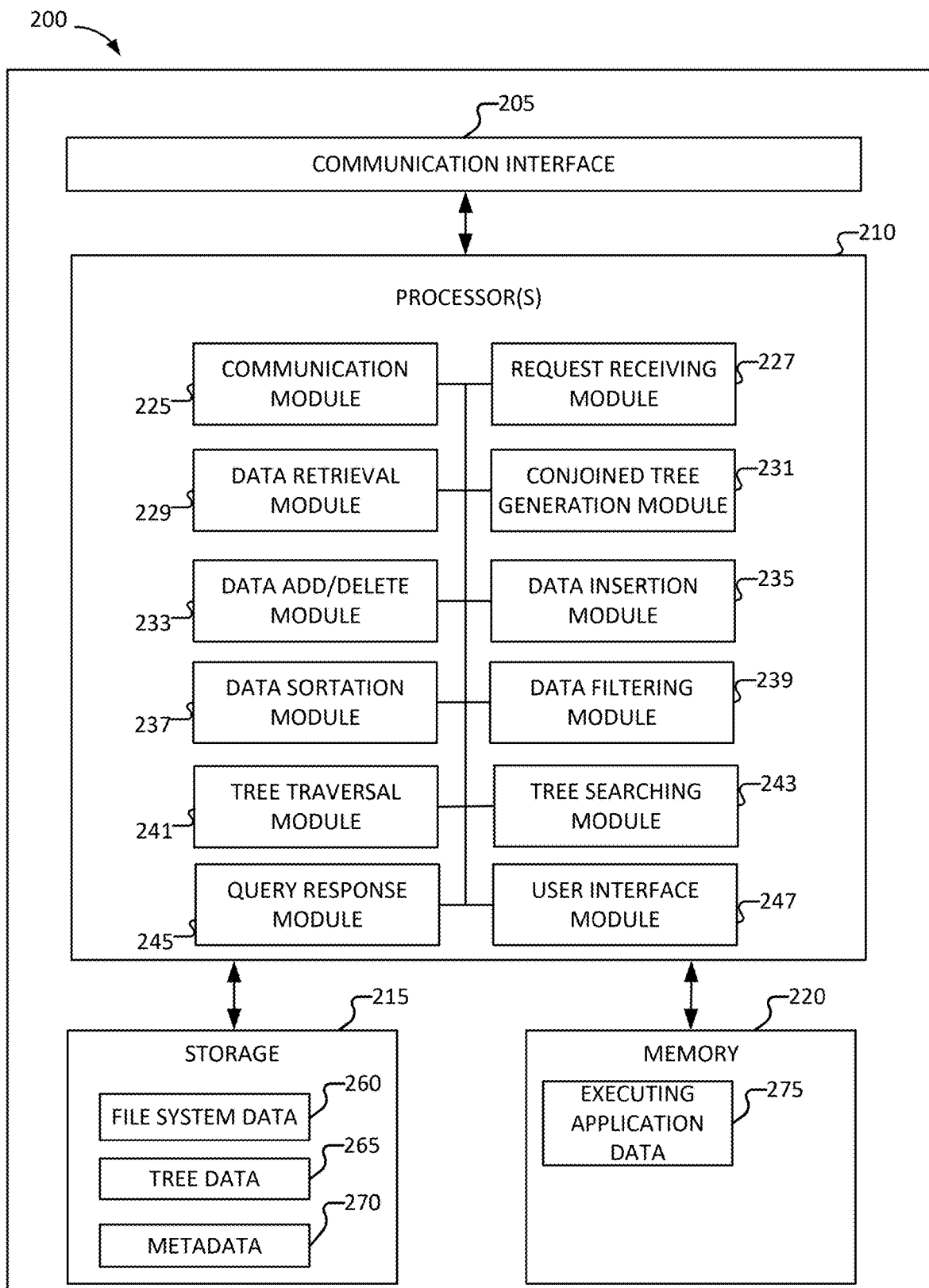
FIG. 2 is a block diagram of a system for providing manipulating or representing data in a dataset according to various embodiments of the present application.

FIG. 2 is a block diagram of a system for providing manipulating or representing data in a dataset according to various embodiments of the present application. In some embodiments, system 200 implements one or more of processes 1900-3300 of FIGS. 19-33. System 200 may implement at least part of system 100 of FIG. 1, such as data visualization service 110 of system 100. According to various embodiments, system 200 corresponds to, or comprises, a system for configuring or maintaining an N-conjoined tree data structure. System 200 implements a conjoined tree data structure as a data structure to be used in the manipulation of data obtained from a dataset or the creation of a report representing the data. System 200 may configure the N-conjoined tree data structure based on received queries, such as queries to change the data (e.g., to add, insert, or delete certain data) or to rearrange the data (e.g., to sort or filter certain data).

In the example shown, system 200 implements one or more modules in connection with providing a data visualization service, such as to enable users to manipulate and/or evaluate data on one or more data sources. System 200 comprises communication interface 205, one or more processors 210, storage 215, and/or memory 220. One or more processors 210 comprises one or more of communication module 225, request receiving module 227, data retrieval module 229, conjoined tree generation module 231, data add/delete module 233, data insertion module 235, data sortation module 237, data filtering module 239, tree traversal module 241, tree searching module 243, query response module 245, and/or user interface module 247.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). For example, communication module 225 receives requests for planning sessions, manipulation of data stored in data store 120, representations/visualizations of data (e.g., in the form of reports such as tables), etc. Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), and/or via one or more user interfaces (e.g., an interface that the user system is caused to display).

In some embodiments, system 200 comprises request receiving module 227. System 200 uses request receiving module 227 to receive a query, such as from a user operating a client terminal (e.g., client system 140). Examples of queries include a request for a planning session, a request to view a representation of data comprised in a dataset, a request to manipulate data in the dataset, etc. Examples of requests to manipulate data in the dataset include (i) a request to add, delete, or insert a new dimension of the data, (ii) a request to add, delete, or insert a new value for a particular location along one or more dimensions, (iii) a request to sort the data according to a particular sort query, (iv) a request to filter the data according to a particular filter query, etc. Various other requests to manipulate the data may be received.

In some embodiments, system 200 comprises data retrieval module 229. System 200 uses data retrieval module 229 to retrieve data from a dataset, such as in connection with generating a data structure to enable manipulation or reporting of data. If the query received by request receiving module 227 is a request to represent data stored in a dataset, such as to obtain a report or table for the data, data retrieval module 229 determines data within the dataset that is to be obtained and used for generating the result (e.g., the report or table). Data retrieval module 229 obtains the identified data based at least in part on querying the dataset using one or more queries.

In some embodiments, system 200 comprises conjoined tree generation module 231. System 200 uses conjoined tree generation module 231 to generate a tree data structure. The tree data structure can be an N-conjoined tree data structure. N can be a positive integer, or alternatively, a positive integer greater than 1. As an example, conjoined tree generation module 231 obtains data from a dataset and generates tree data structure 400.

Tree generation module 231 generates an N-conjoined tree data structure which comprises N root nodes. The reason why the N-conjoined tree data structure has N root nodes is because leaf nodes within a matrix always intersect with branch nodes on all N-axes in the N-conjoined tree data structure. Each leaf node can be retrieved by traversing any of the trees respectively defined by the N root nodes.

In connection with generating the N-conjoined tree data structure, tree generation module 231 enforces one or more rules. An example rule is to require that each leaf node has linkage data for each tree in the N-conjoined tree data structure. Another example rule that can be enforced is a rule that requires that each leaf node has a single (e.g., at most a single) associated parent node for each tree. An additional or alternative rule that can be enforced is a rule that requires that each leaf node has at most a single associated child node for each tree.

In some embodiments, system 200 comprises data add/delete module 233. System 200 uses data add/delete module 233 to perform one or more of: (a) adding a branch (e.g., a branch node or new dimension), (b) deleting a branch, (c) adding a leaf node, and/or (d) deleting a leaf.

Adding a branch or leaf node in an N-conjoined tree data structure can be performed by adding the branch or leaf node at the end of the children node list. When adding a branch node, add/delete module 233 will automatically set the parent node. When adding a leaf node, add/delete module 233 sets N parent nodes (e.g., a parent node for each tree in the N-conjoined trees). Add/delete module 233 can associated with each of the N parent nodes the leaf node as their children. In some embodiments, add/delete module 233 can enforce a rule that requires that any two leaf nodes cannot have the same N parents (e.g., the same parents along each N-tree).

Add/delete module 233 can delete a branch or leaf node from the children nodes of a given node. In connection with deleting the branch or leaf node, add/delete module 233 removes the deleted nodes from the children list. In some embodiments, add/delete module 233 can delete a branch node, and when it deletes the branch node, add/delete module 233 will also delete all the descendants of that deleted branch node. In some embodiments, add/delete module 233 can delete a leaf node, and in connection with deleting the leaf node, system 200 can correspondingly update the applicable linkage data (e.g., to update a list of child/leaf nodes for a particular branch node, or to update linkages between other leaf nodes such as an ordering of the leaf nodes along a particular dimension). In some embodiments, when a leaf node is deleted from a branch in one axis, the system will automatically remove the leaf node from all other branch parents in multiple axes (e.g., the update is in the form of an auto-deletion). In some embodiments, add/delete module 233 can delete a branch node. For example, in connection with deleting a leaf node, add/delete module 233 can correspondingly update the linkage data, such as by deleting the branch node for each of its parents/ancestors within the particular tree (e.g., to update the child data for the branch node's parents/ancestors to remove reference to the deleted branch node). In some embodiments, when a branch node is deleted, the system will cascade delete all the given branch node descendants all the way to the leaf nodes. In addition, the system will automatically delete those leaf nodes from branches that belong to different axes.

In some embodiments, system 200 comprises data insertion module 235. System 200 uses data insertion module 235 to insert a branch node (e.g., to add a new dimension to the N-conjoined tree data structure) or a leaf node. For example, data insertion module 235 can insert a branch or leaf node either at the beginning or in the middle of the children nodes.

In some embodiments, when data insertion module 235 inserts a branch node, data insertion module 235 will automatically set its parent node. For example, data insertion module 235 sets the root node for the particular tree as the parent to the new branch node if the new branch node is added to a highest level of a highest branch-level of the tree hierarchy. As another example, data insertion module 235 sets a branch node in a next higher branch-level of the tree hierarchy for the particular tree as the parent to the new branch node.

In some embodiments, when data insertion module 235 inserts a leaf node to a particular dimension (e.g., to a particular branch), data insertion module 235 does not need to do a corresponding insertion at a particular location on another parent (e.g., the parent(s) from the other trees). Because system 200 enforces a rule requiring that each leaf node must have N parents (e.g., one parent for each of the N trees), the insertion of a leaf node will require the updating of linkage data to associate the new leaf node to parents in the other N−1 trees. As an example, data insertion module 235 simply adds the association between the new leaf node and the parent node(s) for the other trees in the N-trees. Data insertion module 235 can add the association the new leaf node and the parent node(s) for the other trees in the N-trees by causing the parent node(s) to simply add the leaf node to the end of its children list. Alternatively, data insertion module 235 can update the metadata or linkage data to associate the new leaf node to the other parents. In some embodiments, the system does not store any linkage/metadata information between siblings in branch and leaf nodes because this information is stored within a linked-list data structure as a children list of a root/branch node parent. In this case, there is no explicit storage of the location, order, or index in the tree since linked-list data structure includes that information. In some embodiments, linkage information is only stored between parent and child so that a parent knows its children and a child knows its parent. In some embodiments, insertion only matters to the branch that is doing the insertion; It does not matter to other branches in other trees/axes unless the other branches care about the order (e.g., leaf node position must be perpendicular to the other axes), otherwise, insertion in one branch simply means addition to the other branches. In some embodiments, when a leaf node is inserted into one branch node parent, children do not need insertion at the same location index of the other parent—for example, in FIG. 10, leaf node 1066 (8) is inserted in the beginning of the list of branch node 1016 (*e*) children, leaf node 1066's other parent is branch node 1026 (*f*); note that leaf node 1066 is not inserted ar the beginning of branch node 1026's child list, but rather add at the end of the list (e.g., after leaf node 1060 (7)).

In some embodiments, system 200 comprises data sortation module 237. System 200 uses data sortation module 237 to sort data in the N-conjoined tree data structure along one or more dimensions. If data sortation module 237 sorts the data from the tree level, data sortation module 237 will do a group sorting (e.g., structured query language (SQL) query), and thus data sortation module 237 is capable not only of sorting the children but the ascendants/descendants as well. In some embodiments, data sortation module 237 maintains linkage data during the sortation to so that sorting the N-conjoined tree data structure from one axis (e.g., along a dimension in a particular tree of the N-trees) will not change the node order in the other axis. In some embodiments, sorting from the tree level does not sort all values in branch nodes and leaf nodes in a particular sorting order as would be performed in a search of a binary search tree. For example, in any other data structures such as arrays, list, binary tree, etc. the data are represented as a single level/hierarchy data structure; although data might be stored in a tree structure, the data all belong to one collection. So, when the data are sorted, the system must sort all data within the entire structure. An N-conjoined tree data structure is a multi-level data structure, where each level has its own collection. In this case, the entire tree is not sorted, rather the system sorts each level.

In some embodiments, system 200 comprises data filtering module 239. System 200 uses data filtering module 239 to perform a filtering against the N-conjoined tree data structure. In response to receiving a filtering query, data filtering module 239 causes the N-conjoined tree data structure to be traversed. As each node in the N-conjoined tree data structure is traversed, the node can be evaluated against the filtering query. Data filtering module 239 can determine whether to filter the node based at least in part on the evaluation. Filtering makes a tree node (e.g., either a branch node or a leaf node) invisible. When a tree node is invisible, the tree node will be excluded from being traversed, deleted, or searched.

In some embodiments, in response to data filtering module 239 determining whether the node is to be filtered, data filtering module 239 sets a flag (e.g., the second flag or relevant data flag) that is used to indicate whether the node stores relevant data. In some embodiments, the system sets a predicate criteria function to evaluate whether or not the nodes within the trees are to be filtered (e.g., made invisible). Data filtering module 239 can use the flags for the nodes in the N-conjoined tree to determine whether to filter out certain nodes. For example, filtering the N-conjoined tree data structure marks tree node(s) to be invisible (e.g., the system sets the flag indicating that the node is to be filtered out or otherwise does not store relevant data) if the value stored at such tree node(s) matches the filter criteria. In some embodiments, the system comprises an access/scan flag that is used during searching and filtering to ensure that leaf nodes are not accessed twice when both operations are done in parallel from both directions. Note that the access/scan flag is not used in other operations such as traversal. In some embodiments, the system comprises a filter flag that is used during retrieval, traversal, search, and deletion to ensure that a node marked as invisible will be skipped during the process of retrieval, traversal, search, and deletion.

According to various embodiments, tree node(s) that are marked invisible will be excluded from search, retrieval, and deletion operations. If a branch node is marked as invisible, all the descendants will be marked as invisible as well.

In some embodiments, system 200 comprises tree traversal module 241. System 200 uses tree traversal module 241 to traverse the tree data structure (e.g., the N-conjoined tree data structure). The tree traversal module 241 can traverse a N-conjoined tree data structure along one or more of the N-trees. For example, tree traversal module 241 traverses a N-conjoined tree data structure by traversing a plurality of the N-trees. The plurality of N-trees can be performed in parallel or substantially in parallel. In some embodiments, tree traversal module 241 traverses a particular tree by starting at the corresponding root node, then traverses the branch-levels in the particular tree, and after traversing the branch nodes in the branch-levels, tree traversal module 241 traverse the leaf nodes.

According to various embodiments, in order to transform the N-conjoined tree data structure into a pivot table, system 200 uses tree traversal module 241 to traverse the tree from each of the tree roots. In contrast to other related art where normally the system starts from the root down to the leaf, in some embodiments, system 200 traverses N-conjoined tree (e.g., where N=2) by traversing in 3 different directions:

- traversing the branch nodes from the vertical root nodes to retrieve branch nodes data from the vertical axis which normally represents column dimension data of a pivot table;
- traversing the branch nodes from the horizontal root nodes to retrieve branch nodes data from the horizontal axis which normally represents row dimension data of a pivot table; and
- traversing the leaf nodes from any axis direction to retrieve leaf nodes data which normally represents the value data of a pivot table.

Tree traversal module 241 can traverse the branch nodes within a tree to define or plot the table headers for that axis or dimension (e.g., a row or column) of a pivot table. Therefore, when tree traversal module 241 traverses the branch nodes, it starts from the root of the applicable tree of the N-tree (e.g., the root of the applicable axis). The traversal direction of the branch nodes is following the depth order from the top (e.g., the root node) of the hierarchy to the bottom (e.g., the last branch node excluding the leaf nodes) of tree hierarchy before going to next children of the branch nodes in each level.

According to various embodiments, because leaf nodes always have N branch parents, tree traversal module 241 will start to traverse the leaf nodes from a branch node in a lowest branch-level of the tree hierarchy from either horizontal or vertical axis (e.g., in the case that N=2) in the tree. If tree traversal module 241 starts from a horizontal branch node, the traversal direction will be going from left to right, while starting from a vertical branch node, the traversal direction will be going from top to bottom.

In some embodiments, system 200 comprises tree searching module 243. System 200 uses tree searching module 243 to search the tree data structure (e.g., the N-conjoined tree data structure) for data values/nodes matching a certain search query. In connection with performing a search operation, tree searching module 243 uses tree traversal module 241 to traverse the N-conjoined tree data structure. When each node is scanned during the traversal, system 200 determines whether (i) the node stores relevant data for the operation for which the traversal is performed (e.g., in this case, whether the value at the node being scanned matches the search query), or (ii) whether the node has previously been evaluated against the search query (e.g., whether the node has previously been traversed through a traversal along a different one of the N-trees). Tree searching module 243 can use the flags identifying (e.g., using a comparison function) whether a node stores relevant data to quickly identify the nodes storing relevant data and to generate the result for the search query.

In some embodiments, system 200 comprises query response module 245. System 200 uses query response module 245 to aggregate the data obtained for the set of requests to obtain a response to the query. Query response module 245 obtains the data collected by traversing the N-conjoined tree data structure (e.g., traversing one or more of the N-trees) and generates a representation/visualization of the data based on such collected data. For example, in response to obtaining the data collected by traversing the N-conjoined tree data structure, query response module 245 generates a mapping of values for a plurality of nodes in the N-conjoined tree data structure and uses the mapping to generate a table. Query response module 245 populates the table based on the values mapped to the various table locations.

In some embodiments, system 200 comprises user interface module 247. System 200 uses user interface module 247 in connection with configuring information (or the display thereof) to interact with the user (e.g., via client system 140 and/or administrator system 130 of system 100). In some embodiments, user interface module 247 configures a user interface to be displayed at a client system, such as an interface that is provided in a web browser at the client system. User interface module 247 may configure a user interface via which a query may be input. In some embodiments, user interface module 247 configures a user interface to provide a response to the query, such as by providing one or more reports of information that is/are responsive to the query or task executed with respect to the source dataset(s) (e.g., a query or task executed against data stored on data store 120).

User interface module 247 configures the user interface displayed at a client system to provide the generated representation of the data responsive to the received request/query. For example, user interface module 247 configures the user interface to display a table or report of the data.

According to various embodiments, storage 215 comprises one or more of file system data 260, tree data 265, and/or metadata 270. Storage 215 comprises a shared storage (e.g., a network storage system). In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. File system 260 may additionally include one or more reports that are generated from an N-conjoined tree data structure(s). In some embodiments, tree data 265 comprises a set of one or more N-conjoined tree data structures. In some embodiments, metadata 270 comprises linkage data identifying linkages between nodes in an N-conjoined tree data structure. Metadata 270 may additionally comprise a location mapping that maps values/nodes in the N-conjoined tree data structure to locations in a table/report to be generated.

According to various embodiments, memory 220 comprises executing application data 275. Executing application data 275 comprises data obtained or used in connection with executing an application such as an application executing on a tenant. In some embodiments, the application comprises one or more applications that perform one or more of receiving and/or executing a query or task, generating a report and/or configuring information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
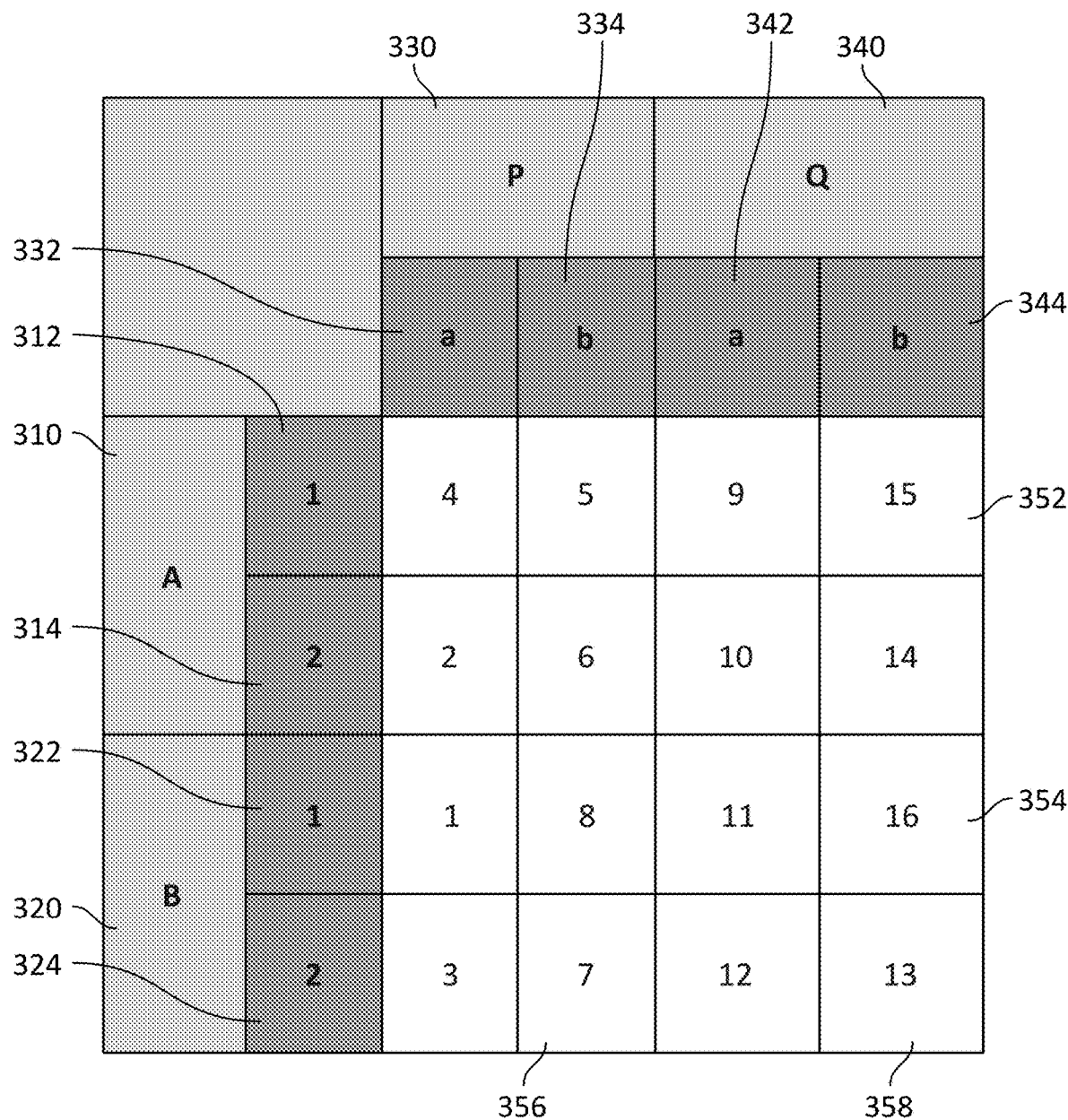
FIG. 3 illustrates an example of a related art data structure.

FIG. 3 illustrates an example of a related art data structure. In the example shown, data structure 300 is stored in a table comprising columns 330 and 340 having corresponding sub-column associated with node P-a 332 and sub-column associated with node P-b 334 of column 330, and sub-column associated with node Q-a 342 and sub-column associated with node Q-b 344 of column 340. Similarly, data structure comprises rows 310 and 320 with row 310 having corresponding sub-row associated with node A-1 312 and sub-row associated with node A-2 314, and row 320 having corresponding sub-row to the right of branch node B-1 322 and sub-row associated with branch node B-2 324.

Table data can be stored in a table/grid data structure (e.g., 2-dimensional array or list), such as data structure 300. If new data is to be inserted into the table data (e.g., subtotal between sub-row associated with node A-2 314, and sub-row associated with node B-1 322), the related art system is required to shift every single cell after sub-row associated with node B-1 322 to the next location. Although shifting all of the cells after sub-row associated with node B-1 322 to the next location is possible, the process for doing so is relatively complex and performance would suffer as the number of rows and columns grow (e.g., the process for shifting all the cells is computationally expensive). Similarly, if the table data stored in a table/grid data structure is to be sorted from a row or column axis, the related art system needs to reorder the other column/row in order to make it align with the sorted column/row. Accordingly, data structure 300 is inefficient and non-scalable.

In the example shown, data structure 300 comprises a plurality of leaf nodes, and each leaf node has an associated parent for each of the N-trees. As an example, leaf node 356 is a child of the dimension defined by branch node B-2 324 and a child of the dimension defined by branch node P-b 334. As another example, leaf node 358 is a child of the dimension defined by branch node B-2 324 and a child of the dimension defined by branch node Q-b 344. As another example, leaf node 354 is a child of the dimension defined by branch node B-1 322 and a child of the dimension defined by branch node Q-b 344. As another example, leaf node 352 is a child of the dimension defined by branch node A-1 312 and a child of the dimension defined by branch node Q-b 344.

Various embodiments implement a tree data structure to represent data stored in a dataset. The tree data structure can be used as a temporary data structure (e.g., an intermediate data structure) to facilitate manipulation and rearrangement of data to be presented in a visualization, such as a table data structure represented on a user interface. In some embodiments, the data structure is an N-conjoined tree data structure, where N is a positive integer. Where N=2, the tree data structure is a conjoined twin tree, such as tree data structure 400 illustrated in FIG. 4. The tree data structure, according to various embodiments, provides a more efficient and less complex data representation for modification. Conversely, a table/grid structure such as data structure 300 is only ideal for read-only data storage.

Figure 4:
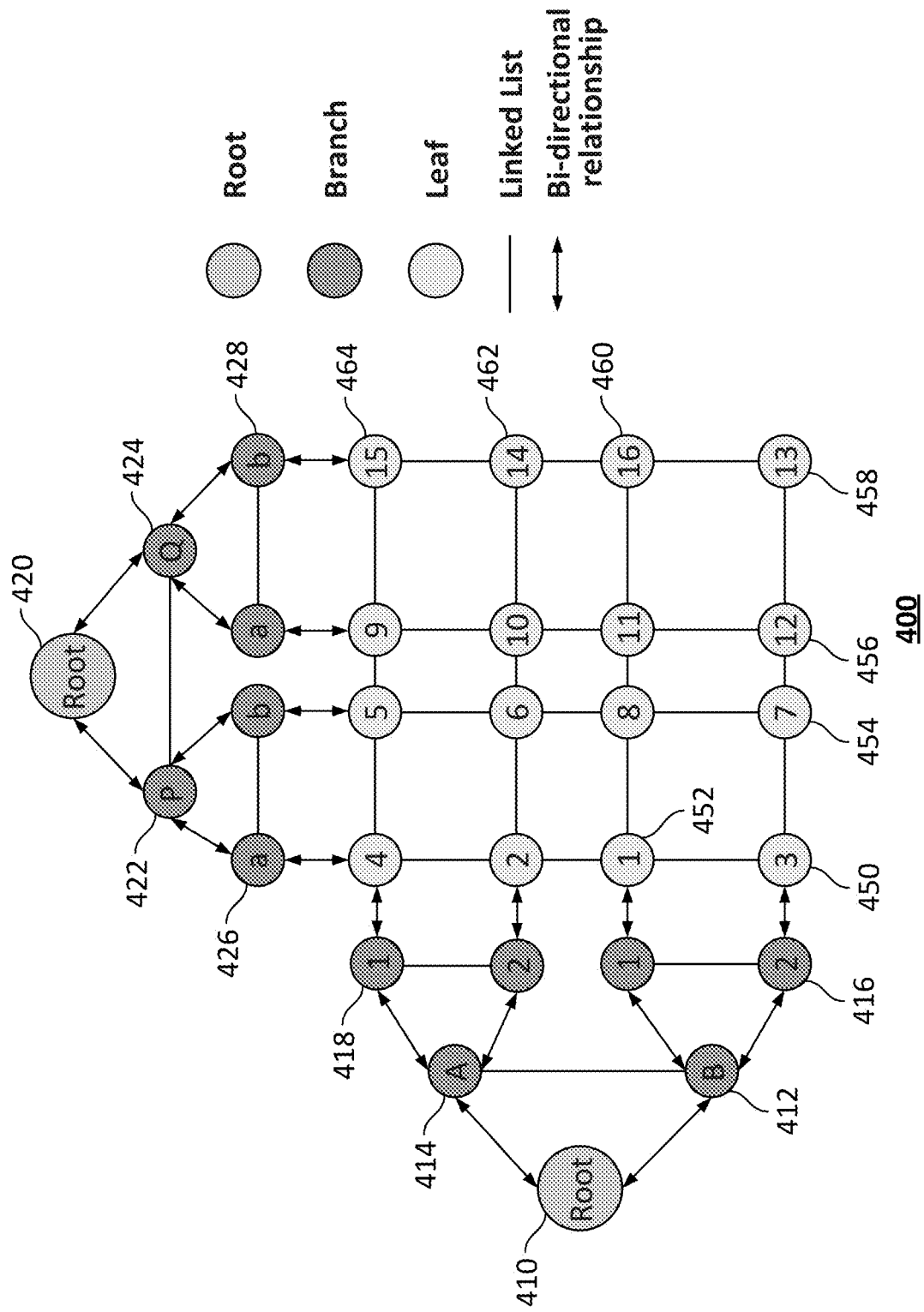
FIG. 4 illustrates an example of a data structure according to various embodiments of the present application.

FIG. 4 illustrates an example of a data structure according to various embodiments of the present application. In some embodiments, tree data structure 400 is implemented at least in part by system 100 of FIG. 1 and/or system 200 of FIG. 2. In the example shown, tree data structure 400 is an N-conjoined tree data structure where N=2. As illustrated, tree data structure 400 comprises two parallel trees extending respectively from root nodes 410 and 420.

Various embodiments implement hierarchical structure in order to solve the problem of modifying multi-dimension data like in a pivot table. Modifying of the multi-dimension data includes operations such as adding, inserting, deleting or sorting without shifting, and/or moving or reordering cell(s) within the matrix. The hierarchical structure, such as tree data structure 400, can support modification of the data in a 2-axis direction.

According to various embodiments, tree data structure 400 comprises a set of N trees, where N is a positive integer. Each tree in the N-trees comprises a root node (e.g., root node 410 and root node 420) that serves as a starting point or base from which to traverse the tree. As an example, a conjoined twin tree such as tree data structure 400 comprises a horizontal root node (e.g., root node 410) and a vertical root node (e.g., root node 420).

As illustrated, tree data structure 400 comprises a set of branches. The set of branches can be represented in a hierarchy where a subset of branches are in different levels in the tree hierarchy. In some embodiments, a branch defines a dimension along which data is represented. For example, the N-conjoined tree data structure comprises a set of one or more branches corresponding to rows and a set of one or more branches corresponding to columns when the data is stored in the N-conjoined tree data structure.

In the example shown, tree data structure 400 comprises a tree (e.g., the horizontal tree having root node 410) representing the data along the dimensions defined by the rows, such as rows A and B and sub-rows A-1, A-2, B-1, and B-2 of data structure 300. The highest branch-level of the tree hierarchy comprises branch node 412 and branch node 414 respectively corresponding to a first dimension along which the data is represented (e.g., respectively corresponding to rows B and A of data structure 300). The particular tree of the tree data structure 400 further comprises a second branch-level of the tree hierarchy in which the branch nodes (e.g., branch nodes 416 and 418) are children of nodes in the highest branch-level of the tree hierarchy. For example, branch node 412 in the highest branch-level and branch node 416 in the second branch-level have a parent-child relationship. Similarly, branch node 414 in the highest branch-level and branch node 418 in the second branch-level have a parent-child relationship.

The tree hierarchy comprises a set of leaf nodes lower in the hierarchy than the branch level. The set of leaf nodes respectively storing the data (e.g., values) for the data set and represented along the dimensions defined by the corresponding branches is shown. In the example shown, the particular tree of the tree data structure 400 having root node 410 comprises leaf nodes 450-464 that are descendants of the branches in highest branch-level and the second branch-level (e.g., the lowest branch-level) of the tree hierarchy. Node 450, node 454, node 456, and node 458 are children of branch node 416. Leaf nodes do not have children, only parents. In some embodiments, branch node 416 has a line without an arrow which represents a list.

In some embodiments, each tree in the N-conjoined tree data structure comprises the same leaf nodes. Each leaf node is a descendant of a branch node from each tree. For example, each leaf node is associated with N branches, and the N branches include one branch node for each tree in the N-conjoined tree data structure. In the example shown, the tree having root node 420 comprising leaf nodes comprises the same set of leaf nodes as the particular tree having root node 410 (e.g., leaf nodes 450-464). In this tree, branch node 422 and branch node 424 are children of root node 420; branch node 426 is a child of branch node 422; branch node 428 is a child of branch node 424; node 464, node 462, node 460, and node 458 are children of branch node 428. In other words, nodes 458-464 are descendants of branch node 428 and branch node 424.

In some embodiments, the system stores relationship data (e.g., linkage data) for the trees, or the set of nodes in the trees, of the N-conjoined tree data structure. The relationship data may be stored in, or in association with, the N-conjoined tree data structure. In some implementations, the relationship data is stored as metadata or as an object reference for the nodes in the N-conjoined tree data structure. As illustrated in FIG. 4, tree data structure 400 comprises linkages between nodes, such as a bi-directional linkage between branch node 428 and node 464, or linkage between nodes 458 and 460. The system stores linkage data for at least each leaf node in the N-conjoined tree data structure, such as an indication of parent-child relationships. For example, each leaf node has at least an indication of a parent node or an indication of a child node. As illustrated, node 458 has a parent-child relationship as a child node for both the tree having a root node 410 and the tree having the root node 420. The system stores as metadata an indication that node 458 is a child of node 456 for the tree having root node 410 and a child of node 460 for the tree having the root node 420. The indication that node 458 is a child of nodes 456 and 460 may be stored in association with node 458 as well as nodes 456 and 460. Similarly, the system stores an indication that node 456 is a child of node 454 and a parent of node 458 for the tree having root node 410.

The system stores metadata indicating linkages between nodes in connection with generating the N-conjoined tree data structure. The storing of a piece of data in a leaf node comprises setting a linkage to each tree in the N-conjoined tree data structure. Each leaf node is associated with N branches, and the N branches include one branch node for each tree in the N-conjoined tree data structure.

In some embodiments, an N-conjoined tree data structure comprises N root nodes, or a different root node for each tree. For example, where N=2 such as for tree data structure 400 illustrated in FIG. 4, the system generates the tree data structure to include two root nodes which allows (e.g., causes) the leaf nodes within a matrix to always intersect with branch nodes on both horizontal and vertical axes. In other words, the system enforces a rule to require that each leaf node has linkage data for each tree in the N-conjoined tree data structure. Both root nodes allow the leaf nodes to be retrieved from different angles (e.g., two different angles in the event that N=2, such as a horizontal angle and a vertical angle). Thus, the value for a particular leaf node can be obtained by traversing any of the N trees. In the illustrated example, the system can retrieve the B-2 horizontal values which are 3, 7, 12, and 13 (e.g., corresponding to nodes 450, 454, 456, and 458, which are descendants of branch node 416) and the Q-b vertical values which are 15, 14, 16, and 13 (e.g., corresponding to nodes 464, 462, 460, and 458, which are descendants of branch node 428).

Because the root node is a starting point for traversing a particular tree (e.g., root node 410 for the horizontal tree of tree data structure 400), the root has only children nodes and no parent nodes. In the example shown, the children nodes of root node 410 are branch node 412 and branch node 414. The root node normally does not have any values associated with it. The root node can have one or more branch node(s). In some embodiments, the root node branches are stored as a linked-list.

A conjoined twin tree branch is a type of tree node that has both parent and children in the tree. An example of a conjoined twin tree branch is branch node 416 which is a child of branch node 412 and a parent to node 450. In some embodiments, a branch node must have a single parent (e.g., the branch node cannot be orphaned because it must be linked to each tree) and one or more children nodes (e.g., a branch node(s) or leaf node(s)). For example, branch node 414 has two child nodes: the nodes corresponding to values A-2 and A-1 (e.g., branch node 418). A branch node is independent and has no relationship with other branch node(s) at the same level of the tree hierarchy. However, in the event that the tree has multiple branch levels in the hierarchy, a branch node in a lower level of the branch-levels of the hierarchy has a relationship to a branch node in an immediately higher branch-level of the tree (e.g., branch node 416 has a relationship with branch node 412). The lowest level of branch node (e.g., branch node 416 or branch node 418) has one or more leaf node(s) as children, for example, branch node 416 has node 450 as a child. Children of branch nodes are stored as a linked-list. According to various embodiments, a branch node represents a header dimension(s) of a pivot table.

A conjoined twin tree leaf is a type of tree node that has two parents and no children. Similar to branch nodes, leaf nodes are also independent and have no relationship to other leaf nodes. Note, each leaf node has dependency to its parent. The straight line between leaf nodes does not represent a parent-child (hierarchical) relationship instead the straight line represents that the nodes are siblings and are within a linked-list (e.g., an ordered list)—the nodes are not dependent to each other (e.g., no direct linkage between siblings), but only to their parent. In some embodiments, the system stores linkage to both trees as object reference in binary or metadata in text (e.g., json—{"branches": [{"id": 1, "leafs": [{"id": 2, "parent": 1}]}]). A leaf node cannot be orphaned. In a pivot table, leaf nodes normally represent the table values.

Figure 5:
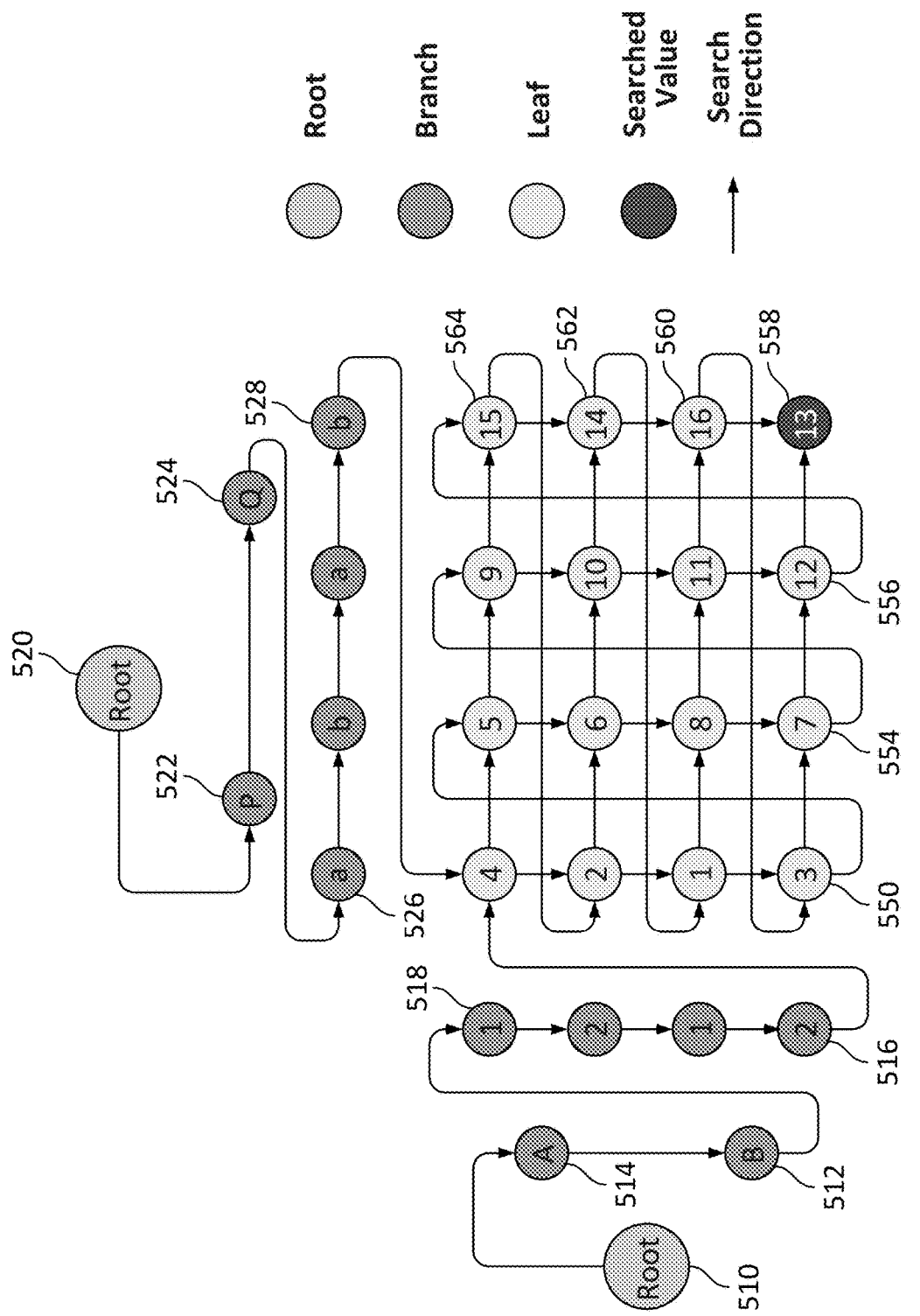
FIG. 5 illustrates an example of performing a traversal of a data structure according to various embodiments of the present application.

FIG. 5 illustrates an example of performing a traversal of a data structure according to various embodiments of the present application. In some embodiments, tree data structure 500 is implemented at least in part by system 100 of FIG. 1 and/or system 200 of FIG. 2. In the example shown, tree data structure 500 is an N-conjoined tree data structure where N=2. Tree data structure 500 can have the same relationships (e.g., linkage data) as tree structure 400 of FIG. 4.

The system can search an N-conjoined tree data structure as shown in the example with respect to tree data structure 500. As illustrated, the system can search the N-conjoined tree data structure via any of (or one or more of) the N trees. The system can search a plurality of the N-trees to search for a value, for example, the tree having root node 510 and the tree having root node 520). In some embodiments, the system searches the plurality of trees in parallel (or substantially in parallel).

According to various embodiments, when the system searches (e.g., traverses) the plurality of trees in parallel, the system accesses the value for any one leaf node a single time across the plurality of traverses. For example, if a first thread traversing the tree having root node 510 accesses the value stored for leaf node 562 (e.g., accesses and analyzes the value to determine whether leaf node 562 stores relevant data), then a second thread traversing the tree having root node 520 skips leaf node 562 (e.g., skips accessing the leaf node 562, such as by determining that a flag has been set indicating that leaf node 562 has already been analyzed during the search). In some embodiments, the flag set comprises a boolean attribute that is shared between threads. For example, a pseudo-code example is as follows:

```
Boolean visited=false;
ParallelStream.of(search(visited), search(visited));
search(Boolean visited) {
if (visited=true) then Skip comparison
}
```

In some embodiments, the N-conjoined tree data structure comprises metadata for each leaf node. The metadata for a particular leaf node can store one or more of (i) an indication of whether the leaf node has already been analyzed (e.g., the value has been accessed and the system has determined whether the value is relevant for the search query) and (ii) an indication of whether the leaf node stores relevant data (e.g., an indication that the stored value is relevant/responsive to the search query).

During the first traversal of a leaf node, the system (e.g., thread performing the traversal) accesses (e.g., obtains) the leaf node value, determines whether the leaf node value is relevant (e.g., responsive to the search query), sets an indication that the leaf node value has been accessed (e.g., sets a flag indicating that the leaf node has already been analyzed), and sets an indication of whether the leaf node stores relevant data (e.g., sets a flag indicating whether the leaf node value is responsive to the search query, uses a comparison function with the flag to determine whether a node stores relevant data, etc.).

For subsequent traversals of a particular leaf node (e.g., a thread traversing/searching the tree in a different direction or from a different node), the system (e.g., the thread performing the traversal) obtains the metadata for the particular leaf node (e.g., obtains a value for a flag that is set to indicate whether the leaf node value has already been accessed/analyzed), determines whether the leaf node value has already been accessed/analyzed (e.g., by a different thread), and in response to determining that the leaf node has already been accessed/analyzed, the leaf node is skipped (e.g., the thread does not further process the leaf node value) and skips to a next leaf node in the traversal.

Because the N-conjoined tree data structure is unsorted by nature, searching for a node within the N-conjoined tree data structure tree requires traversing the tree nodes from one or more of the root nodes down to the leaf nodes. In some embodiments, the system implements a breadth-first-search technique to search a value within an unsorted N-conjoined tree data structure. In the example shown, because the tree data structure 500 comprises a plurality of trees (e.g., the N-conjoined tree data structure, where N=2), the system searches for a branch node is to be done on both roots (e.g., root node 510 and root node 520 because each branch node is only a descendant of one root node). However, the searching for the branch node can be performed in parallel by contemporaneously starting on both roots and traversing the trees (e.g., starting on both root nodes 510 and 520 at substantially the same time). Searching a node from the roots will take a time proportional to input data set size n (e.g., O(n) performance).

In some embodiments, leaf nodes are traversed in one direction only (e.g., either from the horizontal axis or the vertical axis). In some embodiments, the leaf nodes for the trees are traversed in orthogonal directions during traversal through the trees. In some embodiments, traversal of a tree starts at a root node, and sequentially traverses a highest branch-level until all branch nodes in the highest branch-level have been traversed, and iteratively searches the branch nodes in each successive branch-level before sequentially traversing the set of leaf nodes by traversing sequentially the dimensions defined by the branch nodes in the lowest branch-level of the tree hierarchy.

In the example shown, traversal of the tree having root node 510 comprises starting at root node 510, traversing branch node A (e.g., branch node 514) and then branch node B (e.g., branch node 512) for the highest branch-level in the tree hierarchy, proceeding to the next-highest branch-level and sequentially traversing branch nodes A-1, A-2, B-1, and B-2, and then traversing the leaf nodes by sequentially traversing the dimensions of the tree defined by the branch nodes of the tree having root node 510. For example, the system traverses the leaf nodes by scanning leaf nodes in dimension A-1 (e.g., from the highest leaf-node level in the tree hierarchy to the lowest leaf-node level in the tree hierarchy) having values 4, 5, 9, and 15; proceeding to dimension A-2 and scanning the leaf nodes in dimension A-2 having values 2, 6, 10, and 14; proceeding to dimension B-1 and scanning the leaf nodes in dimension B-1 having values 1, 8, 11, and 16; and proceeding to dimension B-2 and scanning the leaf nodes in dimension B-2 having values 3, 7, 12, and 13 (e.g., leaf nodes 550, 554, 556, and 558).

Traversal of the leaf nodes via the tree having root node 520 is orthogonal. For example, traversal of the tree having root node 520 comprises starting at root node 520, traversing branch node P (e.g., branch node 522) and then branch node Q (e.g., branch node 524) for the highest branch-level in the tree hierarchy, proceeding to the next-highest branch-level and sequentially traversing branch nodes P-a, P-b, Q-a, and Q-b, and then traversing the leaf nodes by sequentially traversing the dimensions of the tree defined by the branch nodes of the tree having root node 520. For example, the system traverses the leaf nodes by scanning the leaf nodes in dimension P-a having values 4, 2, 1, and 3; proceeding to dimension P-b and scanning the leaf nodes in dimension P-b having values 5, 6, 8, and 7; proceeding to dimension Q-a and scanning the leaf nodes in dimension Q-a having values 9, 10, 11, and 12; and proceeding to dimension Q-b and scanning the leaf nodes in dimension Q-b having values 15, 14, 16, and 13 (e.g., leaf nodes 558, 560, 562, and 564).

Figure 6:
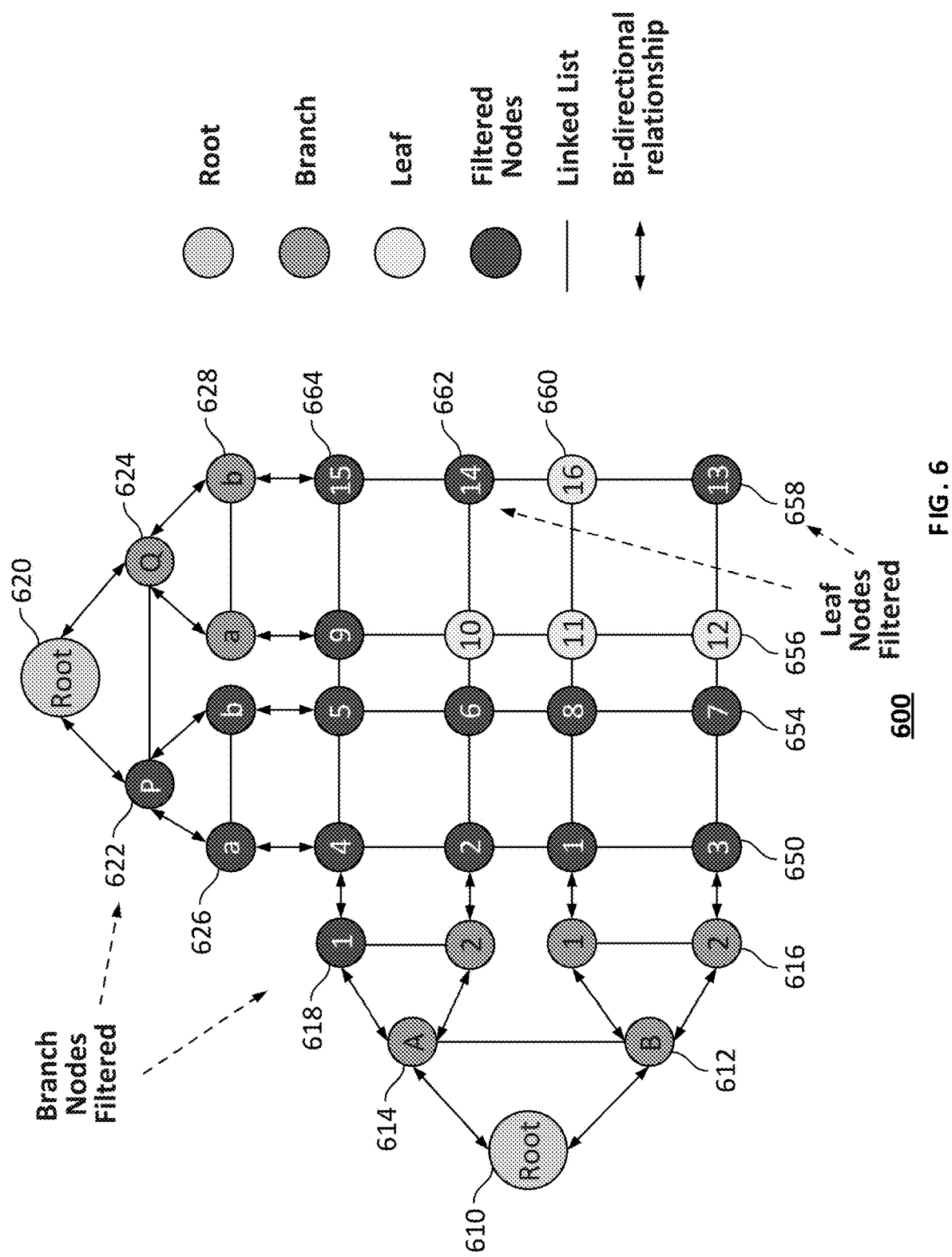
FIG. 6 illustrates an example of performing a filtering of data from a data structure according to various embodiments of the present application.

FIG. 6 illustrates an example of performing a filtering of data from a data structure according to various embodiments of the present application. In some embodiments, tree data structure 600 is implemented at least in part by system 100 of FIG. 1 and/or system 200 of FIG. 2. In the example shown, tree data structure 600 is an N-conjoined tree data structure where N=2. Tree data structure 600 can have the same relationships (e.g., linkage data) as tree structure 400 of FIG. 4.

In some embodiments, the system filters the N-conjoined tree data structure according to a filter query (e.g., a filter criteria). The filtering of the N-conjoined tree data structure comprises marking the tree node(s) to be invisible (e.g., to be excluded from the representation of the data stored in the N-conjoined tree data structure) if the data (e.g., the value stored at the particular tree node(s)) matches/satisfies the filter criteria. Marking the tree node(s) to be invisible can comprise storing metadata to indicate that the particular tree node(s) is to be invisible or otherwise excluded from the tree data. For example, the system can set a flag associated with a particular tree node (e.g., branch node) to indicate that the particular tree node is to be invisible (e.g., a flag that indicates that the value at the tree node is to be excluded when generating the representation for the tree data structure 600).

According to various embodiments, the tree node(s) that are marked invisible will be excluded from search, retrieval/ traversal, and deletion operations. If a branch node is filtered out (e.g., marked as invisible), all the descendants of such branch node will also be filtered out (e.g., (marked as invisible). A filter operation will take a time proportional to input data set size n (e.g., O(n) performance) to traverse the tree hierarchy to match the filter criteria.

A branch node can be filtered based on the determination that the branch node satisfies a filter criteria (e.g., that the entire dimension(s) defined by the branch node are to be filtered out). In the example shown, the dimensions defined by branch node 622 are filtered out and the dimension defined by branch node 618 are filtered out. As illustrated, if a branch node (e.g., branch node 622) is filtered out, then the system similarly filters out all descendants of the branch node. In this case, if branch node P (e.g., branch node 622) is filtered out, then branch nodes P-a (e.g., branch node 626) and P-b are filtered out because they are children of branch node P. Similarly, the leaf nodes that descend from P via branch nodes P-a and P-b are filtered out. For example, the leaf nodes descending from branch node P-a (e.g., branch node 626) having values 4, 2, 1, and 3 (e.g., node 650) are filtered out, and the leaf nodes descending from branch node P-b having values 5, 6, 8, and 7 (e.g., node 654) are filtered out. If the system determines that a branch node is to be marked as invisible, the system can determine those nodes that are descendants of the branch node marked invisible and correspondingly mark those nodes as invisible (e.g., the system sets the flag to indicate that the values are to be excluded). Further, if the system determines that the dimension defined by branch node A-1 (e.g., branch node 618) is to be filtered out, then the system correspondingly determines that the nodes (e.g., leaf node 664) descending from branch node A-1 are to be filtered out (e.g., the leaf nodes having values 4, 5, 9, and 15).

Based on the particular filtering criteria applied, the system may determine that a particular branch node is not to be filtered out, but that specific leaf nodes descendant from such particular branch node are to be filtered out. In the example shown, the system determines that the dimension defined by branch node Q-b (e.g., branch node 628), branch node A-2, and branch node B-2 (e.g., branch node 616) is not to be filtered out, but determines that leaf nodes 662 and 658 that are descendants of one or more of branch nodes Q-b, A-2, and B-2 are to be filtered out. Based on the filtering criteria applied in the example shown, the leaf nodes having values 10, 11, 12, and 16 (e.g., node 660) are exposed to search, retrieval, and deletion operations, or otherwise used in the generation of a representation of the data stored in tree data structure 600 (e.g., a visualization to be presented on an interface, such as a table or report). As illustrated, nodes 610, 612, 614, 620, 624, 628, 644, 656, and 660 are not marked as invisible and thus are not filtered out.

Figure 7:
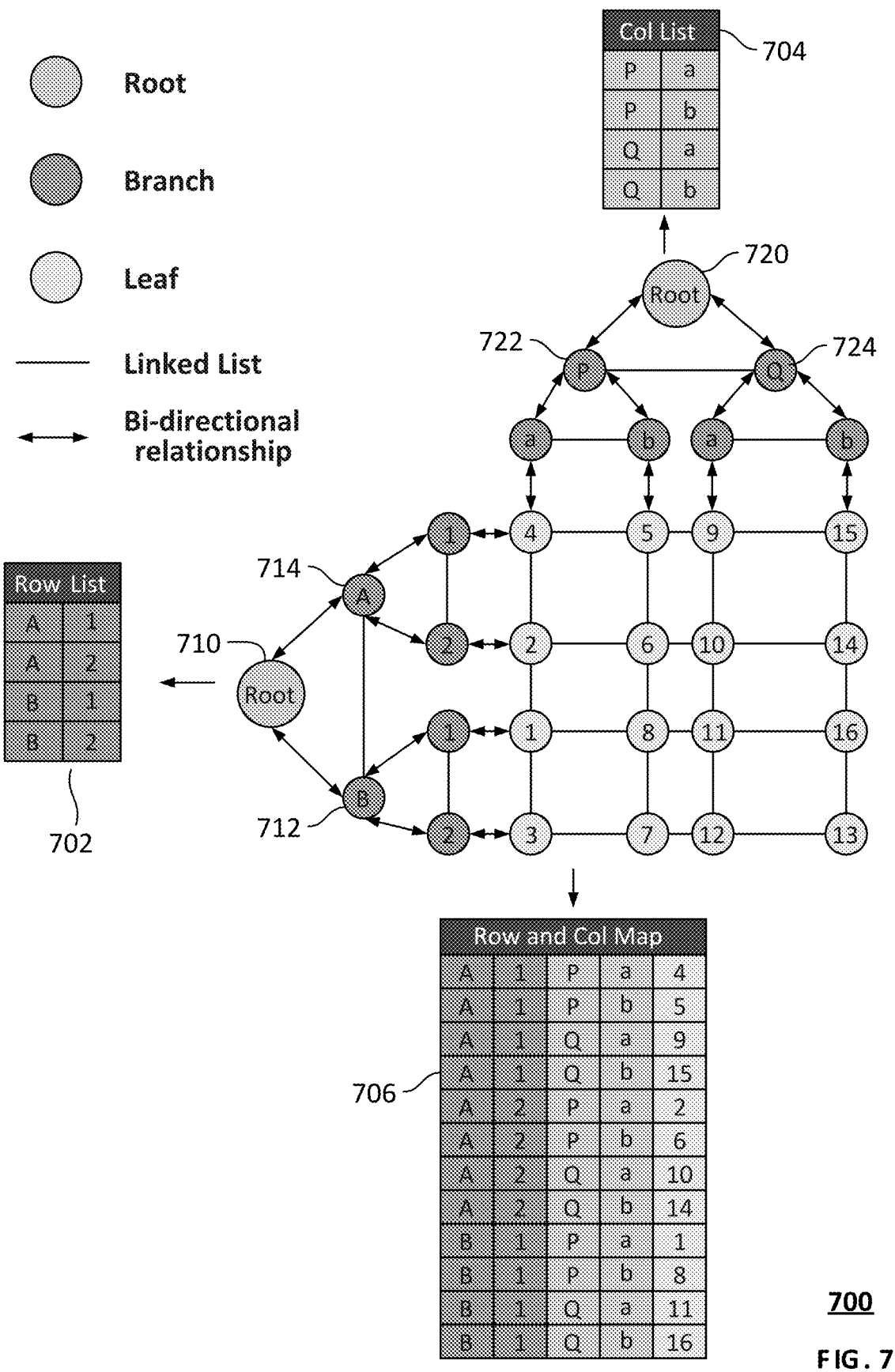
FIG. 7 illustrates an example of performing a traversal of a data structure according to various embodiments of the present application.

FIG. 7 illustrates an example of performing a traversal of a data structure according to various embodiments of the present application. In some embodiments, tree data structure 700 is implemented at least in part by system 100 of FIG. 1 and/or system 200 of FIG. 2. In the example shown, tree data structure 700 is an N-conjoined tree data structure where N=2. Tree data structure 700 can have the same relationships (e.g., linkage data) as tree structure 400 of FIG. 4.

In a conjoined twin tree, the system traverses all branch nodes and leaf nodes from either root node axis which will return a list of branch nodes for each row or column of the conjoined twin tree and a location map of the leaf nodes associated with the various branch nodes. Traversing all branch nodes and leaf nodes will take a time proportional to input data set size n (e.g., O(n) performance).

The system can traverse the N-conjoined tree to obtain information stored in tree data structure 700. For example, the system traverses the N-conjoined tree to generate tables 702, 704, and 706. In the example shown, the system traverses the tree having root node 710 to generate table 702 providing a list/table of rows in the corresponding tree, such dimensions defined by branch nodes A-1, A-2, B-1, and B-2, which are respectively descendants of branch node A (e.g., branch node 714) or branch node B (e.g., branch node 712). Similarly, the system can traverse the tree having root node 720 to generate table 704 providing a list/table of columns in the corresponding tree, such as dimensions defined by P-a, P-b, Q-a, Q-b, which are respectively descendants of branch node 722 or branch node 724. The system traverses one or more of the trees of the N-conjoined tree data structure to traverse the leaf nodes. In some embodiments, the system traverses a plurality of the trees in parallel to collectively analyze the leaf nodes, such as to obtain the leaf node values or determine those leaf nodes comprising relevant data. In the example shown, the system generates table 706 providing a mapping of leaf node values to corresponding data location (e.g., the corresponding column and row) as seen in table 702 and table 704.

Figure 8:
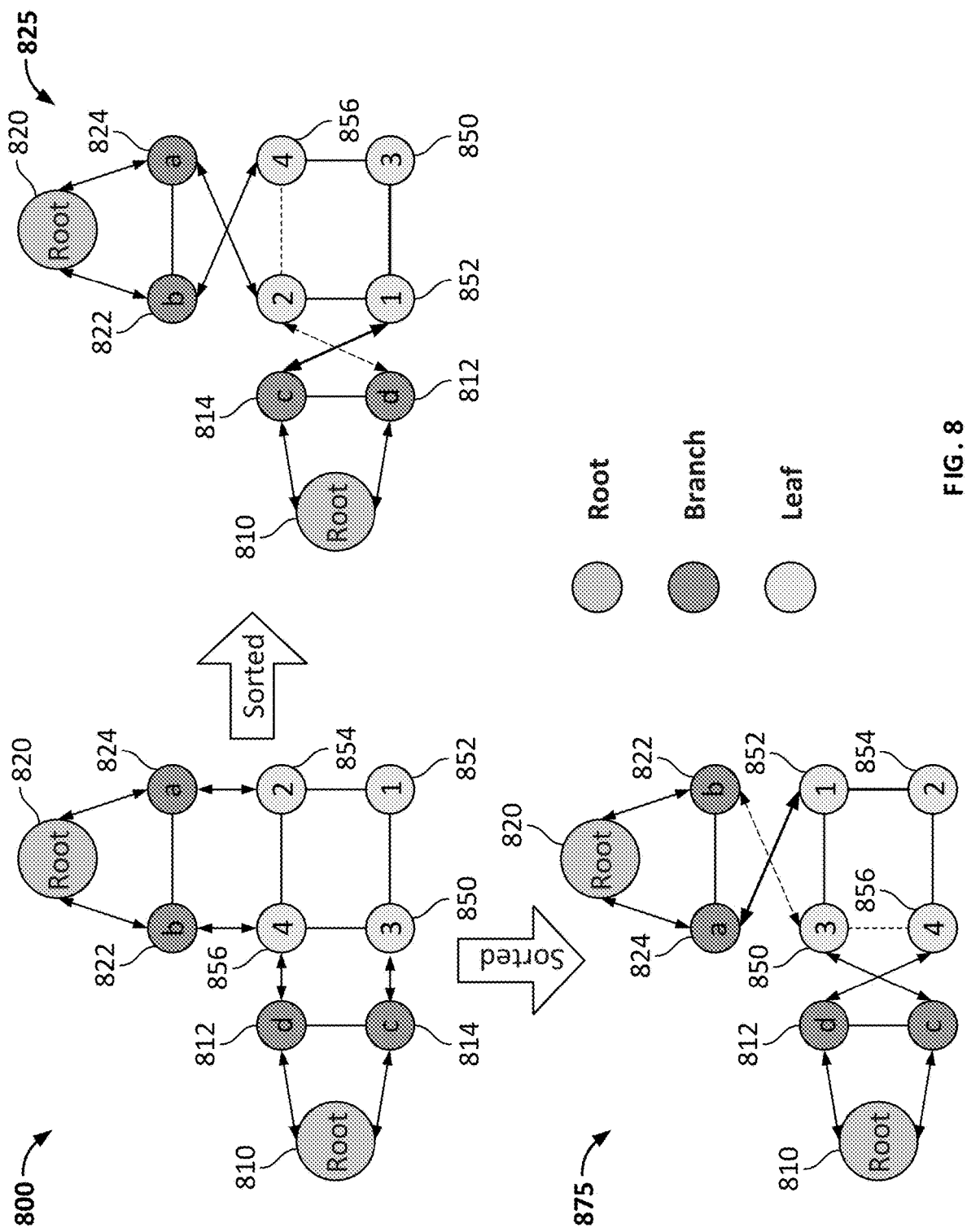
FIG. 8 illustrates an example of performing a sorting of data in a data structure according to various embodiments of the present application.

FIG. 8 illustrates an example of performing a sorting of data in a data structure according to various embodiments of the present application. In some embodiments, tree data structure 800 is implemented at least in part by system 100 of FIG. 1 and/or system 200 of FIG. 2. In the example shown, tree data structure 800 is an N-conjoined tree data structure where N=2.

Tree data structure 800 corresponds to an initial or unsorted tree data structure, comprising a horizontal tree having a root node 810 and a vertical tree having a root node 820. As illustrated, the horizontal tree has a single branch level in the tree hierarchy, comprising branch node 812 and branch node 814. The vertical tree has a single branch level, comprising branch node 824 and branch node 822.

In some embodiments, the system receives a request to rearrange nodes in tree data structure 800. The request to rearrange the nodes may include a request to rearrange the branch node in a particular tree(s) of the N-conjoined trees or a request to rearrange leaf nodes along one or more dimensions defined by a branch node(s). The request to rearrange the nodes may correspond to a sort query in which a set of nodes in the N-conjoined tree data structure are to be sorted/reordered. For example, the sort query may correspond to sorting a set of leaf nodes along a particular dimension defined by a branch (e.g., a particular branch node). In response to the sort query, the system rearranges a set of leaf nodes that are children of the particular branch in the particular tree according to the sort query, and updates position or order information for the set of leaf nodes in the N-conjoined tree data structure based on rearrangement of the set of leaf nodes along a dimension defined by the particular branch, the position information being updated without linkages for the set of leaf nodes being updated.

In some embodiments, the updating the position information for the set of leaf nodes without updating linkages for the set of leaf nodes comprises (i) change the children order withing the linked list (e.g., from root 810, the order is changed from d-c to c-d, 4-2 to 2-4, and 3-1 to 1-3, but note that the parent-child linkage is unchanged: 2 and 4 still have d as a parent and 1 and 3 still have c as parent; the order has changed but the relationship stays the same). and (ii) maintaining linkages for the set of leaf nodes with respect to the other trees in the N-tree conjoined tree data structure.

According to various embodiments, data in the dataset can be sorted from the tree level by performing a group sorting (e.g., similar to a SQL query), which means that the tree data structure enables sorting of the children and the descendants. Sorting the data in the tree data structure 800 from one axis will not change the node order in another axis. Sorting data in tree data structure 800 will cost O(M*log N) performance, where M is the depth of the tree. In some embodiments, sorting from the tree level does not sort all values in branches and leaves in sorting order as would be done when sorting data in a binary search tree.

According to various embodiments, data in an N-conjoined tree data structure can be sorted along a plurality of dimensions (e.g., contemporaneously).

Tree data structure 825 corresponds to tree data structure 800 sorted along the following dimensions (i) the branch level for the tree having root node 810 to change the ordering of branch nodes 812 and 814, (ii) the dimension defined by the branch of branch node 814 to sort leaf nodes 852 and 850 that descend from branch node 814 in an ascending order, and (iii) the dimension defined by the branch of branch node 812 to sort leaf nodes 854 and 856 that descend from branch node 812. In some embodiments, as illustrated with respect to tree data structure 825, the linkage data between nodes is maintained (e.g., the relationship between the branch node and its descendants is maintained, although the ordering or positional data of the descendants along the dimension defined by the branch node may be rearranged based on the sortation). According to various embodiments, as the system sorts the tree data structure 800, the system enforces a first rule that requires each leaf node to have an associated linkage to each tree in the N-conjoined tree data structure while reordering the data stored in the N-conjoined tree data structure in accordance with the request.

Tree data structure 875 corresponds to tree data structure 800 sorted along the following dimensions (i) the branch level for the tree having root node 820 to change the ordering of branch nodes 822 and 824 (e.g., to sort the branch nodes alphabetically, etc.), (ii) the dimension defined by the branch of branch nodes 822 to sort in an ascending order leaf nodes 850 and 856 that descend from branch node 822 (e.g., from lowest to highest as the tree is traversed from a highest leaf-level in the tree hierarchy to the lowest leaf-level), and (iii) the dimension defined by the branch of branch node 824 to sort in an ascending order leaf nodes 852 and 854 that descend from branch node 824.

According to various embodiments, operations performed with respect to data stored in the N-conjoined tree data structure are performed at the node level. Thus, each tree node type (e.g., root node, branch node, and leaf node) can implement a common tree node operation interface as described below. Examples of tree node operations include adding a node, inserting a node, deleting a node, deleting a branch, etc.

Figure 9:
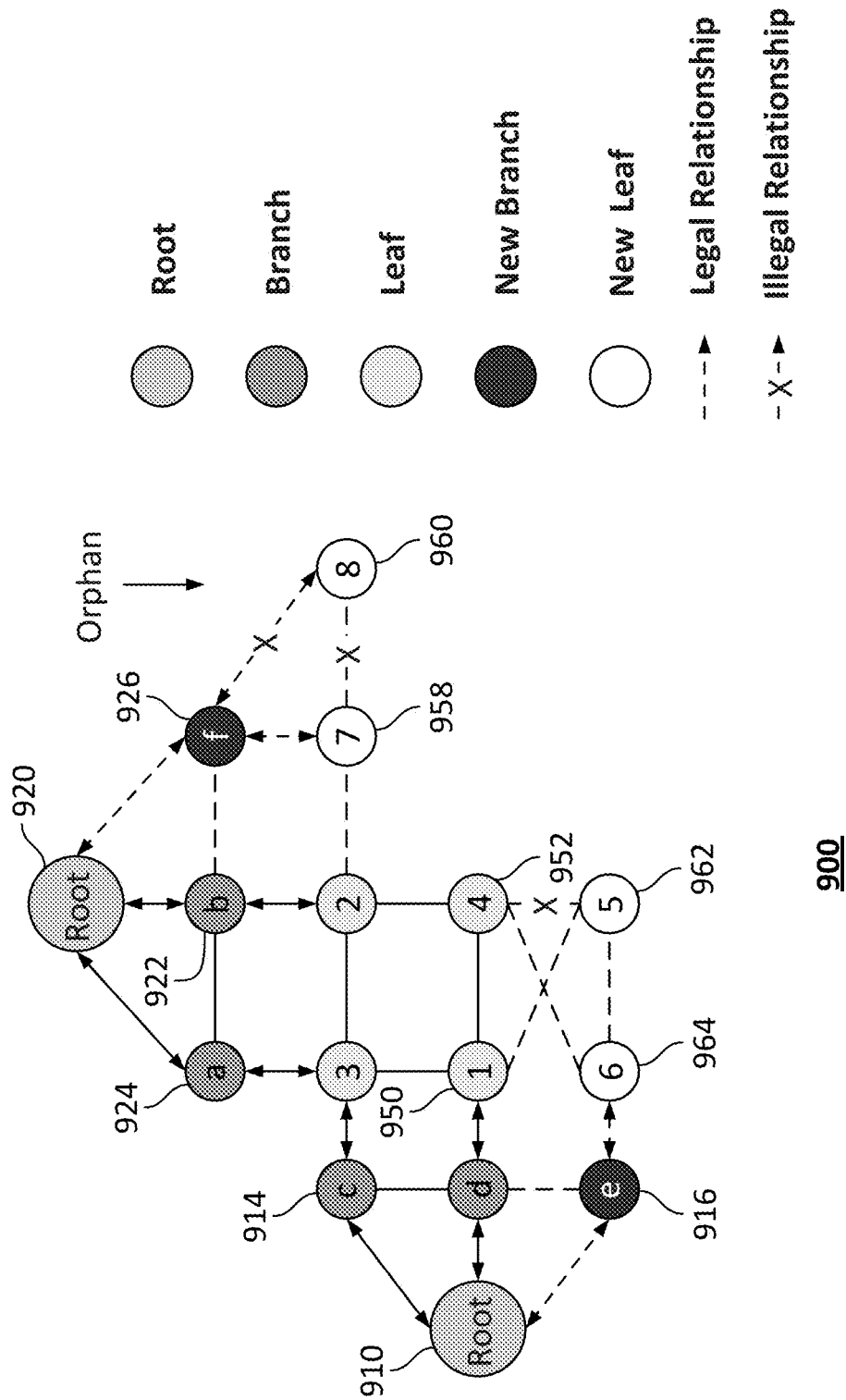
FIG. 9 illustrates an example of performing an addition or insertion of a node to a data structure according to various embodiments of the present application.

FIG. 9 illustrates an example of performing an addition or insertion of a node to a data structure according to various embodiments of the present application. In some embodiments, tree data structure 900 is implemented at least in part by system 100 of FIG. 1 and/or system 200 of FIG. 2. In the example shown, tree data structure 900 is an N-conjoined tree data structure where N=2.

The system can add a branch or node to an N-conjoined tree data structure by adding the new branch or node at the end of the children node list.

In some embodiments, the system automatically configures (e.g., sets) the parent node for a new branch node being added (contemporaneous with the branch node being added). The parent node for a new branch node can be a branch node in a higher branch-level of the tree hierarchy, or the root node if the branch node is to be added to the highest branch-level. In the example shown, branch node 926 is newly added to the end of the list of children nodes for root node 920. The parent-child relationship between root node 920 and branch node 926 is configured when branch node 926 is added. For example, the system updates the metadata for the tree data structure 900 (e.g., metadata for each leaf node that indicates parent-child relationship(s)) in connection with adding branch node 926, such as in connection with enforcing that each branch node is linked to at least one tree in the N-conjoined tree data structure. In some embodiments, branch node 922 and branch node 926 are siblings that are both part of a child list of root 920. Similarly, branch node 916 is added to the tree having root node 910. The system configures the parent-child relationship data for branch node 916 and/or root node 910 when branch node 916 is added to tree data structure 900. The system may also store position data or relationship data between root node 910 and newly added branch node 916.

In connection with adding new leaf nodes, the system can enforce a rule that each leaf node has linkage to each tree in the N-conjoined tree. For example, the system enforces the rule requiring that each (new) leaf node has a corresponding parent node for each of the N-trees. In the example shown where N=2, each new leaf node (e.g., leaf nodes 958, 962, and 964) has two parent nodes—a parent node for the tree having root node 910 and a parent node for the tree having root node 920. The system may further configure the parent-child relationship to indicate that the new leaf node is a child of the corresponding parent nodes. In the example shown, new leaf node 960 is an orphan because it has linkage to the tree having root node 910 based on its descendancy to the dimension defined by branch node 914, but does not have a linkage to the tree having root node 920 because the relationship between branch node 926 and leaf node 960 is improper/illegal (e.g., leaf node 960 cannot have the exact same parents as leaf node 958—note that branch node 926 already has a child along the dimension defined by branch node 914, which is leaf node 958).

The system can further enforce a rule that each leaf node has at most one parent node and one child node for each tree in the N-trees. For example, two different leaf nodes cannot have the same twin parent node. For example, if newly added leaf node 964 already has a parent for each of the trees (e.g., the tree having root node 910 and the tree having root node 920), such as a parent along the dimension defined by branch node 916 and a parent along the dimension defined by branch node 922, then leaf node 962 cannot have the same parent node same as leaf node 964. For this reason, the connection/relationship between leaf node 952 (e.g., a child/descendant of branch node 922) and newly added leaf node 962 is indicated to be an illegal relationship (e.g., both leaf nodes 964 and 962 in the same level of the tree hierarchy cannot share a parent). However, leaf node 962 could be added as a child node in the dimension defined by branch node 924 (e.g., leaf node 962 can be added to the end of the list defined by branch node 924, or as a child to leaf node 950).

Tree data structure 900 can be used as a temporary data structure that enables data from a dataset to be manipulated (e.g., rearranged, changed, etc.). Tree data structure 900 can then be traversed in connection with responding to queries or providing the data in a generated visualization/representation (e.g., a table or report provided on a user interface). Thus, the nodes within tree data structure 900 do not need to be reordered to ensure that the nodes are visually perpendicular to both branch parent nodes (e.g., to the dimensions defined by the branch nodes from which the node is descendant). Accordingly, in the example shown, leaf nodes 962 and 964 (e.g., the leaf nodes along the dimension defined by branch node 916) do not need to be reordered/swapped. The system stores the relationship information (e.g., the parent-child information), which can be used to traverse or otherwise represent the data stored in tree data structure 900 (e.g., transforming the N-conjoined tree into a table).

The system performance when adding a node is really fast relative to related art data structures.

In some embodiments, if the rules for adding nodes to the N-conjoined tree data structure are not enforced during the addition operation (e.g., if the system allows an orphan node to be added), then the system will encounter an error when encountering the node during traversal of the tree. For example, if the system traverses the tree and encounters a leaf node having duplicate parents for the same tree, then the system will encounter a problem when attempting to map the leaf node to the tree (e.g., the system will have a duplicate key in the map).

Figure 10:
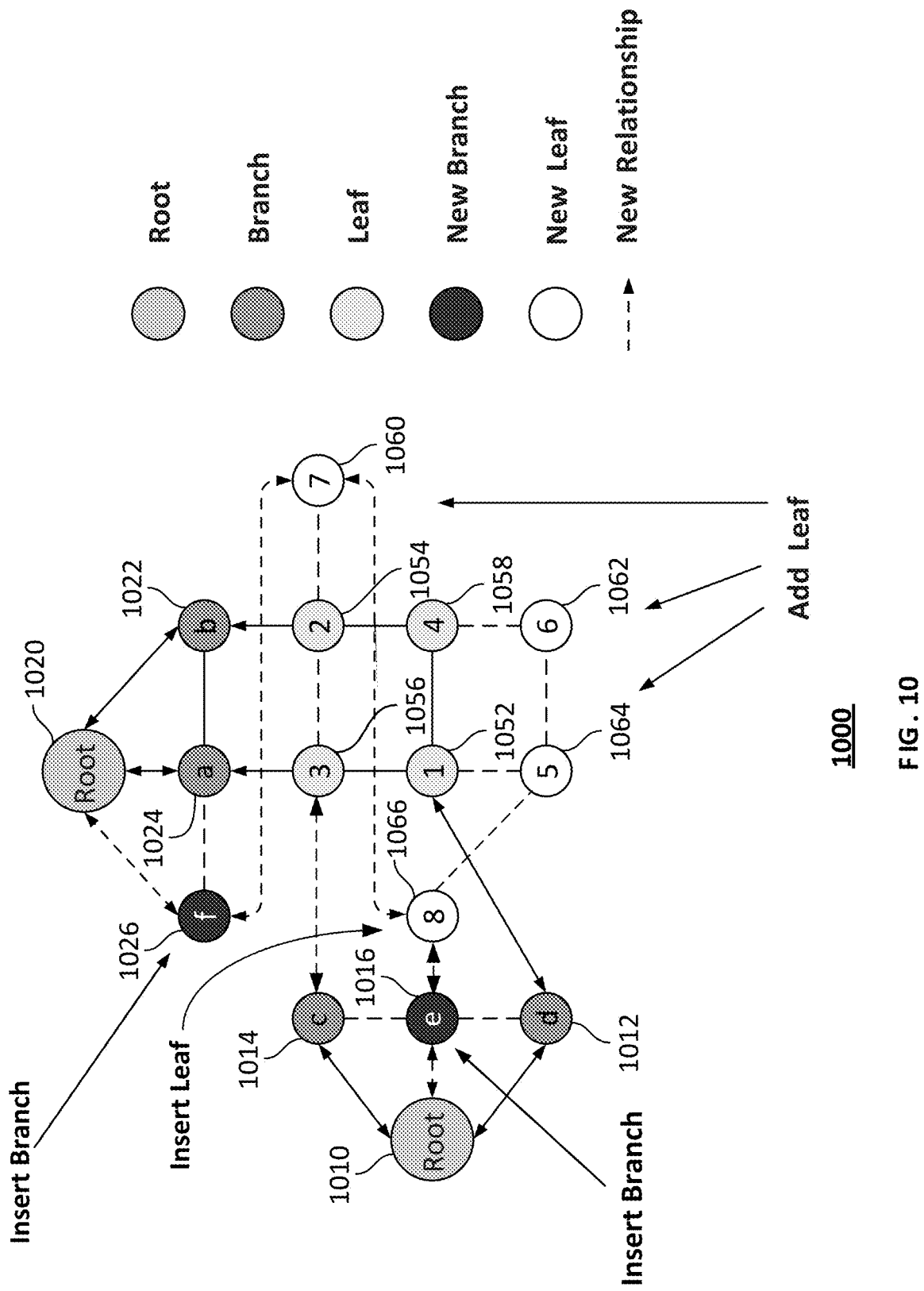
FIG. 10 illustrates an example of performing an insertion of a node to a data structure according to various embodiments of the present application.

FIG. 10 illustrates an example of performing an insertion of a node to a data structure according to various embodiments of the present application. In some embodiments, tree data structure 1000 is implemented at least in part by system 100 of FIG. 1 and/or system 200 of FIG. 2. In the example shown, tree data structure 1000 is an N-conjoined tree data structure where N=2.

The system can insert a branch or leaf node at the beginning or in the middle of children nodes. In some embodiments, the system automatically configures (e.g., sets) the parent node for a new branch node being inserted (contemporaneous with the branch node being inserted). The parent node for a new branch node can be a branch node in a higher branch-level of the tree hierarchy, or the root node if the branch node is to be inserted to the highest branch-level.

In the example shown, leaf node 1066 is inserted in the beginning of the child list of new branch 1016 and is automatically added at the end of the child list of new branch 1026.

In the example shown, branch node 1026 is inserted at the beginning of the branch-level in the tree hierarchy for the tree having root node 1020. New leaf nodes added as children for the dimension defined by new branch node 1026 can be inserted at the beginning of the list/dimension defined by branch node 1016 in the other tree of tree data structure 1000. The system stores (e.g., in metadata for the tree data structure 1000 or the corresponding node(s)) the linkage data for the new leaf node 1060 with respect to each of the N-trees. Accordingly, the leaf nodes along the dimension defined by branch node 1014 do not need to be reordered to be perpendicular to both dimensions with which new leaf node 1060 is associated. Accordingly, if the system inserts leaf nodes in the dimension defined by a particular branch node, the system is not required to perform an insertion at a particular location on the other parent (e.g., the other dimension defined by a branch node of the other tree). As an example, the other parent (e.g., the branch node for the other tree) can simply add the new leaf node at the end of its children list (e.g., the system stores the metadata associated with the branch node to include an indication that the leaf node is associated with the branch node). Alternatively, leaf node 1066 can be inserted to descend from branch node 1026 for the tree having root node 1020 and to descend from branch node 1014 for the tree having root node 1010.

Another example of the insertion of a branch as illustrated in FIG. 10 is the insertion of branch node 1016. The system automatically stores linkage data indicating the parent for the branch node, which in the example shown is root node 1010. New leaf nodes can be added as children/descendants to branch node 1016. For example, in response to receiving a leaf node insertion request, the system adds leaf node 1064 as a child of branch node 1016 for the tree having root node 1010 and as a child/descendant of branch node 1024 for the tree having root node 1020. Similarly, the system can add leaf node 1062 as a descendant of branch node 1016 (e.g., a child of new leaf node 1064 or branch node 1016) and a descendant of branch node 1022 of the tree having root node 1020.

In the example shown, with the insertion of branch node 1016 and 1026, the linkage data between 1012 and 1056 and/or 1058 is maintained, for example, because no corresponding leaf node has been added for the location defined by branch node pair 1012, 1026. With the insertion of leaf node 1066, the children for the dimension defined by branch node 1014 includes leaf nodes 1066, 1056, 1054, and 1060.

In connection with inserting new leaf nodes, the system can enforce a rule that each leaf node has linkage to each tree in the N-conjoined tree. For example, the system enforces the rule requiring that each (new) leaf node has a corresponding parent node for each of the N-trees. For each tree, the system thus sets (e.g., stores metadata indicating) the leaf node to be a child along a dimension defined by a branch node of the particular tree. The system can additionally enforce a rule that requires that each leaf node has a single (e.g., at most a single) associated parent node for each tree. Additionally, or alternatively, the system enforces a rule that requires that each leaf node has at most a single associated child node for each tree.

According to various embodiments, in response to insertion of a new branch, the system updates the N-conjoined tree data structure to comprise metadata associated with the new branch node, the metadata comprising an indication of a relationship between the new branch node and one or more of (i) the root node for the particular tree and (ii) another branch in a higher branch-level in a hierarchy of the particular tree. In some embodiments, between siblings (e.g., branch node 1016 has siblings branch node 1012 and branch node 1014), there are no relationships defined. In some embodiments, in connection with inserting a new branch, the system changes the N-conjoined tree data in accordance with the request to add a new branch, including adding a new branch node to a particular tree of N-trees in the N-conjoined tree data structure. The new branch node is added as a child of a root node for the particular tree or another branch in a higher branch-level in a hierarchy of the particular tree.

According to various embodiments, in response to insertion of a new leaf node, the system (i) changes the N-conjoined tree data in accordance with the request to insert a new leaf node that comprises inserting the new leaf node to the N-conjoined tree data structure, (ii) stores a linkage between the new leaf node and each tree in the N-conjoined tree data structure, and (iii) updates linkages of existing leaf nodes to a corresponding parent node and/or child node based on an insertion of the new leaf node.

When a leaf node is inserted to a particular branch, the system does not need to perform an insertion at a particular location on the other parent. Rather, the system can add the leaf node to the children list (e.g., update the linkage metadata) for the other parent (e.g., the other branch node of the other tree for which the leaf node is a descendant).

According to various embodiments, inserting a branch node at the beginning of the list (e.g., as a first branch node in a particular branch-level of the tree hierarchy) will have an O(1) performance (e.g., constant performance—the cost of inserting a node at the beginning of a list of 100 elements has the same performance as the cost of inserting a node at the beginning of a lost of 1000 elements). In contrast, inserting a branch node in the middle of the list will have an O(n) performance (e.g., linear performance according to the size of the data—the cost of inserting a tree node at index 100 would need to walk 100 steps to find the location before inserting the node).

Figure 11:
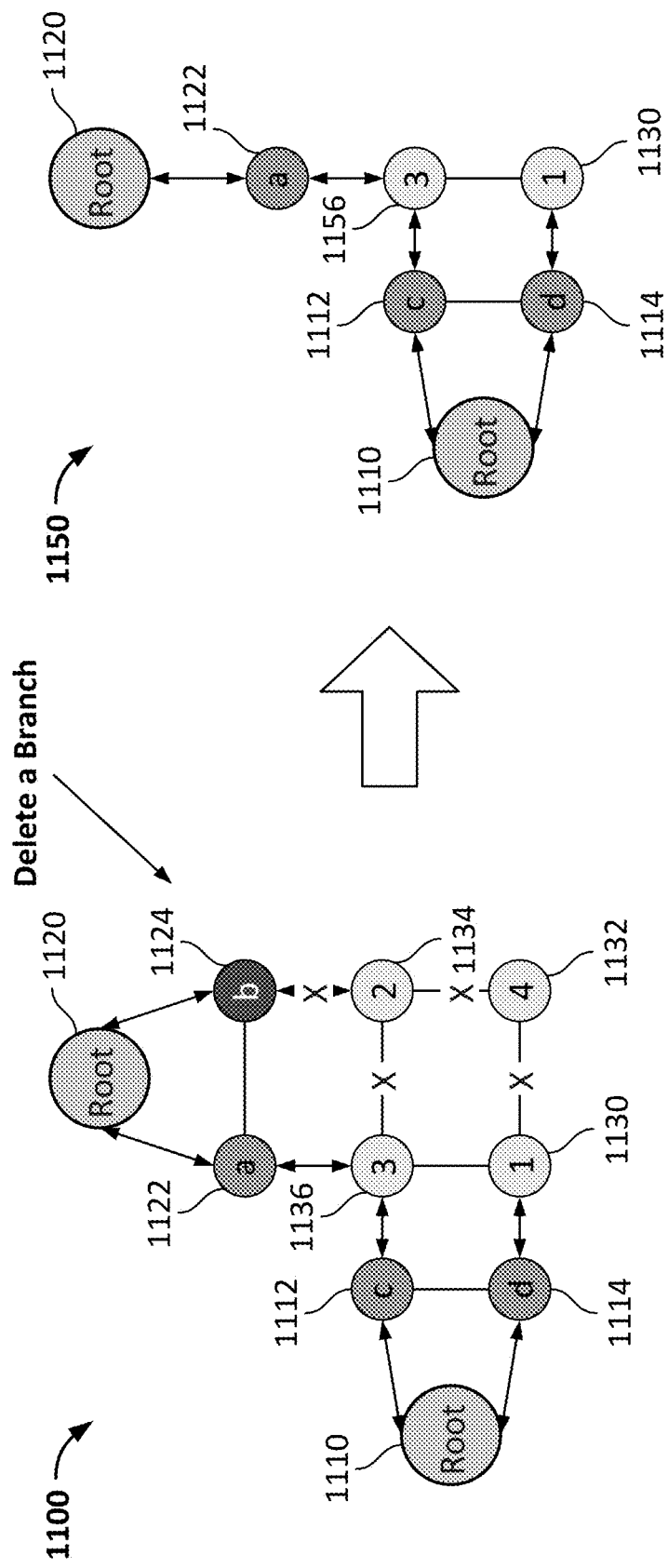
FIG. 11 illustrates an example of performing a deletion of a branch to a data structure according to various embodiments of the present application.

FIG. 11 illustrates an example of performing a deletion of a branch to a data structure according to various embodiments of the present application. In some embodiments, tree data structure 1100 is implemented at least in part by system 100 of FIG. 1 and/or system 200 of FIG. 2. In the example shown, tree data structure 1100 is an N-conjoined tree data structure where N=2.

The system may obtain a request to change tree data structure 1100. The request to change tree data structure 1100 may comprise a request to delete a particular branch node from a particular tree in the N-conjoined tree data structure. For example, the system receives a request to delete a particular dimension from the N-conjoined tree data structure.

According to various embodiments, deleting a branch (e.g., a dimension for a particular branch node) comprises deleting all descendants of the branch. The deletion of the branch severs all descendants of that branch, and the system enforces the rule that requires each leaf node to have a linkage to each tree in the N-conjoined tree data structure. Thus, when the system deletes a branch or branch node, the system correspondingly deletes all descendants of the branch node (e.g., the branch node(s) of a lower branch-level that is a child of the deleted branch node, the leaf node(s) that are descendants of the deleted branch node, etc.).

In the example shown, the branch corresponds to the dimension defined by branch node 1124 of the tree having root node 1120. In response to receiving the request to delete branch node 1124, the system deletes branch node 1124 and correspondingly deletes leaf nodes 1134 and 1132 because they are descendants of branch node 1124. The system thus obtains the modified tree data structure 1150. In response to receiving the request to delete a branch node, the system determines the descendants of the branch node to be deleted, such as by querying the metadata for the N-conjoined tree data structure (e.g., the metadata for the branch nodes, such as a list of child nodes, etc.). As shown in modified tree data structure 1150, the system does not delete leaf nodes 1130 and 1136, which are descendants of branch node 1122. Further, the leaf nodes 1132 and 1134 are deleted for the tree having root node 1110 and the system can update the metadata for the dimensions defined by branch nodes 1112 and 1114. For example, the system removes leaf nodes 1132 and 1134 from the child lists for branch nodes 1112 and 1114, respectively.

In some embodiments, if a leaf node gets deleted in connection with deletion of a branch (e.g., deletion of the dimension to which the leaf node is a descendant), the system also deletes the leaf node from the other parent. Therefore, deleting a branch node will indirectly delete the leaf nodes as children for the other branch node (e.g., the branch node defining a dimension in the other tree).

The system deletes the leaf nodes that are descendants of a branch node to be deleted because the system enforces two rules: (a) the N-conjoined tree data structure cannot have orphan nodes, and (b) the N-conjoined tree data structure cannot have a conflict.

In some embodiments, root nodes cannot be deleted from the N-conjoined tree data structure.

Deletion of the branch takes an O(n) performance (e.g., the performance scales as the size of the data (n)) because the system needs to delete the leaf from another branch iteratively. In contrast, deleting a single leaf node from branch node children will take O(1 performance (e.g., the performance is constant regardless of the sized of the data). Root nodes cannot be deleted from the tree.

Figure 12:
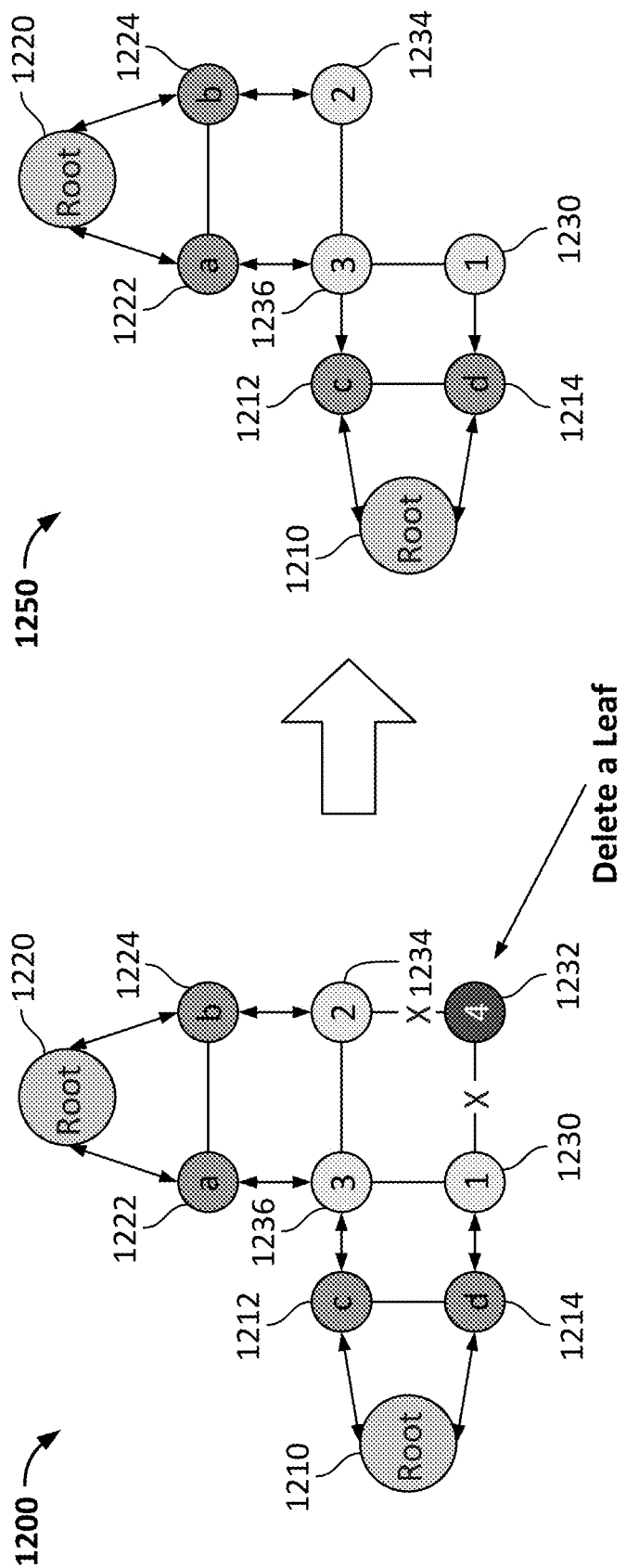
FIG. 12 illustrates an example of performing a deletion of a leaf node to a data structure according to various embodiments of the present application.

FIG. 12 illustrates an example of performing a deletion of a leaf node to a data structure according to various embodiments of the present application. In some embodiments, tree data structure 1200 is implemented at least in part by system 100 of FIG. 1 and/or system 200 of FIG. 2. In the example shown, tree data structure 1200 is an N-conjoined tree data structure where N=2.

The system may obtain a request to change tree data structure 1200. The request to change tree data structure 1200 may comprise a request to delete a particular leaf node(s) from the N-conjoined tree data structure. In the example shown, the system obtains a request to delete leaf node 1232. The system deletes leaf node 1232 to obtain the modified tree data structure 1250. As shown, the leaf node 1232 is deleted from each tree in the N-trees of the N-conjoined tree data.

Leaf node 1232 is a descendant of (i) the dimension defined by branch node 1224 of the tree having root node 1220, and (ii) the dimension defined by branch 1214 of the tree having root node 1210. In response to receiving the request to delete leaf node 1232, the leaf node 1232 is deleted without impacting the other leaf nodes descending from the branch nodes to which leaf node 1232 is a descendant. For example, as shown in modified tree data structure 1250, the system maintains leaf nodes 1230, 1234, and 1236. The other dimensions (e.g., the dimensions defined by branch nodes 1212 and 1222) are not modified by the deletion of leaf node 1232 because leaf node 1232 does not have linkages to those other dimensions.

Figure 13:
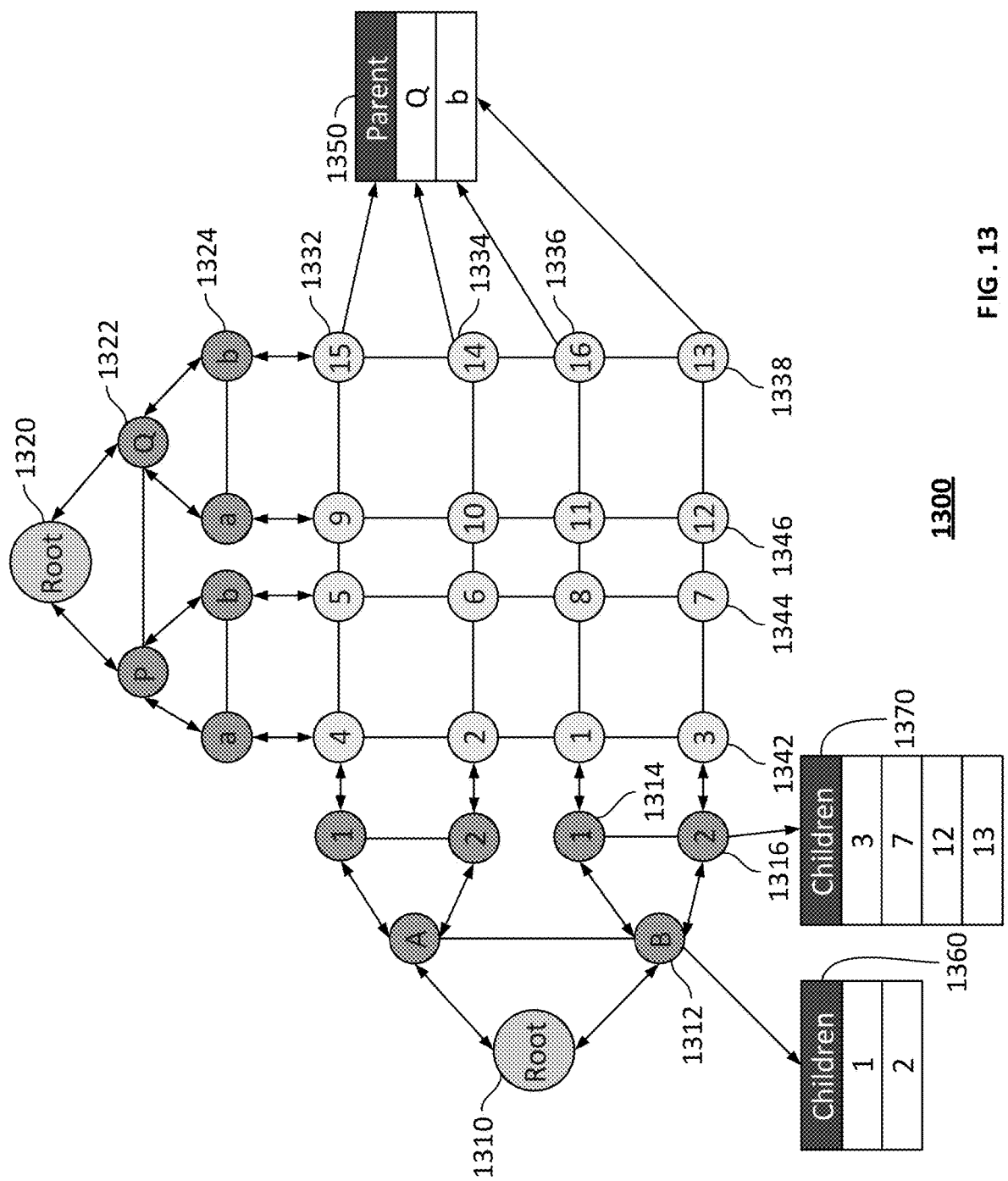
FIG. 13 illustrates an example of performing a retrieval of data from a data structure according to various embodiments of the present application.

FIG. 13 illustrates an example of performing a retrieval of data from a data structure according to various embodiments of the present application. In some embodiments, tree data structure 1300 is implemented at least in part by system 100 of FIG. 1 and/or system 200 of FIG. 2. In the example shown, tree data structure 1300 is an N-conjoined tree data structure where N=2 from which a simple retrieval of child and parent data is shown.

In the example shown, tree data structure 1300 comprises metadata indicating parent-child relationships among nodes. For example, branch node 1322 of the tree having root node 1320 has two children: branch node Q-a and branch node Q-b (e.g., branch node 1324). Branch node Q-b has further descendants: leaf nodes 1352-1358. The system can store metadata indicating the parent-children relationships among branch node Q-b and leaf nodes 1352-1358. For example, as illustrated, the tree data structure 1300 comprises a parent list 1324 that identifies the parent node for leaf nodes 1332-1338. The indication that branch node 1324 is a parent to each of leaf nodes 1332-1338 can be stored in association with the dimension defined by branch node 1324 or in association with each of leaf nodes 1332-1338.

As another example, tree data structure 1300 can comprise children lists that identify the children for a particular node. For example, the system can store metadata for branch node 1312 of the tree having root node 1310. The metadata can correspond to children list 1360 that identifies the children of branch node 1312, which in this example is branch node 1314 and branch node 1316. Similarly, the system can store metadata for branch node 1316 (or the dimension defined by branch node 1316) indicating the descendants of branch node 1316. For example, the system stores a children list 1370. The metadata (e.g., children list 1360) indicates that leaf nodes 1372, 1374, 1376, and 1358 are descendants of branch node 1316.

The system can perform a retrieval operation, such as to retrieve a particular value in tree data structure 1300 based on a query, or in connection with generating a visualization or representation of the data stored in tree data structure 1300.

According to various embodiments, the system can retrieve a list of children nodes and parent nodes (in hierarchical order) for a particular branch node. However, the system can retrieve parent nodes for leaf and/or branch nodes in the N-conjoined tree data structure. The parent node recorded for each leaf node may be the lowest branch-level branch node from which the particular leaf node descends. Accordingly, the system stores metadata for the N-conjoined tree data structure, which includes an indication of a parent and a child for each branch node, and an indication of a parent node (e.g., the lowest branch-level branch node from which the leaf node is descendant) for each leaf node. In some embodiments, the system does not store children information for leaf nodes in the N-conjoined tree data structure because leaf nodes have no children.

Retrieving children nodes will take O(1) performance while retrieving parent nodes will take O(n) performance (n is the depth of the tree).

Figure 14A:
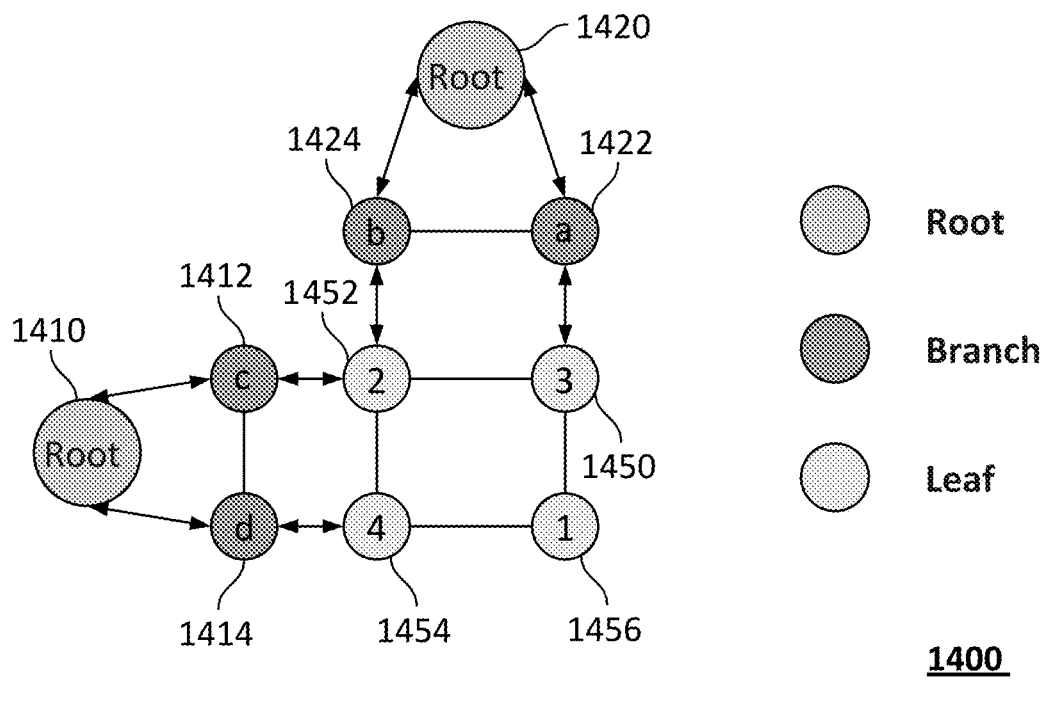
FIG. 14A illustrates an example of a data structure prior to sorting according to various embodiments of the present application.

FIG. 14A illustrates an example of a data structure prior to sorting according to various embodiments of the present application. In some embodiments, tree data structure 1400 is implemented at least in part by system 100 of FIG. 1 and/or system 200 of FIG. 2. In the example shown, tree data structure 1400 is an N-conjoined tree data structure where N=2. Tree data structure 1400 illustrated in FIG. 14A is the unsorted N-conjoined tree data structure.

Figure 14B:
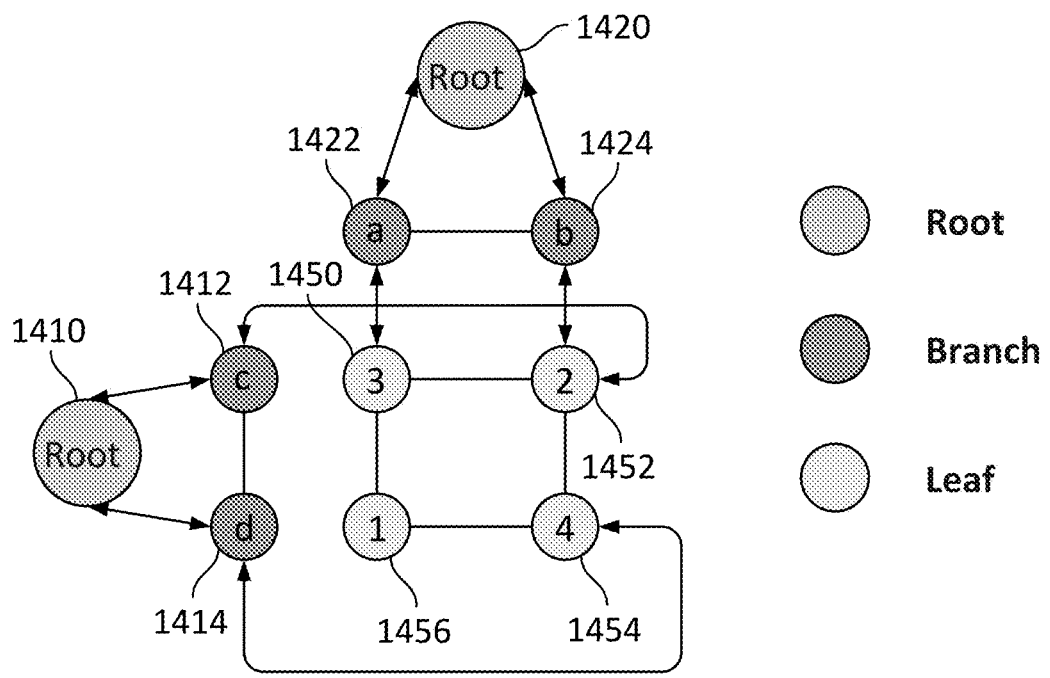
FIG. 14B illustrates an example of performing a sorting of branch nodes in the data structure according to various embodiments of the present application.

FIG. 14B illustrates an example of performing a sorting of branch nodes in the data structure according to various embodiments of the present application. In the example shown, tree data structure 1400 is sorted along a dimension defined by a set of branch nodes, such as the branch nodes of the tree having root node 1420, to obtain a reordered tree data structure 1425. In response to receiving a request to reorder the data in tree data structure 1400, the system sorts the tree having root node 1420 along the branch nodes in accordance with the sort query/request. For example, the system sorts the branch nodes 1422 and 1424 alphabetically by reordering branch nodes 1422 and 1424.

In connection with reordering branch nodes 1422 and 1424 based on the requested sortation, the system does not automatically reorder the leaf nodes descending from the branch nodes 1422 and 1424. Note that in the Figure the order stays the same (e.g., the arrow direction does not change). For example, the system does not reorder the leaf nodes on a tree-layer by tree-layer basis for the tree having root node 1420 so that leaf nodes 1450 and 1452 in the highest leaf-level are swapped and leaf nodes 1454 and 1456 in the lowest leaf-level are swapped, but the arrow directions are the same. The system reorders leaf nodes 1450 and 1452 so that they maintain their relationship with branch nodes 1422 and 1424. However, the system maintains the linkage data along the dimensions defined for the tree having root node 1410. For example, the system maintains the linkage between branch node 1412 and leaf node 1452 as depicted by the arrow connecting both nodes. Similarly, the system maintains the linkage between branch node 1414 and leaf node 1454.

According to various embodiments, sorting from the tree level will do a group sorting (like in SQL query), and as an option the system can sort the children as well as the descendants. Sorting nodes along one axis will not change the node order in the other axis. Sorting from the tree will cost O(M*log N) performance where M is the depth of the tree.

In some embodiments, when the system sorts the children of the vertical root as illustrated in FIG. 14B, the system simply changes the order from 'b' to 'a' to 'a' to 'b' (e.g., reorders branch nodes 1422 and 1424). However, the system does not change the order of the children nodes of branch nodes 'c' and 'd' (e.g., branch nodes 1412 and 1414) of the other tree(s).

Figure 14C:
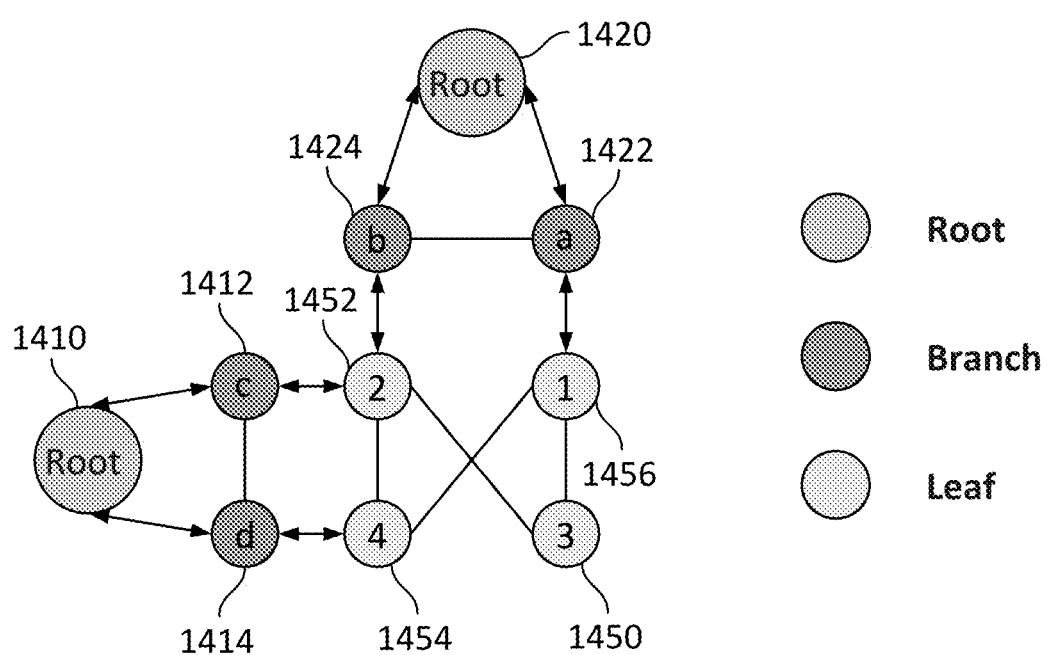
FIG. 14C illustrates an example of performing a sorting of leaf nodes in a data structure according to various embodiments of the present application.

FIG. 14C illustrates an example of performing a sorting of leaf nodes in a data structure according to various embodiments of the present application. In the example shown, leaf nodes of the tree data structure 1400 are sorted along a dimension defined by a branch node(s), such as the branch node 1422, to obtain a reordered tree data structure 1475. In response to receiving a request to reorder the data in tree data structure 1400, the system sorts the tree having root node 1420 along the dimensions defined by branch node 1422 to sort the leaf nodes in an ascending leaf node value order so that a lowest leaf node value along the particular dimensions is positioned at a first index location while the highest leaf node value is positioned at a second index location within the list (e.g., there are no layers for leaf nodes since they are all at the same level within the tree). For example, the system sorts the tree along the dimension defined by branch node 1422 by reordering the leaf nodes ascending (e.g., 1→3) from branch node 1422 (e.g., leaf nodes 1450 and 1456).

Sorting along the dimension defined by branch node 1422 does not change the order of leaf nodes along the dimensions defined by other branch nodes in the same branch-level of the tree having root node 1420 or the dimensions defined by the branch nodes in the other trees of the N-conjoined tree data structure (e.g., the dimensions defined by branch nodes 1412 and 1414 of the tree having root node 1410). Accordingly, the system does not need to re-order the horizontal axis position of the leaf nodes when we sort either the branch nodes' or leaf nodes' children along a vertical axis because the node order does not change from the horizontal axis perspective. The horizontal axis structure is still consistent without the need to re-arrange the branch and leaf node positions in order to make it symmetrical. Without relocation, sorting the child nodes from the root or branch node costs only O(log N) performance.

In order to transform the Conjoined Twin Tree into a pivot table, the tree is traversed from both of the tree roots. Normally, trees are traversed by starting from the root down to the leaf, however traversing the Conjoined Twin Tree goes three different directions: (1) traversing the branch nodes from the vertical root nodes to retrieve branch node data from the vertical axis which normally represents column dimension data of a pivot table; (2) traversing the branch nodes from the horizontal root nodes to retrieve branch node data from the horizontal axis which normally represents row dimension data of a pivot table; and (3)

traversing the leaf nodes from any axis direction to retrieve leaf node data which normally represents the value data of a pivot table.

Figure 15:
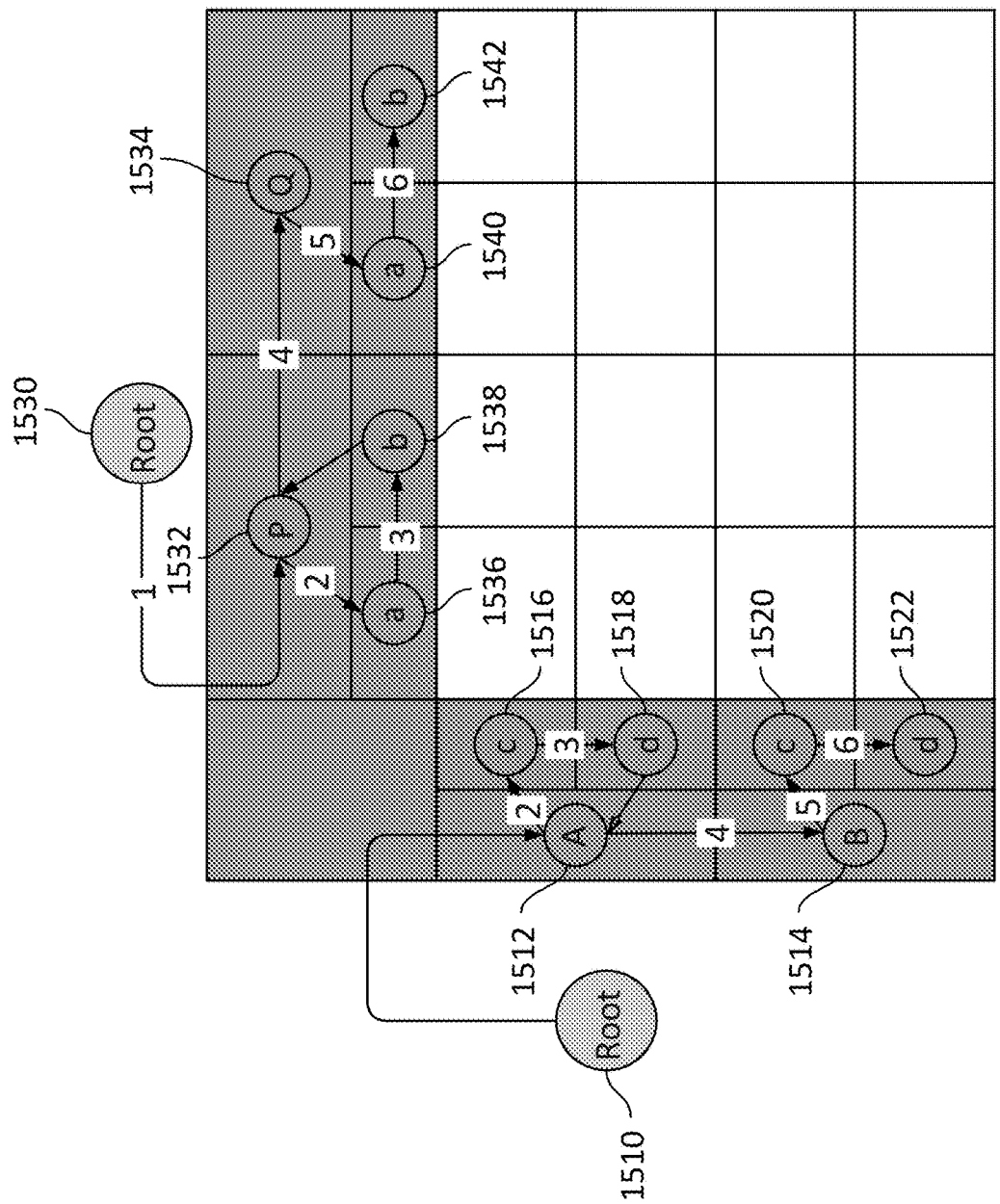
FIG. 15 illustrates an example of traversing branch nodes in a data structure according to various embodiments of the present application.

FIG. 15 illustrates an example of traversing branch nodes in a data structure according to various embodiments of the present application. In some embodiments, tree data structure 1500 is implemented at least in part by system 100 of FIG. 1 and/or system 200 of FIG. 2. In the example shown, tree data structure 1500 is an N-conjoined tree data structure where N=2.

According to various embodiments, the system traverses the branch nodes of an N-conjoined tree data structure, such as to define or plot the table headers (e.g., row or column, etc.) of a pivot table. For example, the system traverses the branch nodes in connection with generating a visualization or representation of the data based on the N-conjoined tree data structure. The system can traverse the branch nodes by sequentially scanning branch nodes for each tree in the N-conjoined tree data structure. The branch nodes for different trees in the N-conjoined tree data structure can be traversed in parallel (e.g., by different threads or services).

When traversing the branch nodes, the system started from the root of either tree in the conjoined twin tree data structure (e.g., where N=2 for the N-conjoined tree data structure). The system follows a traversal direction of the branch nodes based on the depth order from the top (root node) hierarchy to the bottom (last branch node excluding the leaf nodes) of the branch-levels in the tree hierarchy before traversing to next children of the branch nodes in each level.

In the example shown, traversal of the horizontal tree (e.g., the tree having root node 1510) of tree data structure 1500 starts at root node 1510. The system proceeds to branch node 1512 and then sequentially traverses the depth of branch nodes descendent from branch node 1512 before moving to branch node 1514. For example, after scanning branch node 1512, the system proceeds to the next branch-level in the tree hierarchy and sequentially scans the branch nodes at such branch level. The system sequentially scans branch node 1516 (e.g., a child of branch node 1512), and branch node 1518.

After all branch-levels for branch nodes descend from the particular branch node in the highest branch-level of the tree hierarchy, the system proceeds to the next branch node in the highest branch-level of the tree hierarchy. For example, after scanning branch node 1518, the system proceeds to branch node 1514 and scans branch node 1514 and then traverses the depth of the branch-levels in the tree hierarchy for branch nodes descendant from branch node 1514. After scanning branch node 1514, the system proceeds to the next branch-level in the tree hierarchy and sequentially scans branch nodes 1520 and 1522. Upon scanning of branch node 1522, the system has completed traversing the branch nodes for the tree having root node 1510.

Similarly, the system can traverse the tree having root node 1530. The system begins traversal of the tree having root node 1530 by scanning branch node 1532. After scanning branch node 1532, the system traverses the depth of the branch-levels in the tree hierarchy for branch nodes descendant of branch node 1532 before proceeding to traversing other branch nodes in the highest branch-level of the tree hierarchy and their corresponding descendant branch nodes. For example, after scanning branch node 1532, the system proceeds to the next lower branch-level (e.g., in this case the lowest branch-level) and sequentially scans branch nodes 1536 and 1538. After scanning all descendant branch nodes for branch node 1532, the system returns to the highest branch-level and scans branch node 1534. The system then scans the depth of branch nodes through the branch-levels of the tree hierarchy for branch nodes descendant from branch node 1534. For example, after scanning branch node 1534, the system proceeds to next lower branch-level and sequentially scans branch nodes 1540 and 1542.

Figure 16:
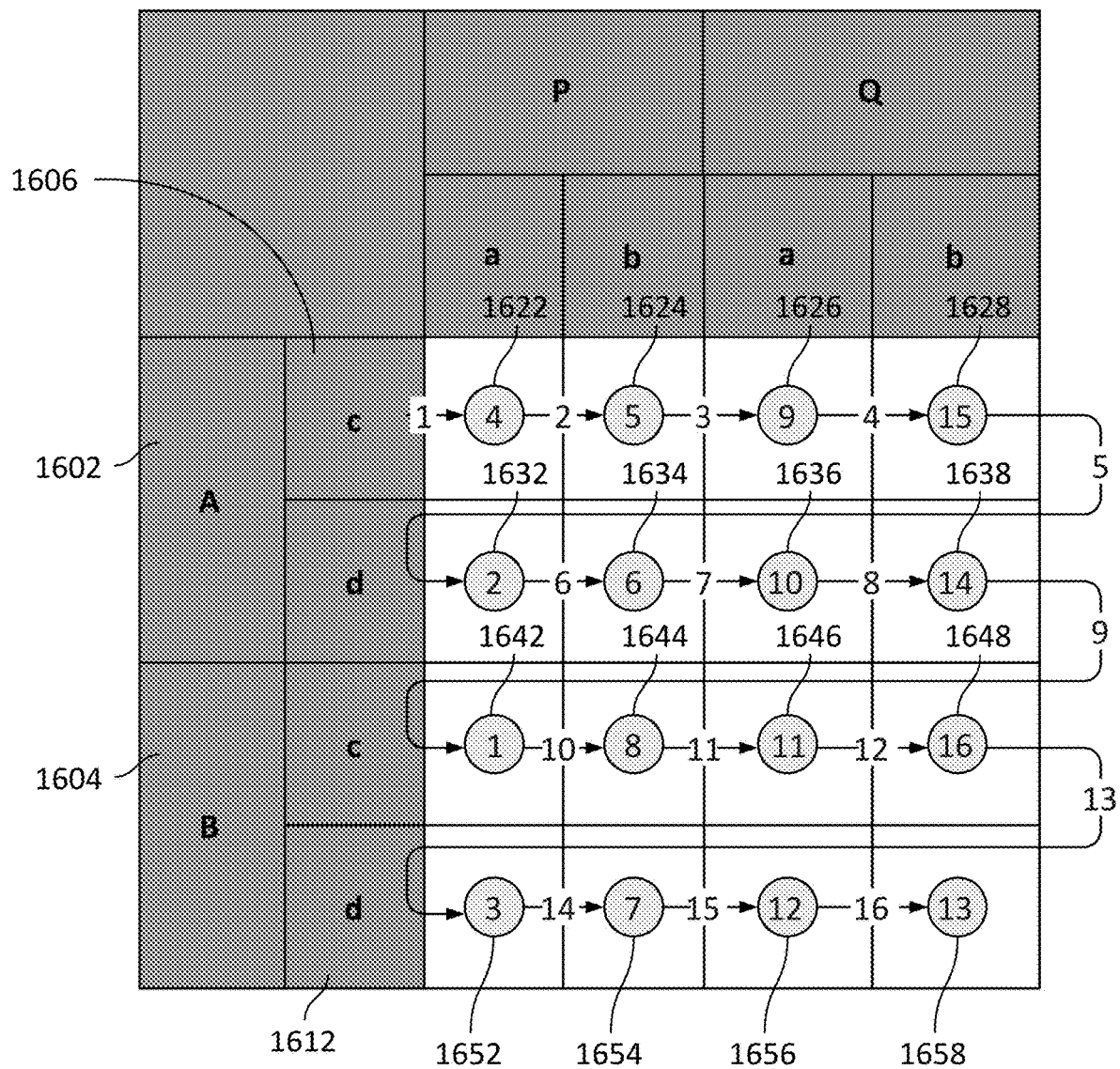
FIG. 16 illustrates an example of traversing leaf nodes in a data structure according to various embodiments of the present application.

FIG. 16 illustrates an example of traversing leaf nodes in a data structure according to various embodiments of the present application. In some embodiments, tree data structure 1600 is implemented at least in part by system 100 of FIG. 1 and/or system 200 of FIG. 2. In the example shown, tree data structure 1600 is an N-conjoined tree data structure where N=2.

In some embodiments, the system traverses the leaf nodes in the tree data structure 1600 after the branch nodes for the tree(s) have been scanned. For example, after the branch nodes for a particular tree in the N-conjoined tree data structure and the data for such branch nodes are stored in a branch nodes list (e.g., the identifiers or values for the branch nodes), the system traverses the leaf nodes by sequentially scanning the leaf node descendant for each branch node in the branch nodes list.

In the example shown, where the N-conjoined tree is a conjoined twin tree (e.g., N=2), because the system enforces the rule that a leaf node must have linkages to both trees, each leaf node always has two parents (e.g., each leaf node is a descendant of two branch nodes—a branch node for each tree). The system begins traversing the leaf nodes within the N-conjoined tree data structure by starting from the first branch node in the lowest branch-level of the tree hierarchy for the particular tree (e.g., the first branch nodes from one or more of the horizontal or vertical axis in the tree). In some embodiments, the system traverses the tree from the root of one dimension. In some embodiments, the system can traverse a plurality of the trees in parallel. For example, the system contemporaneously traverses the leaf nodes via traversing the vertical tree (e.g., the tree having root node 1530 in FIG. 15) and the leaf nodes via traversing the horizontal tree (e.g., the tree having root node 1510 in FIG. 15). If the system traverses the horizontal tree by starting from a horizontal branch node, the traversal direction will be going from left to right. Conversely, if the system traverses the vertical tree by starting from a vertical branch node, the traversal direction will be going from top to bottom.

In the example shown, the system traverses the horizontal tree from branch node 1606. For example, after traversing the branch nodes 1602, 1604, 1606, 1608, 1610, and 1612, such as described in connection with FIG. 15, the system begins traversing the horizontal tree from branch node 1606. The system traverses the dimension defined by branch node 1606 by sequentially scanning each leaf node in the dimension, including leaf nodes 1622, 1624, 1626, and 1628; and then the system sequentially traverses the dimensions (e.g., the dimensions defined by branch nodes 1608, 1610, and 1612). For example, after traversing the dimension defined by branch node 1606, the system traverses the dimension defined by branch node 1608 by sequentially scanning leaf nodes 1632, 1634, 1636, and 1638. After traversing the dimension defined by branch node 1608, the system traverses the dimension defined by branch node 1610 by sequentially scanning leaf nodes 1642, 1644, 1646, and 1648. After traversing the dimension defined by branch node 1610, the system traverses the dimension defined by branch node 1612 by sequentially scanning leaf nodes 1652, 1654, 1656, and 1658.

In various embodiments, the system traverses the vertical tree in a similar manner to the traversal of the horizontal tree, such as by sequentially scanning the dimensions defined by branch nodes P-a, P-b, Q-a, and Q-b.

Figure 17:
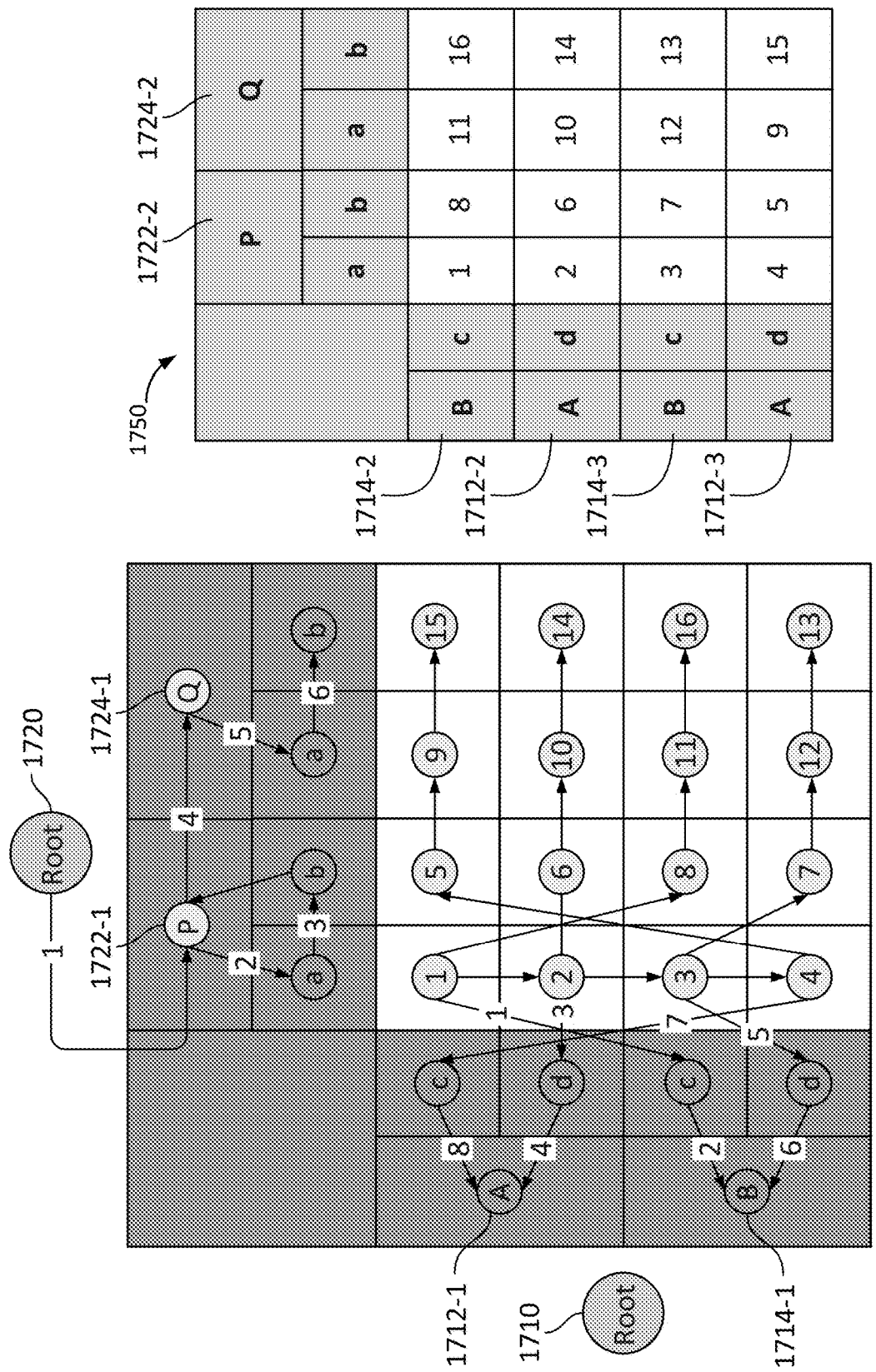
FIG. 17 illustrates an example of traversing a data structure after the data in the data structure is sorted according to various embodiments of the present application.

FIG. 17 illustrates an example of traversing a data structure after the data in the data structure is sorted according to various embodiments of the present application. In some embodiments, tree data structure 1700 and table 1750 are implemented at least in part by system 100 of FIG. 1 and/or system 200 of FIG. 2. In the example shown, tree data structure 1700 is an N-conjoined tree data structure where N=2.

In some embodiments, the leaf nodes are sorted and then by iterating over the sorted order of the leaf nodes, for each leaf node, the system back-traverses from the lowest level of the branch node to get the new sorted list of the branch. Once the new sorted list of the branch node is obtained, the system traverses the leaf node again using the new sorted list, and this generates the sorted table result in table 1750.

According to various embodiments, the system traverses the N-conjoined tree data structure in connection with creating a mapping of nodes to locations and generating a representation or visualization of the data stored in the N-conjoined tree data structure, such as a report or table. In the example shown, tree data structure 1700 is traversed in connection with generating table 1750. As illustrated, tree data structure 1700 is sorted along the dimension defined by branch node P-a. The system traverses tree data structure 1700 by first traversing the branch nodes for each tree in tree data structure 1700, as described in connection with FIG. 15. After traversing the branch nodes, the system can traverse the leaf nodes in tree data structure 1700.

Traversal of the leaf nodes for the tree having root node 1710 includes sequentially traversing the dimensions defined by the branch nodes descendant of branch node 1712-1. For example, the system starts at the dimension defined by branch node A-c and sequentially scans the value along the dimension (e.g., the leaf node having a value of 4, then the leaf node having a value of 5, then the leaf node having a value of 9, and then the leaf node having a value of 15). Even though the data is sorted along the dimension defined by P-a and the leaf nodes in the dimension defined by branch node A-c are not perpendicular to branch node A-c (e.g., the traversal through the dimension defined by branch node A-c is not linear), the system traverses the leaf nodes according to the order for that particular dimension. Accordingly, tree nodes do not need to be in symmetrical position within the tree. However, when the data is transformed into a pivot table (e.g., table 1750), the data is presented in a symmetric manner for ease of understanding by consumers.

As shown in FIG. 17, in connection with the system traversing tree data structure 1700 to generate table 1750, the system maps the branch nodes and leaf nodes to present the values in a symmetrical manner. Although the dimension defined by branch node A-c is the first dimension provided in tree data structure 1700, the system maps the locations of values for leaf nodes in the dimension defined by branch node A-c based on the sortation of leaf node values for the dimension defined by P-a. For example, the system maps the locations to present the dimension B-c as the first row 1714-2, the dimension A-d as the second row 1712-2, the dimension B-d as the third row 1713-3, and the dimension A-c as the fourth row 1712-4. The dimensions are thus ordered as rows in table 1750 to be consistent with the sortation of leaf node values along dimension P-a.

The system traverses the leaf nodes in tree data structure 1700 to obtain the node values and maps the node values to locations in table 1750. As shown, the columns descendent from root node 1720 are provided in the same order as the tree data structure 1700. The system maps the columns for dimensions descendant from branch 1722-2 to be provided as the first set of columns and maps the columns for dimensions descendant from branch 1724-2 to be provided as the next set of columns.

Figure 18A:
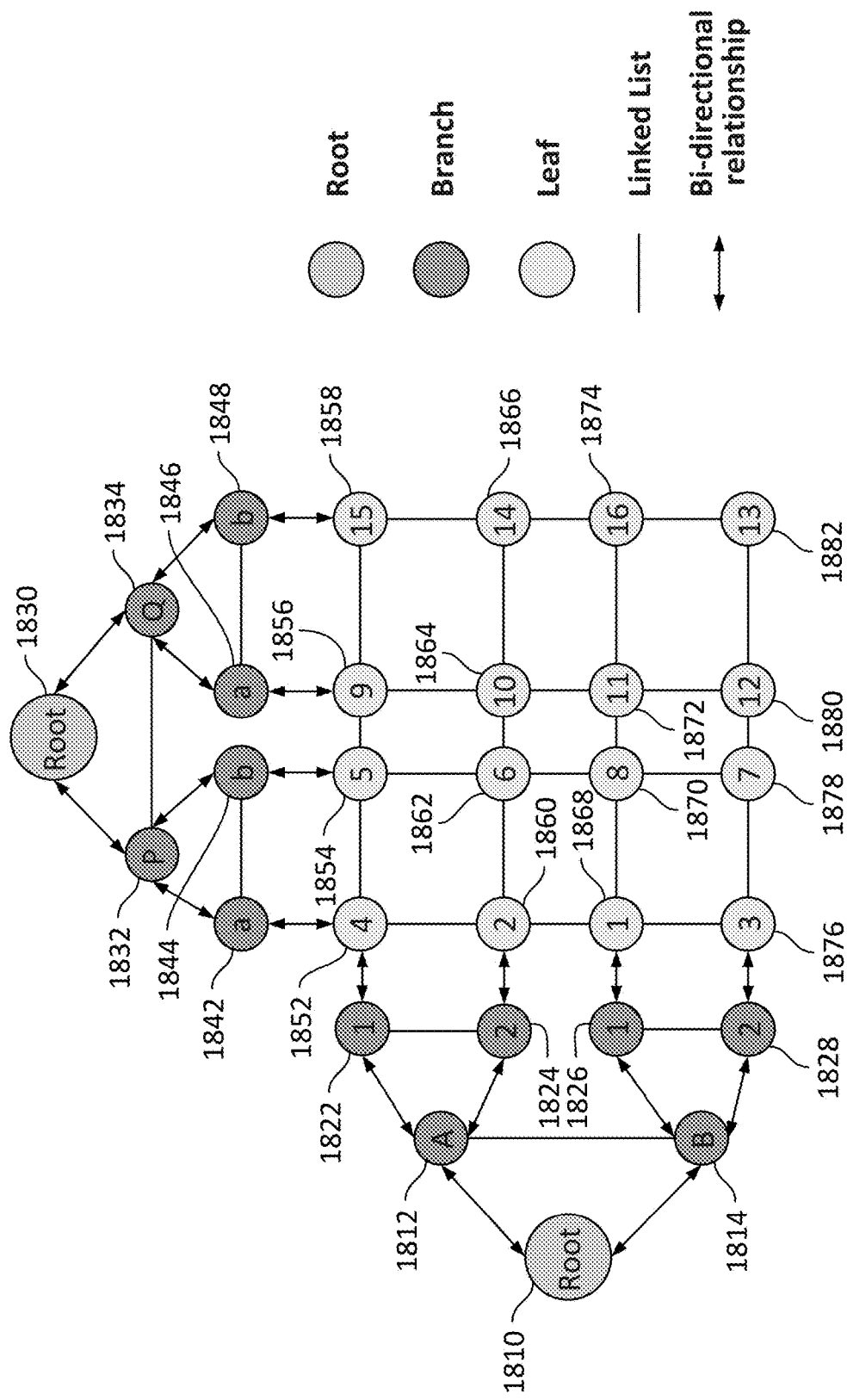
FIG. 18A illustrates an example of a data structure according to various embodiments of the present application.

FIG. 18A illustrates an example of a data structure according to various embodiments of the present application. In some embodiments, tree data structure 1800 is implemented at least in part by system 100 of FIG. 1 and/or system 200 of FIG. 2. In the example shown, tree data structure 1800 is an N-conjoined tree data structure where N=2.

Because N=2 for the N-conjoined tree represented by tree data structure 1800, tree data structure 1800 is a conjoined twin tree. The conjoined twin tree is a graph data structure that has two different roots (e.g., root node 1810 and root node 1830) and sets of branches. For example, the tree having root node 1810 comprises branches defined by branch nodes 1812-1828, and the tree having root node 1830 comprises branches defined by branch nodes 1832-1848. However, the two trees share the same leaf nodes 1852-1882.

Tree data structure 1800 is configured to represent shareable/intersect matrix data between the two axes (e.g., a pivot table). A benefit of the representation of data in an N-conjoined tree data structure is it allows structure modification such as adding, inserting, deleting, sorting, filtering, and/or swapping on either rows or columns in the pivot table. Additionally, the N-conjoined tree data structure allows item order change (e.g., re-ordering or rearranging of data) without a need to reorder items along its axis. For example, when the system sorts one of the column values within a pivot table the other values along the axis will automatically follow without any extra effort to re-arrange such other values.

Figure 18B:
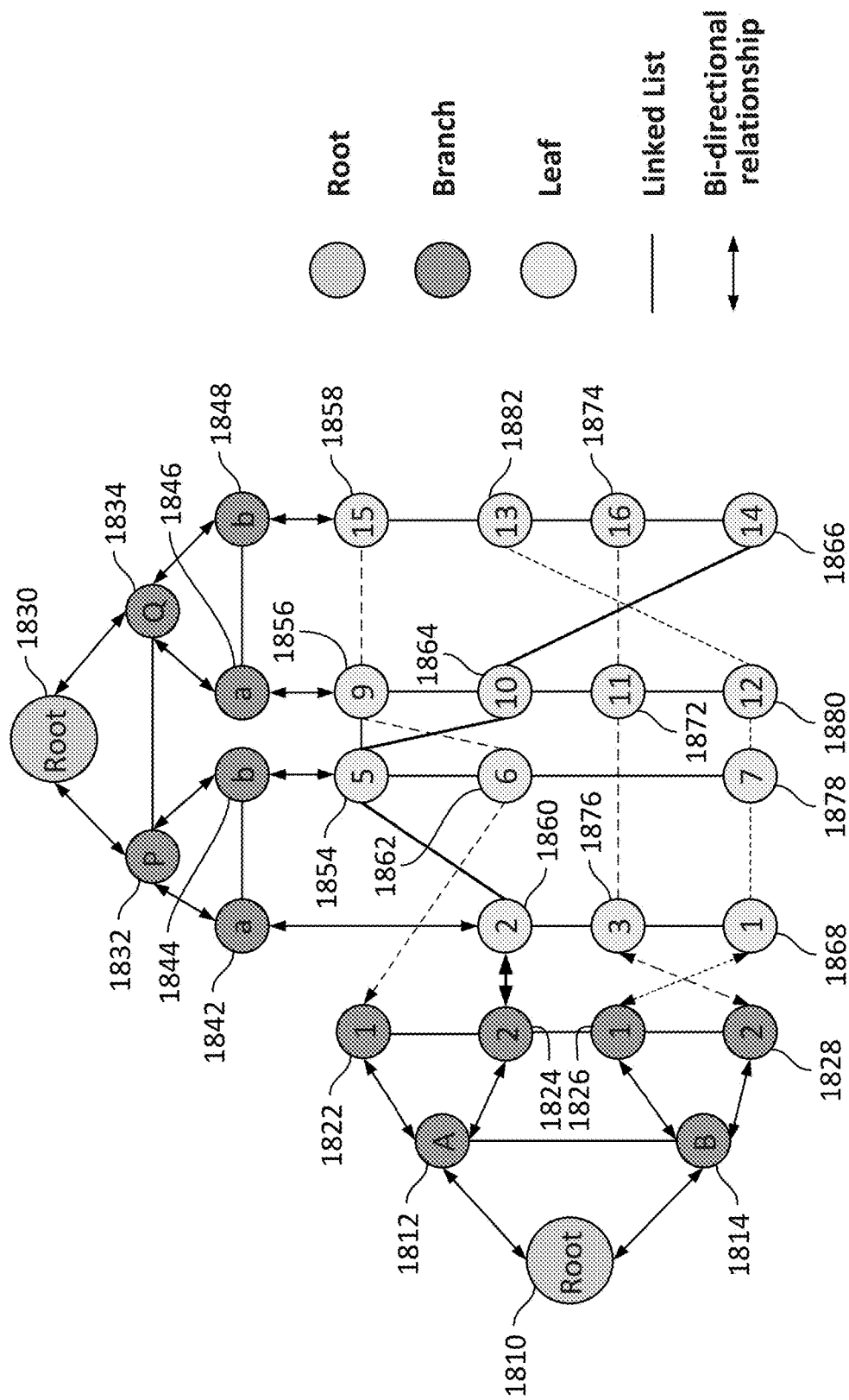
FIG. 18B illustrates an example of an imperfect data structure according to various embodiments of the present application.

FIG. 18B illustrates an example of a imperfect data structure according to various embodiments of the present application. In some embodiments, the data structure is not sorted but the example illustrates that a conjoined tree data map or location does not need to be in a perfect perpendicular state like a table in order to maintain order within the matrix. As shown in table data structure 1825, the N-conjoined tree data structure does not require a each pair of branch nodes to have a leaf node in the matrix. In the above example, the branch node pair of branch node 1822 and branch node 1842 do not have a leaf node child. Similarly, the branch node pair of branch node 1828 and branch node 1844 does not have a corresponding leaf node child.

According to various embodiments, in a pivot table such as table 1875, the feature of a branch node not having a corresponding leaf node child is represented as a null/empty value.

In some embodiments, the N-conjoined tree does not require that the location of the leaf node be perpendicular relative to both parent branch nodes. In tree data structure 1825, for example, leaf node 1854 does not need to be in the second position of the dimension defined by branch node 1844 although when tree data structure 1825 is translated into a pivot table such as table 1875, the value for leaf node 1854 will be located in the second position of the dimensions respectively defined by branch nodes 1824 and 1844.

Figure 18C:
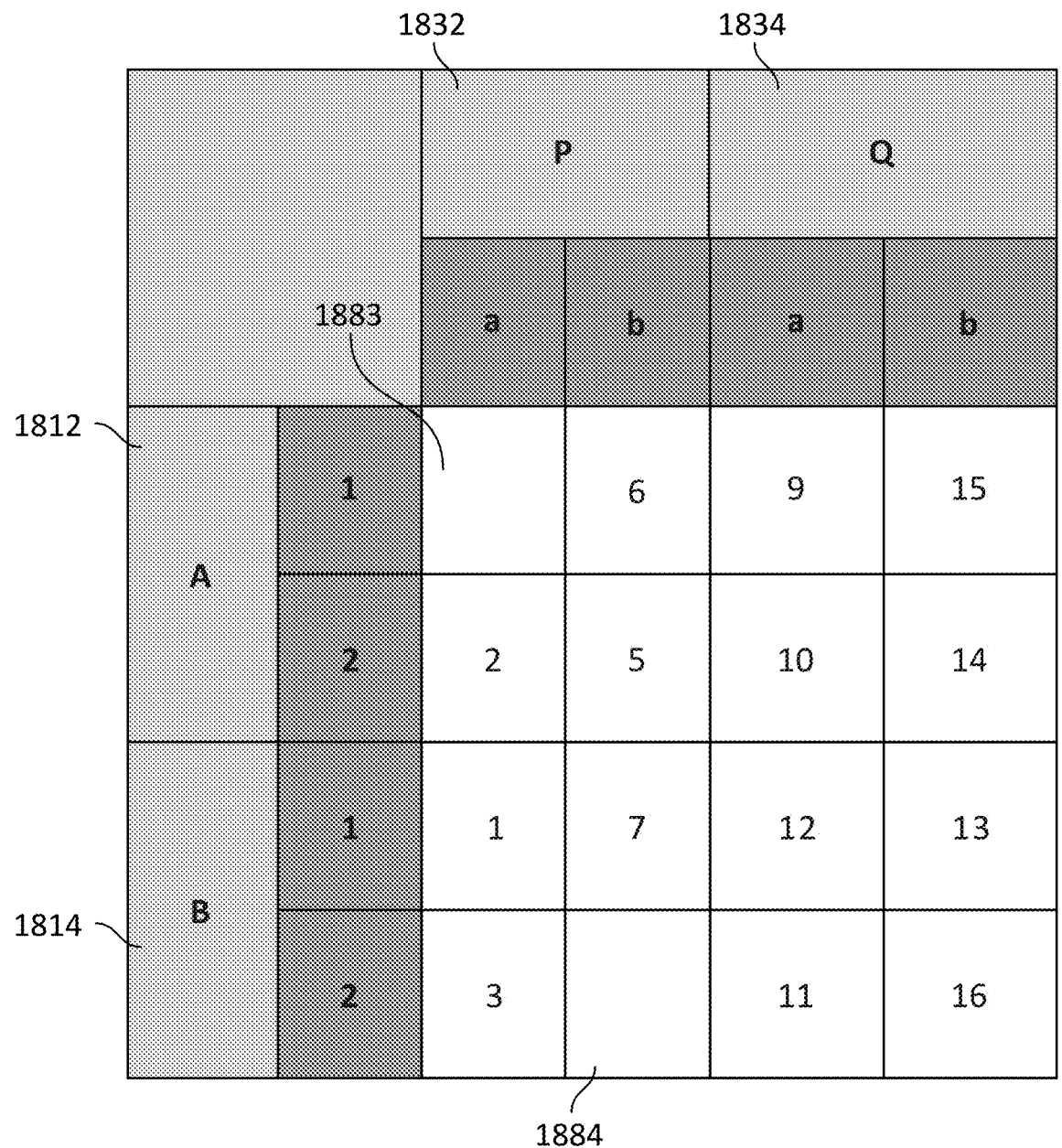
FIG. 18C illustrates an example of a data structure including null values according to various embodiments of the present application.

FIG. 18C illustrates an example of a data structure including null values according to various embodiments of the present application. As discussed above, the N-conjoined tree data structure does not require that each branch node pair (e.g., a pair of branches with each branch selected from a different tree) have a corresponding leaf node. In the example shown, these locations are represented by null/empty values at table locations 1883 and 1884. N-conjoined tree data structure is suitable to store (e.g., temporarily store) data to be represented in a pivot table because of its integrity and resiliency to maintain the tree hierarchy without need of reordering.

Figure 19:
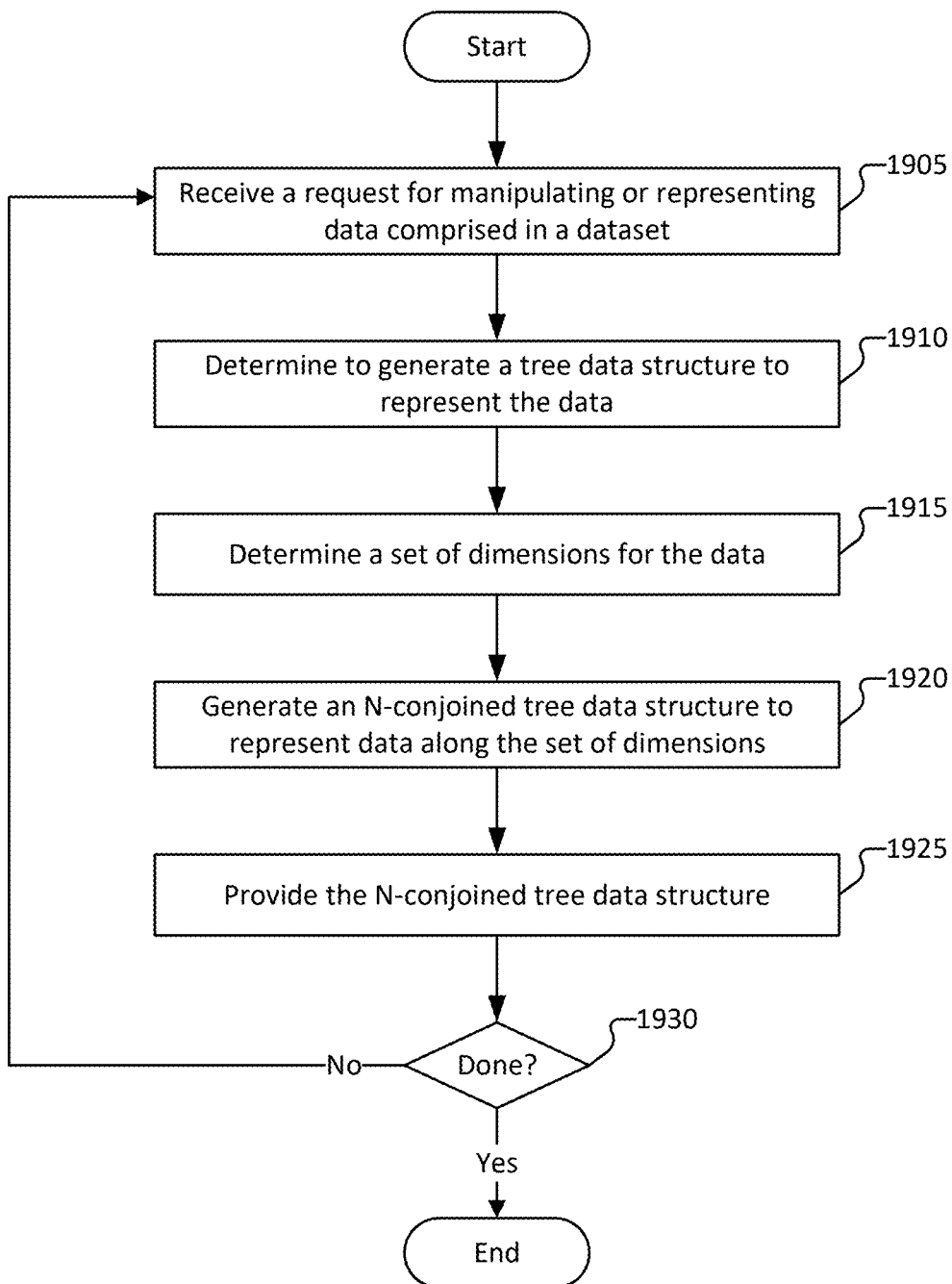
FIG. 19 is a flow diagram of a method for generating a data structure for manipulation or representation of data in a dataset according to various embodiments of the present application.

FIG. 19 is a flow diagram of a method for generating a data structure for manipulation or representation of data in a dataset according to various embodiments of the present application. In some embodiments, process 1900 is implemented at least in part by system 100 of FIG. 1 and/or system 200 of FIG. 2.

At 1905, the system receives a request for manipulating or representing data comprised in a dataset. The system may receive the request for manipulating or representing the data from a service or other system that provides a user interface via which the data is represented according to a predefined configuration or a user definition input to the user interface. At 1910, the system determines to generate a tree data structure to represent the data. The tree data structure is used to represent the data to be visualized to more efficiently and easily manipulate the data. At 1915, the system determines a set of dimensions for the data. The set of dimensions may correspond to dimensions along which data is to be represented. The system may determine the set of dimensions based at least in part on the request. For example, the set of dimensions are defined by a user definition of rows and columns along which the user desires the data to be represented. At 1920, the system generates an N-conjoined tree data structure to represent data along the set of dimensions. The N-conjoined tree data structure can be in the form of data structure 400 of FIG. 4 for which the branches correspond to the set of dimensions for the data. As an example, the system generates the N-conjoined tree data structure by invoking process 2000 of FIG. 20. At 1925, the system provides the N-conjoined tree data structure. The N-conjoined tree data structure is provided in connection with generating a representation of the data in the dataset, such as in the form of a table or other visualization to be presented on a user interface. The interface via which the representation is provided may enable a user or other system to request a manipulation of the data, and in response to a request to manipulate the data (e.g., add/delete data, filter data, sort data, etc.), the system uses the N-conjoined tree data structure to manipulate the data and generate an updated representation of the data. At 1930, a determination is made as to whether process 1900 is complete. In some embodiments, process 1900 is determined to be complete in response to a determination that no further data structures are to be generated to represent the data, no further requests for manipulating or representing the data are received, the data structure(s) has been generated and provided, no further inputs are received for manipulating in the data structure(s), a user has exited the system, an administrator indicates that process 1900 is to be paused or stopped, etc. In response to a determination that process 1900 is complete, process 1900 ends. In response to a determination that process 1900 is not complete, process 1900 returns to 1905.

Figure 20:
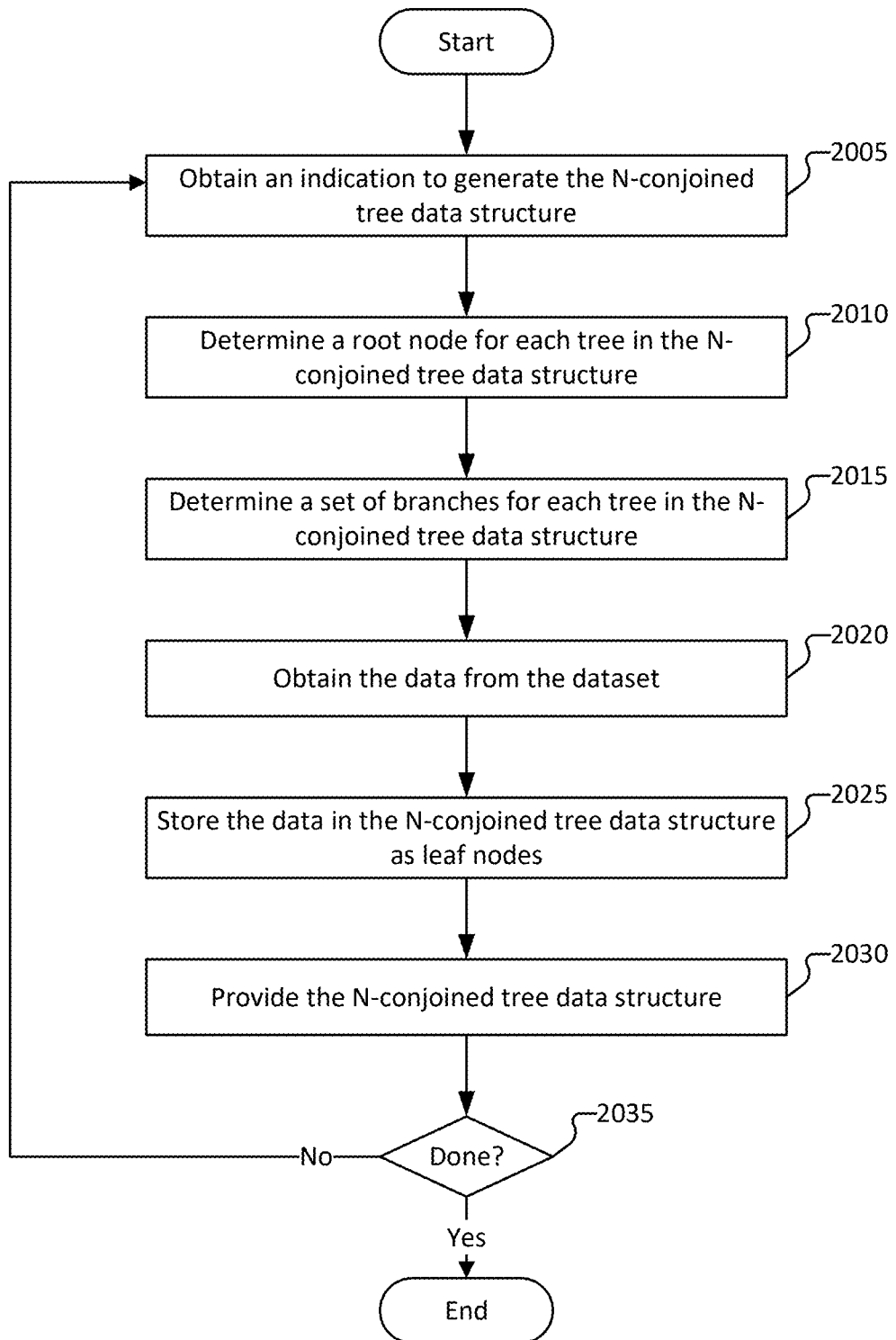
FIG. 20 is a flow diagram of a method for generating an N-conjoined tree data structure according to various embodiments of the present application.

FIG. 20 is a flow diagram of a method for generating an N-conjoined tree data structure according to various embodiments of the present application. In some embodiments, process 2000 is implemented at least in part by system 100 of FIG. 1 and/or system 200 of FIG. 2.

At 2005, the system obtains an indication to generate the N-conjoined tree data structure.

At 2010, the system determines a root node for each tree in the N-conjoined tree data structure.

At 2015, the system determines a set of branches for each tree in the N-conjoined tree in the N-conjoined tree data structure.

At 2020, the system obtains the data from the dataset.

At 2025, the system stores the data in the N-conjoined tree data structure as leaf nodes.

At 2030, the system provides the N-conjoined tree data structure. For example, the system provides the N-conjoined tree data structure to the system, service, or other process that invoked process 2000.

At 2035, a determination is made as to whether process 2000 is complete. In some embodiments, process 1900 is determined to be complete in response to a determination that no further N-conjoined tree data structures are to be generated to represent the data, no further requests for manipulating or representing the data is received, the requested N-conjoined tree data structure(s) has been generated and provided, no further inputs are received for manipulating data in the N-conjoined tree data structure(s), a user has exited the system, an administrator indicates that process 2000 is to be paused or stopped, etc. In response to a determination that process 2000 is complete, process 2000 ends. In response to a determination that process 2000 is not complete, process 2000 returns to 2005.

Figure 21:
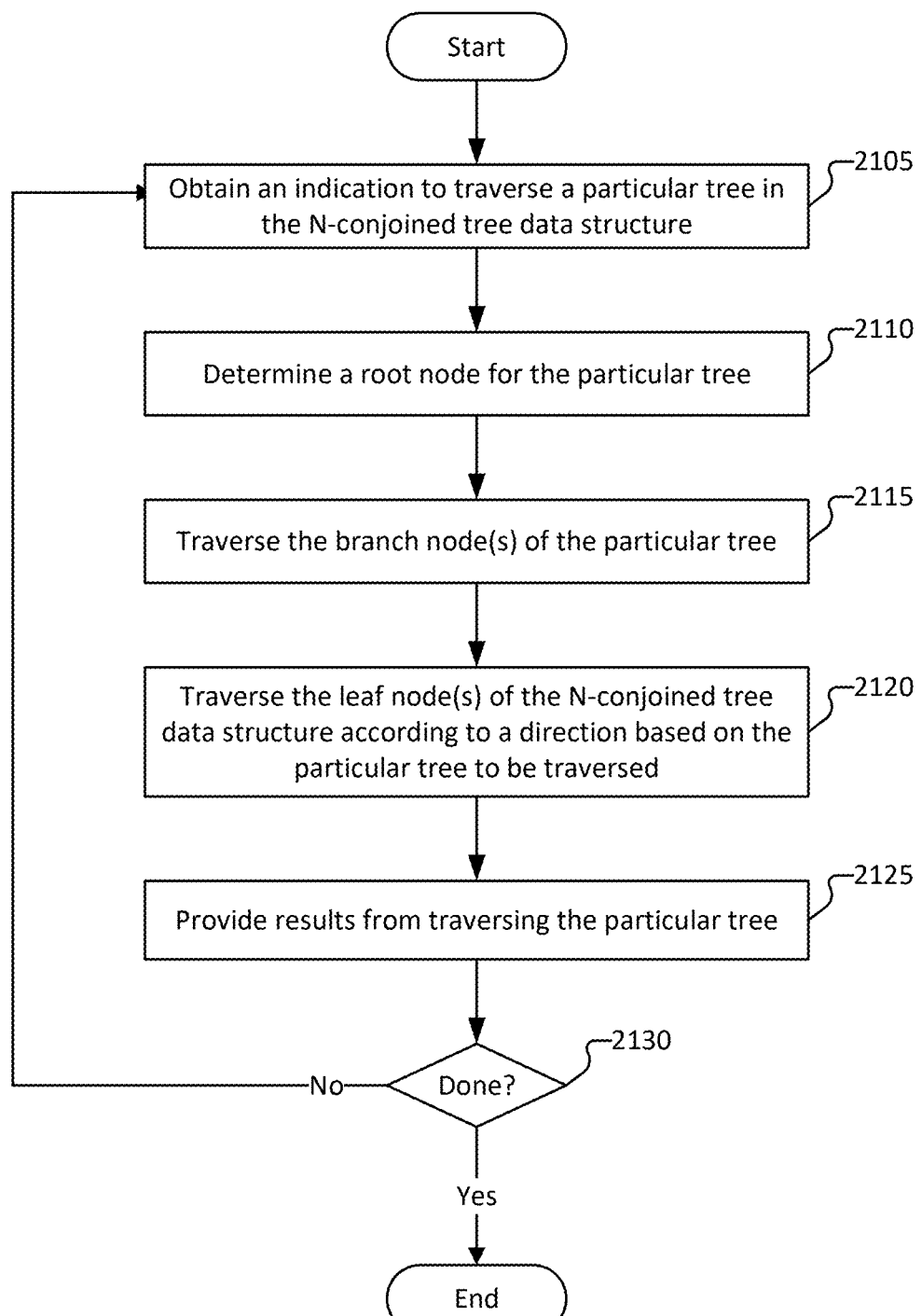
FIG. 21 is a flow diagram of a method for traversing an N-conjoined tree data structure according to various embodiments of the present application.

FIG. 21 is a flow diagram of a method for traversing an N-conjoined tree data structure according to various embodiments of the present application. In some embodiments, process 2100 is implemented at least in part by system 100 of FIG. 1 and/or system 200 of FIG. 2.

At 2105, the system obtains an indication to traverse a particular tree in the N-conjoined tree data structure. The indication to traverse the particular tree may be obtained in connection with receiving a request to manipulate (e.g., add/delete data, insert data, sort the data, filter the data, or evaluate a query against the data) or represent the data in the dataset.

In some embodiments, the system determines to traverse a particular tree in connection with obtaining an indication that the system is to traverse the N-conjoined tree data structure. The system may divide the traversal of the N-conjoined tree data structure into a plurality of processes to be performed in parallel (e.g., substantially in parallel). For example, the system divides the traversal of the N-conjoined tree data structure into a plurality of traversal operations respectively corresponding to traversal of a set of trees in the N-trees. In some instances, the system may divide the traversal of the N-conjoined tree data structure into N processes in which each tree in the N-tree is performed substantially in parallel. However, a subset of the N trees may be performed in parallel based on a determination of a number of trees to be traversed in parallel that optimizes traversal of the overall N-conjoined tree data structure.

At 2110, the system determines a root node for the particular tree.

At 2115, the system traverses the branch node(s) of the particular tree. For example, the system invokes process 2200 in connection with traversing the branch node(s). As an example, the system traverses the branch node(s) of the N-conjoined tree data structure in the same manner (or a similar manner) to the traversal illustrated in FIG. 5.

At 2120, the system traverses the leaf node(s) of the N-conjoined tree data structure according to a direction based on the particular tree to be traversed. For example, the system invokes process 2300 in connection with traversing the branch node(s). The system determines the direction based on the particular tree to be traversed. In some embodiments, the direction corresponds to sequentially scanning leaf nodes along a depth defined by a dimension corresponding to a particular branch node (e.g., a branch node in a lowest branch-level in the hierarchy for the particular tree), and then iteratively scanning the set of leaf nodes for each branch in the particular tree (e.g., each branch in the lowest branch-level in the hierarchy for the particular tree) until all dimensions have been scanned. As an example, the system traverses the leaf nodes of the N-conjoined tree data structure in the same manner (or a similar manner) to the traversal illustrated in FIG. 5.

At 2125, the system provides the results obtained from traversing the particular tree. For example, the results may be used to generate a mapping of position information and values that are used to generate a representation of the data.

At 2130, a determination is made as to whether process 2100 is complete. In some embodiments, process 2100 is determined to be complete in response to a determination that no further N-conjoined tree data structures are to be traversed, the traversal of the N-conjoined tree data structure (s) is complete, a request to manipulate the data in the N-conjoined tree data structure is obtained during traversal, a user has exited the system, an administrator indicates that process 2100 is to be paused or stopped, etc. In response to a determination that process 2100 is complete, process 2100 ends. In response to a determination that process 2100 is not complete, process 2100 returns to 2105.

Figure 22:
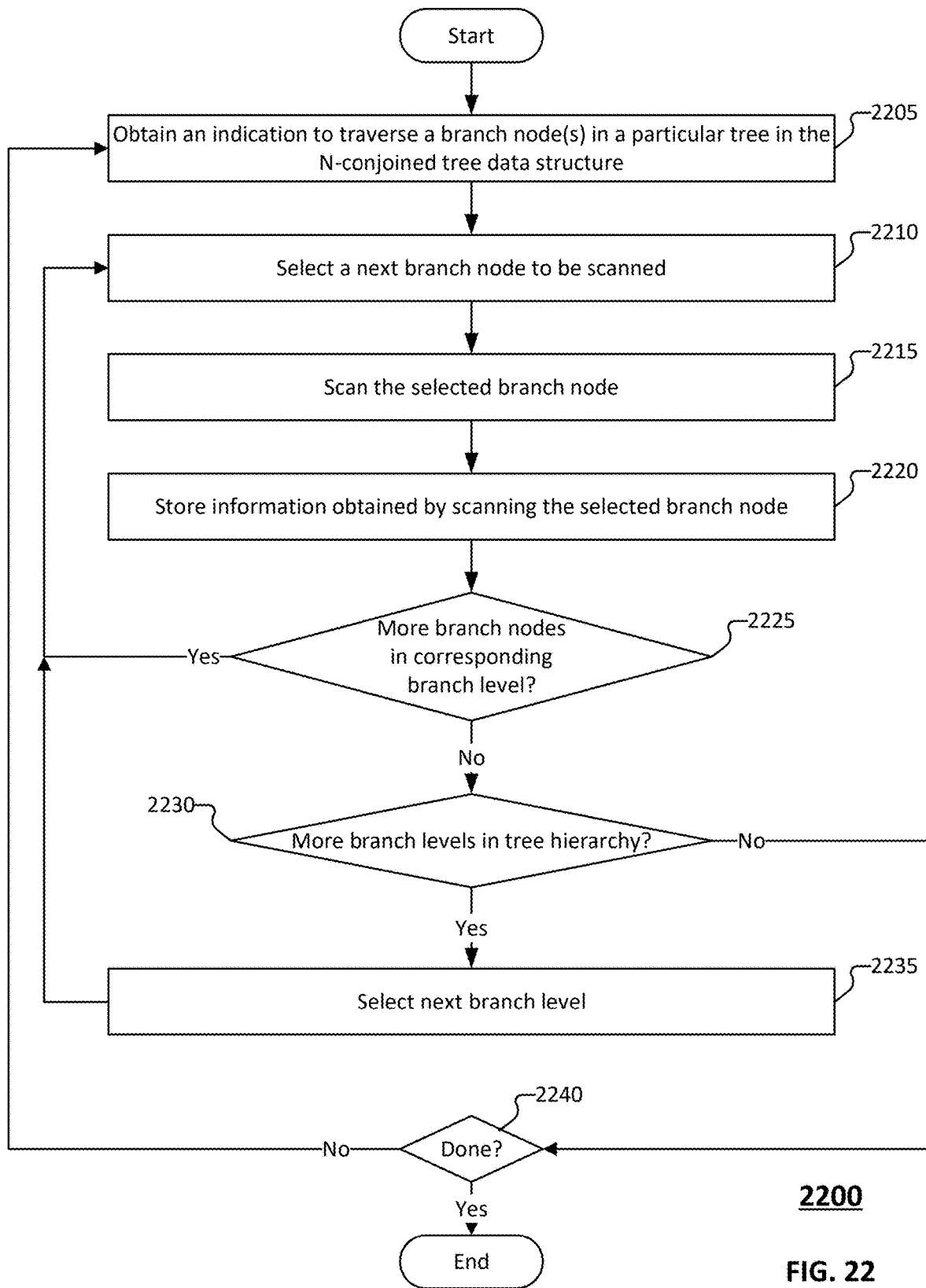
FIG. 22 is a flow diagram of a method for traversing branch nodes in an N-conjoined tree data structure according to various embodiments of the present application.

FIG. 22 is a flow diagram of a method for traversing branch nodes in an N-conjoined tree data structure according to various embodiments of the present application. In some embodiments, process 2200 is implemented at least in part by system 100 of FIG. 1 and/or system 200 of FIG. 2.

At 2205, the system obtains an indication to traverse a branch node(s) in a particular tree in the N-conjoined tree data structure.

At 2210, the system selects a next branch node to be scanned.

At 2215, the system scans the selected branch node. Scanning the branch node can correspond to accessing the value in the branch node or otherwise evaluating the branch node against predefined logic, such as query logic for a received query (e.g., a logic for sorting or filtering data along a set of one or more dimensions defined by a set of branch nodes).

At 2220, the system stores the information obtained by scanning the selected branch node. For example, the system stores the information in a mapping that is to be used to generate a representation of data (e.g., a mapping of data positions (e.g., node positions) and data values (e.g., values obtained by accessing the branch node)).

At 2225, the system determines whether a corresponding branch level associated with the selected branch node comprises more branch nodes (e.g., branch nodes that are to be scanned). In response to determining that the corresponding branch level comprises more branch nodes to be scanned, process 2200 returns to 2210 and process 2200 iterates over 2210-2225 until the branch level comprises no further branch nodes to be scanned. Conversely, in response to determining that the corresponding branch level does not comprise any further branch nodes to be scanned, process 2200 proceeds to 2230.

At 2230, the system determines whether the tree hierarchy for the particular tree comprises more branch levels (e.g., branch levels comprising branch nodes to be scanned during the traversal of the particular tree). In response to determining that the tree hierarchy comprises more branch levels, process 2200 proceeds to 2235 at which a next branch level (e.g., a next lower branch level) is selected and process 2200 iterates over 2210-2225 until all branch nodes in the selected branch level are scanned. Conversely, in response to determining that the tree hierarchy does not comprise any further branch levels for which branch nodes are to be scanned, process 2200 proceeds to 2240.

At 2240, a determination is made as to whether process 2200 is complete. In some embodiments, process 2200 is determined to be complete in response to a determination that no further branches in the particular tree(s) are to be traversed, all leaf nodes in the N-conjoined tree data structure have been traversed, all trees of the N-trees in the N-conjoined tree data structure have been traversed, the traversal of the N-conjoined tree data structure(s) is complete, a request to manipulate the data in the N-conjoined tree data structure is obtained during traversal, a user has exited the system, an administrator indicates that process 2200 is to be paused or stopped, etc. In response to a determination that process 2200 is complete, process 2200 ends. In response to a determination that process 2200 is not complete, process 2200 returns to 2205.

Figure 23:
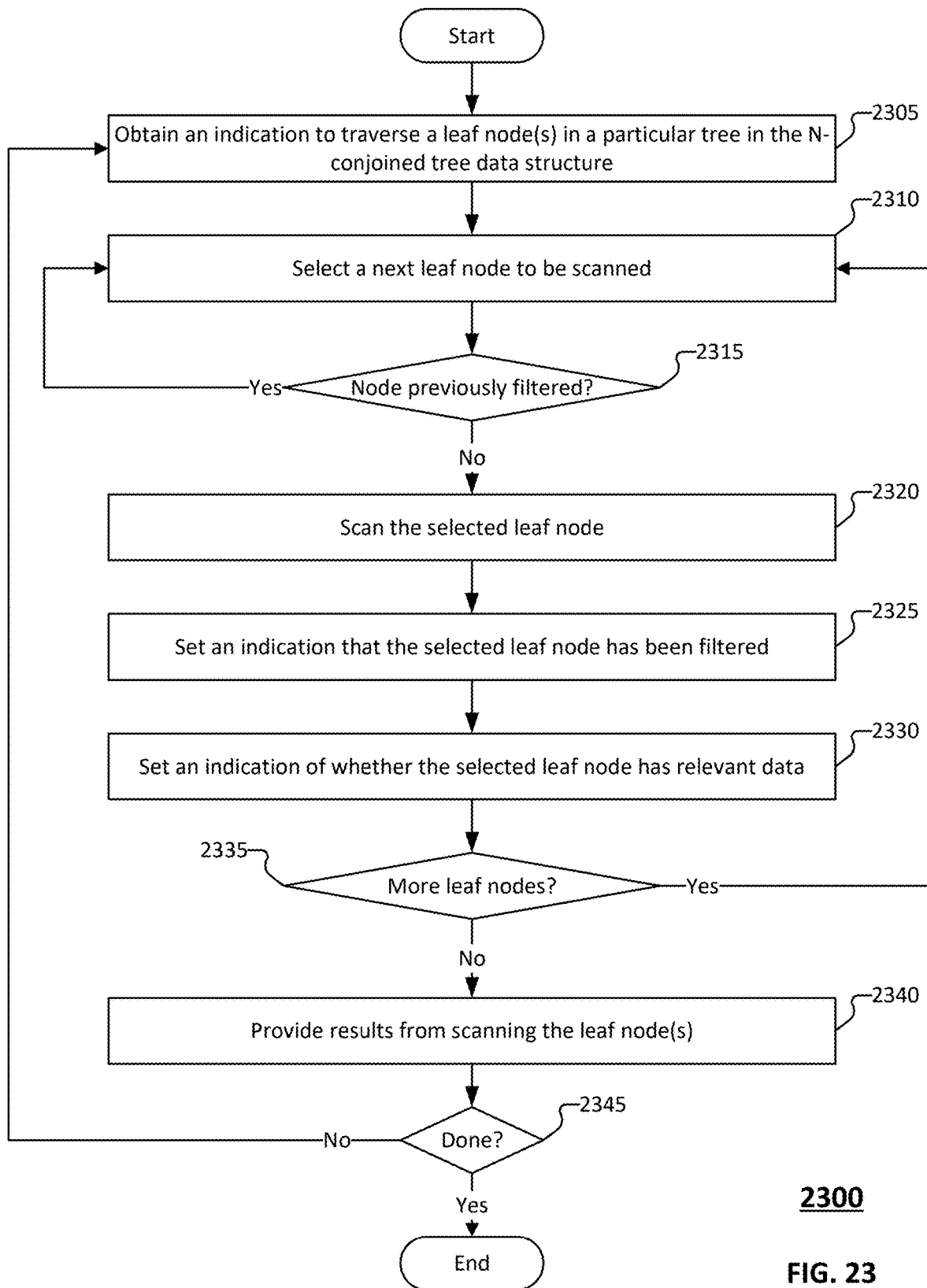
FIG. 23 is a flow diagram of a method for traversing leaf nodes in an N-conjoined tree data structure according to various embodiments of the present application.

FIG. 23 is a flow diagram of a method for traversing leaf nodes in an N-conjoined tree data structure according to various embodiments of the present application. In some embodiments, process 2300 is implemented at least in part by system 100 of FIG. 1 and/or system 200 of FIG. 2.

At 2305, the system obtains an indication to traverse a leaf node(s) in a particular tree in the N-conjoined tree data structure.

At 2310, the system selects a next leaf node to be scanned.

At 2315, the system determines whether the selected leaf node was previously filtered. The system uses tree metadata to determine whether the leaf node was previously filtered (e.g., data flag was set to make the node invisible).

In response to determining that the selected leaf node was previously scanned at 2315, process 2300 returns to 2310 and process 2300 iterates over 2310-2315 until the system selects a leaf node that has not been previously scanned. Conversely, in response to determining that the selected leaf node has not been previously scanned, process 2300 proceeds to 2320 at which the system scans the selected leaf node.

In some embodiments, scanning the selected leaf node comprises accessing the value in the branch node or otherwise evaluating the branch node against predefined logic, such as query logic for a received query (e.g., a logic for sorting or filtering data along a set of one or more dimensions defined by a set of branch nodes).

At 2325, the system sets the indication that the selected leaf node has been filtered. For example, the system sets a flag (e.g., a first flag or a scan status flag) that is used by other processes, services, or systems traversing the N-conjoined tree data structure (e.g., through other trees of the N trees, and/or via an orthogonal direction) to determine whether to access/evaluate the leaf node or to skip the leaf node. By setting the flag to indicate that the leaf node has been filtered, other traversals through the N-conjoined tree data structure can skip the leaf node (e.g., skip accessing the leaf node value or evaluating the leaf node value such as against a query logic to determine whether the leaf node stores relevant data). The flag can be stored as metadata associated with the leaf node, such as metadata comprised in the leaf node data structure or metadata comprised in the N-conjoined tree data structure and associated with the leaf node.

At 2330, the system sets an indication of whether the selected leaf node has relevant data. In response to accessing and/or evaluating the value stored in the selected leaf node, the system determines whether the leaf node stores relevant data (e.g., data that is responsive to the query, data to be included in the representation/visualization of the data stored in the N-conjoined tree data structure). If the system determines that the selected leaf node stores relevant data, the system sets a flag (e.g., a second flag or a relevant data flag) to indicate that the leaf node comprises relevant data. Otherwise, if the system determines that the selected leaf node does not store relevant data, the system can set the flag to indicate that the leaf node does not comprise relevant data. The flag can be stored as metadata associated with the leaf node, such as metadata comprised in the leaf node data structure or metadata comprised in the N-conjoined tree data structure and associated with the leaf node.

At 2335, the system determines whether the particular tree comprises more leaf nodes to be scanned (e.g., to be scanned to complete the traversal of the particular tree). For example, the system determines whether the set of leaf nodes for a particular tree has been completely scanned. In response to determining that the particular tree comprises more leaf nodes to be scanned, process 2300 returns to 2310 and process 2300 iterates over 2310-2335 until the leaf nodes in the particular tree have been traversed. Conversely, in response to determining that the particular tree does not comprise any more leaf nodes to be scanned (e.g., that the particular tree has been completely traversed), the system proceeds to 2340 at which the results from scanning the leaf node(s) are provided.

In some embodiments, providing the results from the scanning of the leaf node(s) comprises storing the results in a mapping, such as a mapping that maps data positions (e.g., node positions) and data values (e.g., values obtained by accessing/evaluating the leaf node). For example, the results may be used to generate a mapping of position information and values that are used to generate a representation of the data.

At 2345, a determination is made as to whether process 2300 is complete. In some embodiments, process 2300 is determined to be complete in response to a determination that no further leaf nodes in the particular tree(s) are to be traversed, all leaf nodes in the N-conjoined tree data structure have been traversed, all trees of the N-trees in the N-conjoined tree data structure have been traversed, the traversal of the N-conjoined tree data structure(s) is complete, a request to manipulate the data in the N-conjoined tree data structure is obtained during traversal, a user has exited the system, an administrator indicates that process 2300 is to be paused or stopped, etc. In response to a determination that process 2300 is complete, process 2300 ends. In response to a determination that process 2300 is not complete, process 2300 returns to 2305.

Figure 24:
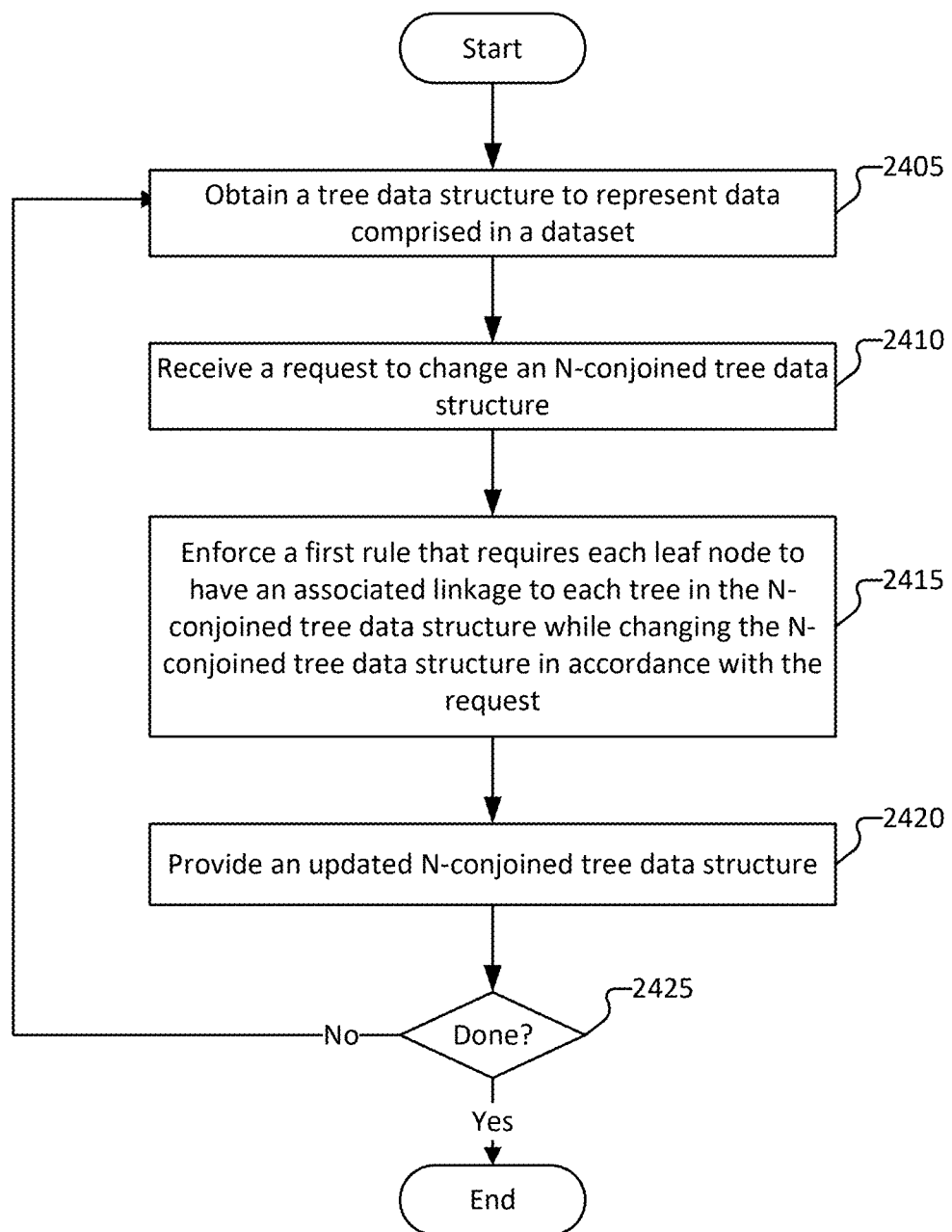
FIG. 24 is a flow diagram of a method for updating a data structure for manipulation or representation of data in a dataset according to various embodiments of the present application.

FIG. 24 is a flow diagram of a method for updating a data structure for manipulation or representation of data in a dataset according to various embodiments of the present application. In some embodiments, process 2400 is implemented at least in part by system 100 of FIG. 1 and/or system 200 of FIG. 2.

At 2405, the system obtains a tree data structure to represent the data comprised in a dataset. The tree data structure can correspond to an N-conjoined tree data structure, such as a tree data structure similar to data structure 400 of FIG. 4. For example, the system obtains the N-conjoined tree data structure that is provided at 1925 of process 1900.

At 2410, the system obtains a request to change an N-conjoined tree data structure. The request to change the N-conjoined tree data structure can correspond to a request to add, insert, or delete data from the N-conjoined tree data structure. As an example, the system obtains a request to add a branch node to a particular tree in the N-conjoined tree data structure and/or to add a leaf node to the N-conjoined tree data structure. As another example, the system obtains a request to delete a branch node (e.g., and all corresponding child nodes) from a particular tree in the N-conjoined tree data structure and/or to delete a leaf node from the N-conjoined tree data structure.

In some embodiments, the system obtains a request to change an N-conjoined tree data structure based on receiving a request received by user interface in connection with a manipulation or representation of the data.

At 2415, the system enforces a first rule that requires each leaf node in the N-conjoined tree data structure to have an associated linkage to each tree in the N-conjoined tree data structure while changing the N-conjoined tree data structure in accordance with the request.

At 2420, the system provides an updated N-conjoined tree data structure. The updated N-conjoined tree data structure reflects the change made to the N-conjoined tree data structure in accordance with the received request. In some embodiments, the updated N-conjoined tree data structure is provided in connection with generating a representation of the data in the dataset, such as in the form of a table or other visualization to be presented on a user interface. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 2425, a determination is made as to whether process 2400 is complete. In some embodiments, process 2400 is determined to be complete in response to a determination that no further data structures are to be updated to represent the data based on a manipulation of the data or a request to change the data in the N-conjoined tree data structure, no further requests for manipulating or representing the data are received, the updated N-conjoined tree data structure(s) has been generated and provided, a user has exited the system, an administrator indicates that process 2400 is to be paused or stopped, etc. In response to a determination that process 2400 is complete, process 2400 ends. In response to a determination that process 2400 is not complete, process 2400 returns to 2405.

Figure 25:
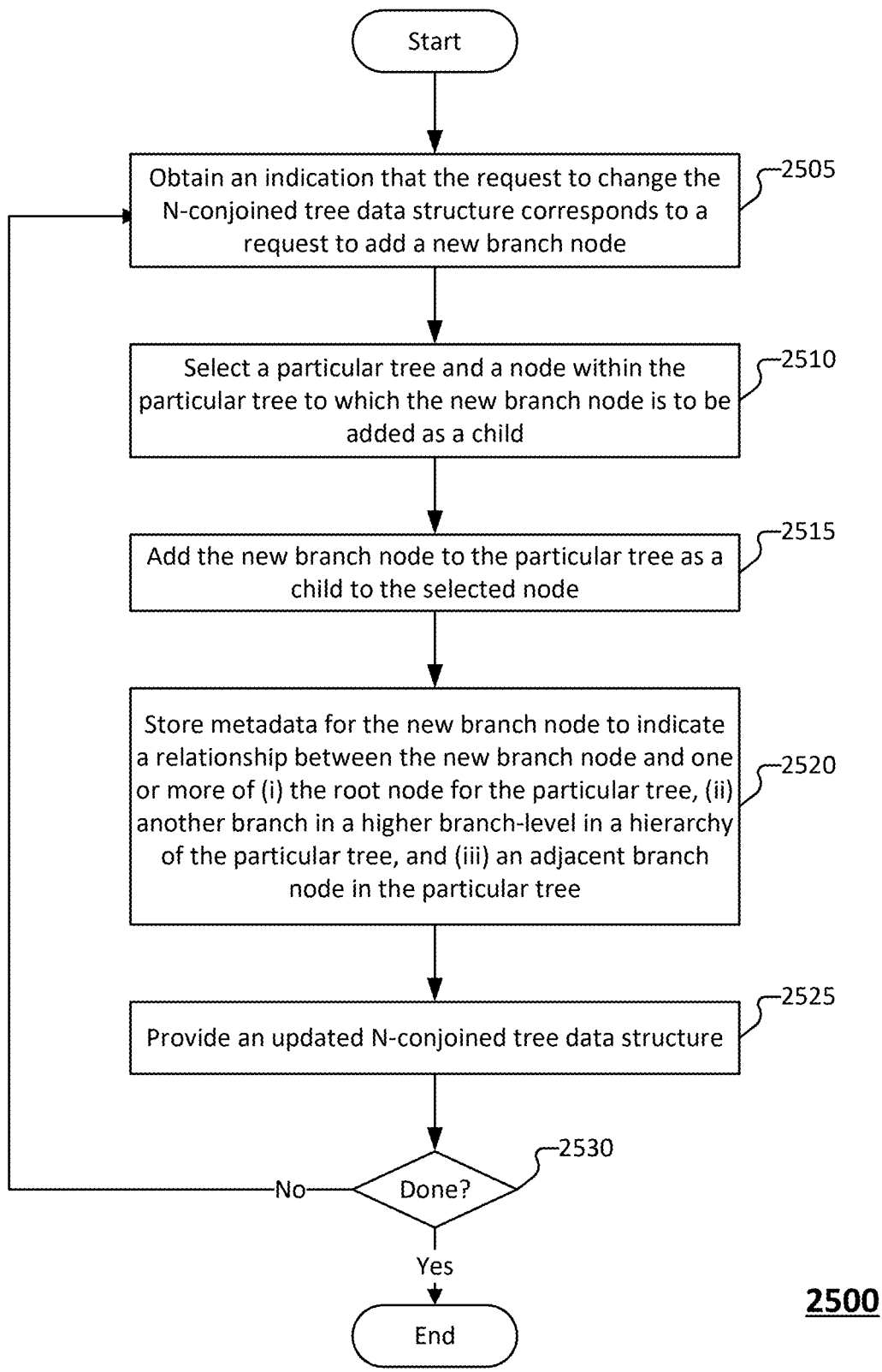
FIG. 25 is a flow diagram of a method for adding or inserting a branch node to an N-conjoined tree data structure according to various embodiments of the present application.

FIG. 25 is a flow diagram of a method for adding or inserting a branch node to an N-conjoined tree data structure according to various embodiments of the present application. In some embodiments, process 2500 is implemented at least in part by system 100 of FIG. 1 and/or system 200 of FIG. 2.

In some embodiments, process 2500 is invoked by 2415 of process 2400, such as in response to determining that the request to change the N-conjoined tree data structure comprises a request to add a new branch node.

At 2505, the system obtains an indication that the request to change the N-conjoined tree data structure corresponds to a request to add a new branch node.

At 2510, the system selects a particular tree and a node within the particular tree to which the new branch node is to be added as a child. The selected node to which the new branch node is to be added as a child may be a root node for the particular tree or another branch node comprised in a higher level in the hierarchy of the particular tree (e.g., a branch node having a higher branch-level).

At 2515, the system adds the new branch node to the particular tree as a child to the selected node.

At 2520, the system stores metadata for the new branch node to indicate a relationship between the new branch node and one or more of (i) the root node for the particular tree, (ii) another branch in a higher branch-level in a hierarchy of the particular tree, and (iii) an adjacent branch node in the particular tree. In some embodiments, the system stores in the metadata linkages for the new branch node, such as an indication of a parent node for the new branch node, a child node of the new branch node, an adjacent branch node in a same branch-level in the hierarchy of the particular tree, etc. In some embodiments, the new branch node is added to a child list of the parent branch node. Note that in this case, the position index is implied because of the list data structure. In some embodiments, the system may further store position information indicating a position/location of the new branch node in the particular tree or the N-conjoined tree data structure.

At 2525, the system provides an updated N-conjoined tree data structure. The updated N-conjoined tree data structure comprises the new branch node added to the particular location in the particular tree. After the new branch node is added to the particular tree, new leaf nodes that are dependent on the new branch node (e.g., children of the new branch node) can be added to the N-conjoined tree data structure.

At 2530, a determination is made as to whether process 2500 is complete. In some embodiments, process 2500 is determined to be complete in response to a determination that no further data structures are to be updated to represent the data based on a manipulation of the data or a request to change the data in the N-conjoined tree data structure, no further change requests are obtained, no further requests for manipulating or representing the data are received, the updated N-conjoined tree data structure(s) has been generated and provided, a user has exited the system, an administrator indicates that process 2500 is to be paused or stopped, etc. In response to a determination that process 2500 is complete, process 2500 ends. In response to a determination that process 2500 is not complete, process 2500 returns to 2505.

Figure 26:
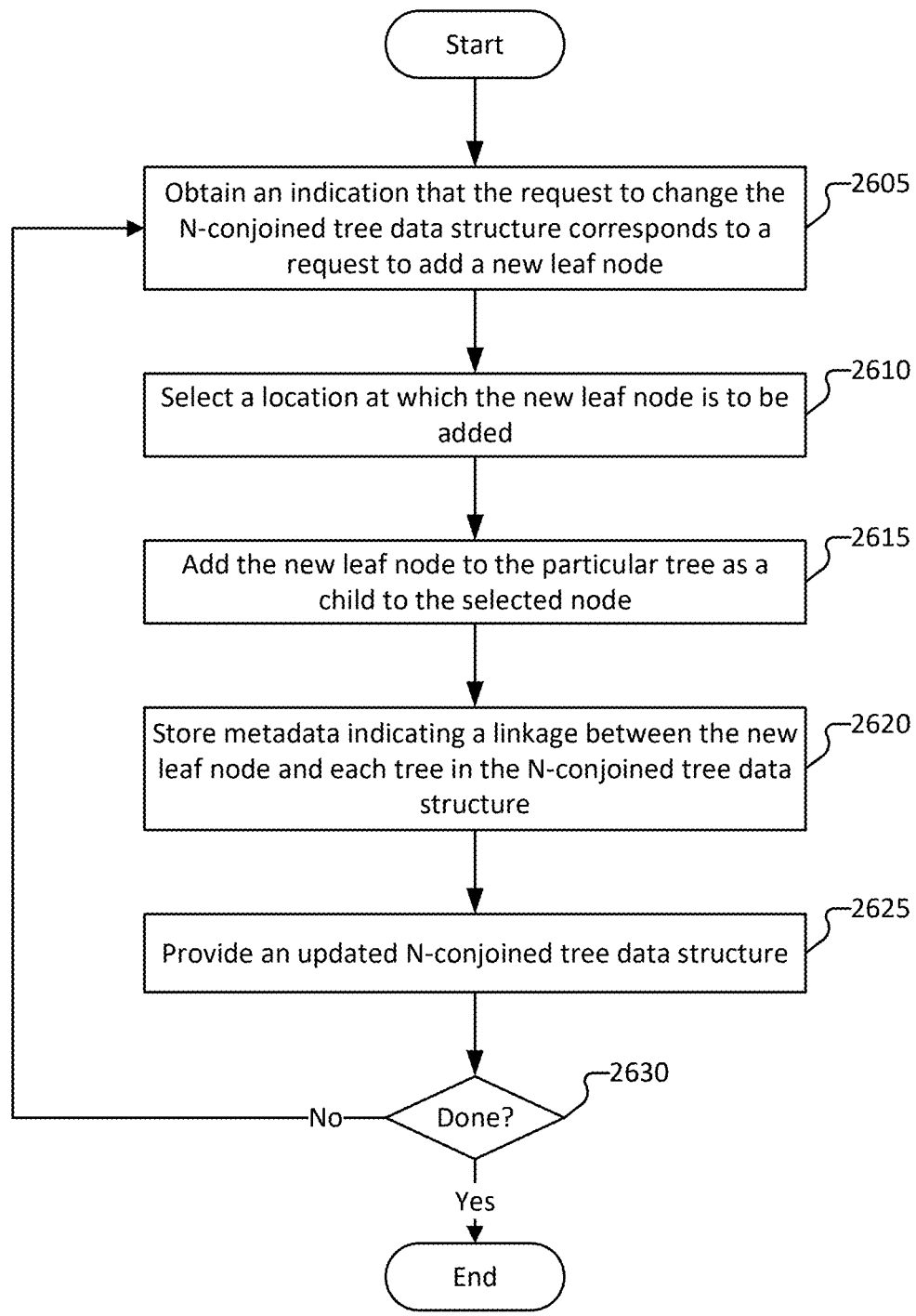
FIG. 26 is a flow diagram of a method for adding or inserting a leaf node to an N-conjoined tree data structure according to various embodiments of the present application.

FIG. 26 is a flow diagram of a method for adding or inserting a leaf node to an N-conjoined tree data structure according to various embodiments of the present application. In some embodiments, process 2600 is implemented at least in part by system 100 of FIG. 1 and/or system 200 of FIG. 2.

In some embodiments, process 2600 is invoked by 2415 of process 2400, such as in response to determining that the request to change the N-conjoined tree data structure comprises a request to add a new leaf node.

At 2605, the system obtains an indication that the request to change the N-conjoined tree data structure corresponds to (e.g., comprises) a request to add a new leaf node(s).

At 2610, the system selects a location at which the new leaf node is to be added.

At 2615, the system adds the new leaf node to the particular tree as a child to the selected node.

At 2620, the system stores metadata indicating a linkage between the new leaf node and each tree in the N-conjoined tree data structure. For example, the new leaf node has one parent node in each of the N trees in the N-conjoined tree data structure. As another example, the new leaf node is connected to each tree in the N-conjoined tree data structure and is scanned during traversal of each tree.

At 2625, the system provides an updated N-conjoined tree data structure. In some embodiments, the system provides the updated N-conjoined tree data structure to the system, service, or other process that invoked process 2600. For example, the system returns the updated N-conjoined tree data structure to process 2400 of FIG. 24.

At 2630, a determination is made as to whether process 2600 is complete. In some embodiments, process 2600 is determined to be complete in response to a determination that no further data structures are to be updated to represent the data based on a manipulation of the data or a request to change the data in the N-conjoined tree data structure, no further change requests are obtained, no further requests for manipulating or representing the data are received, the updated N-conjoined tree data structure(s) has been generated and provided, a user has exited the system, an administrator indicates that process 2600 is to be paused or stopped, etc. In response to a determination that process 2600 is complete, process 2600 ends. In response to a determination that process 2600 is not complete, process 2600 returns to 2605.

Figure 27:
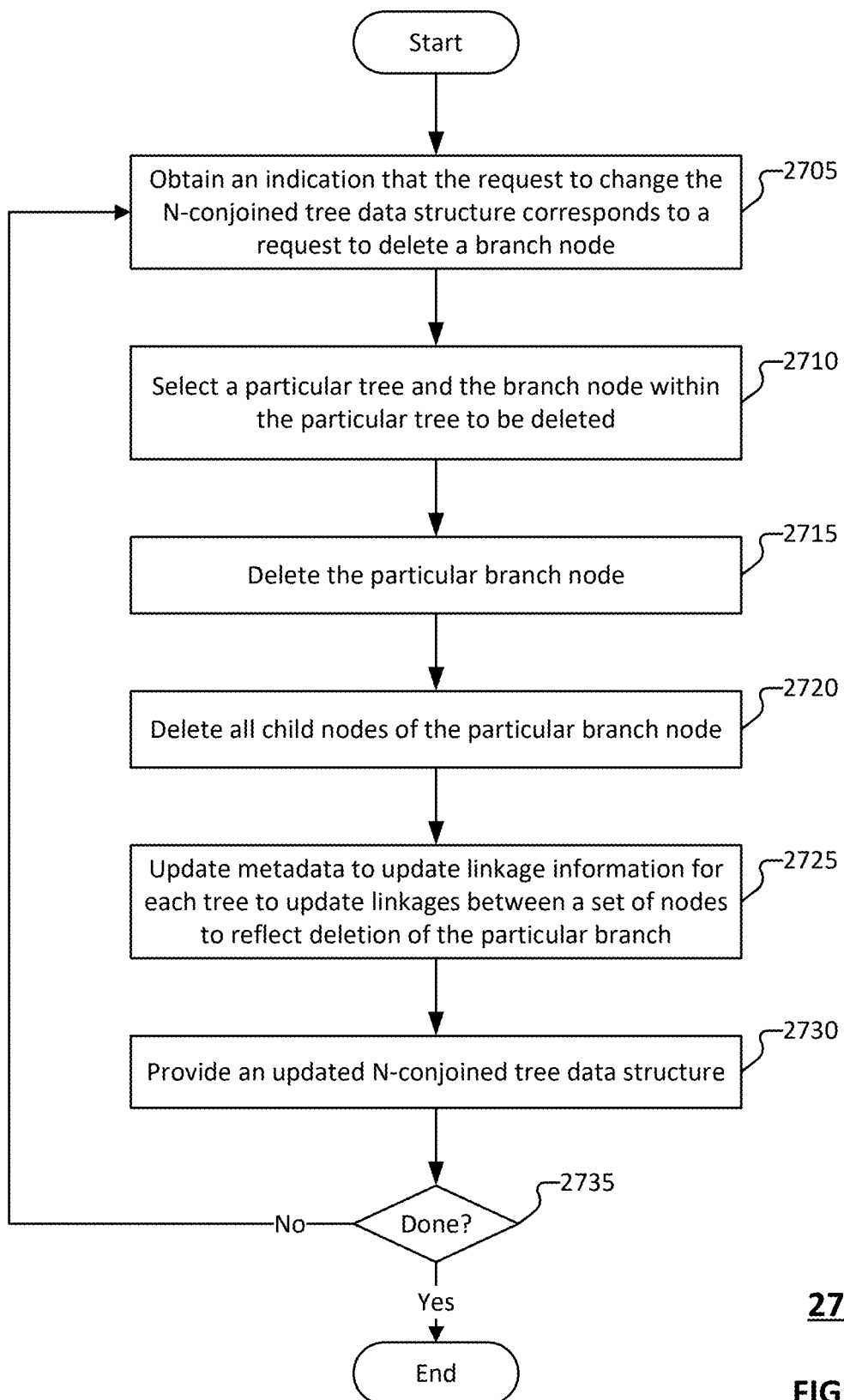
FIG. 27 is a flow diagram of a method for deleting a branch node to an N-conjoined tree data structure according to various embodiments of the present application.

FIG. 27 is a flow diagram of a method for deleting a branch node to an N-conjoined tree data structure according to various embodiments of the present application. In some embodiments, process 2700 is implemented at least in part by system 100 of FIG. 1 and/or system 200 of FIG. 2.

In some embodiments, process 2700 is invoked by 2415 of process 2400, such as in response to determining that the request to change the N-conjoined tree data structure comprises a request to delete a branch node(s).

At 2705, the system obtains an indication that the request to change the N-conjoined tree data structure corresponds to a request to delete a branch node.

At 2710, the system selects a particular tree and the branch node within the particular tree to be deleted. The system selects the particular tree and the branch node to be deleted based at least in part on the request to change the N-conjoined tree data structure. For example, the system determines the particular tree in which the particular branch node to be deleted is comprised.

At 2715, the system deletes the particular branch node.

At 2720, the system deletes all child nodes of the particular branch node. In some embodiments, the system determines all nodes having a dependency on the particular branch node and deletes such nodes from the N-conjoined tree data structure.

At 2725, the system updates metadata to update linkage information for each tree to update linkages between a set of nodes to reflect the deletion of the particular branch. For example, the system updates child and parent information to account for the deleted nodes.

At 2730, the system provides the updated N-conjoined tree data structure. In some embodiments, the system provides the updated N-conjoined tree data structure to the system, service, or other process that invoked process 2700. For example, the system returns the updated N-conjoined tree data structure to process 2400 of FIG. 24.

At 2735, a determination is made as to whether process 2700 is complete. In some embodiments, process 2700 is determined to be complete in response to a determination that no further data structures are to be updated to represent the data based on a manipulation of the data or a request to change the data in the N-conjoined tree data structure, no further change requests are obtained, no further requests for manipulating or representing the data are received, the updated N-conjoined tree data structure(s) has been generated and provided, a user has exited the system, an administrator indicates that process 2700 is to be paused or stopped, etc. In response to a determination that process 2700 is complete, process 2700 ends. In response to a determination that process 2700 is not complete, process 2700 returns to 2705.

Figure 28:
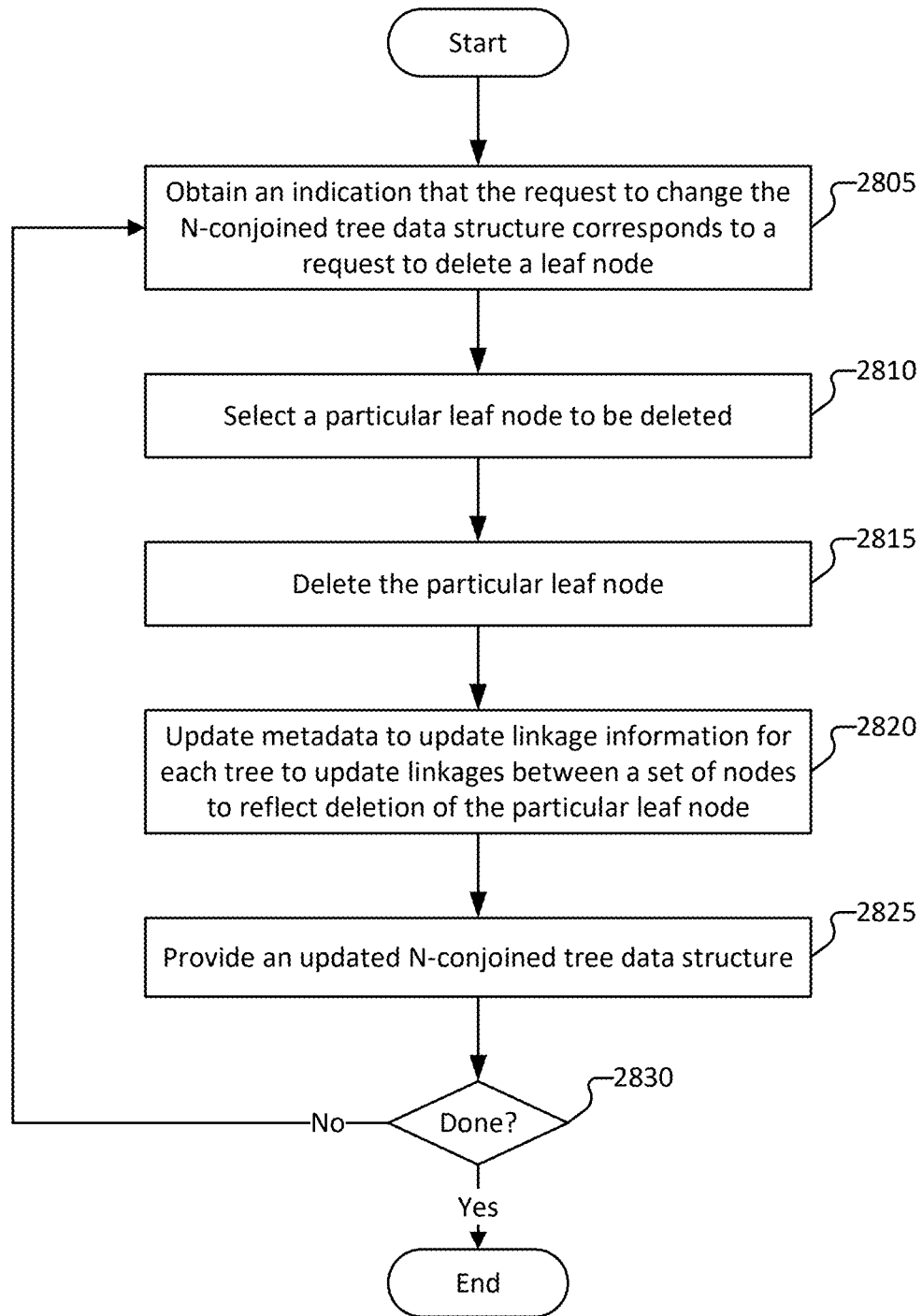
FIG. 28 is a flow diagram of a method for deleting a leaf node to an N-conjoined tree data structure according to various embodiments of the present application.

FIG. 28 is a flow diagram of a method for deleting a leaf node to an N-conjoined tree data structure according to various embodiments of the present application. In some embodiments, process 2800 is implemented at least in part by system 100 of FIG. 1 and/or system 200 of FIG. 2.

In some embodiments, process 2800 is invoked by 2415 of process 2400, such as in response to determining that the request to change the N-conjoined tree data structure comprises a request to add a new leaf node.

At 2805, the system obtains an indication that the request to change the N-conjoined tree data structure corresponds to (or comprises) a request to delete a leaf node(s).

At 2810, the system selects a particular leaf node(s) to be deleted. The system determines the particular leaf node(s) based on the request to change the N-conjoined tree data structure.

At 2815, the system deletes the particular leaf node(s). The system deletes the particular leaf node(s) from the N-conjoined tree data structure to generate an updated N-conjoined tree data structure.

At 2820, the system updates metadata to update linkage information for each tree to update linkages between a set of nodes to reflect deletion of the particular leaf node(s). For example, the system updates child and parent information (e.g., for each tree in the N-conjoined tree data structure) to account for the deleted particular leaf node(s).

At 2825, the system provides the updated N-conjoined tree data structure. In some embodiments, the system provides the updated N-conjoined tree data structure to the system, service, or other process that invoked process 2800. For example, the system returns the updated N-conjoined tree data structure to process 2400 of FIG. 24.

At 2830, a determination is made as to whether process 2800 is complete. In some embodiments, process 2800 is determined to be complete in response to a determination that no further data structures are to be updated to represent the data based on a manipulation of the data or a request to change the data in the N-conjoined tree data structure, no further requests for manipulating or representing the data are received, the updated N-conjoined tree data structure(s) has been generated and provided, a user has exited the system, an administrator indicates that process 2800 is to be paused or stopped, etc. In response to a determination that process 2800 is complete, process 2800 ends. In response to a determination that process 2800 is not complete, process 2800 returns to 2805.

Figure 29:
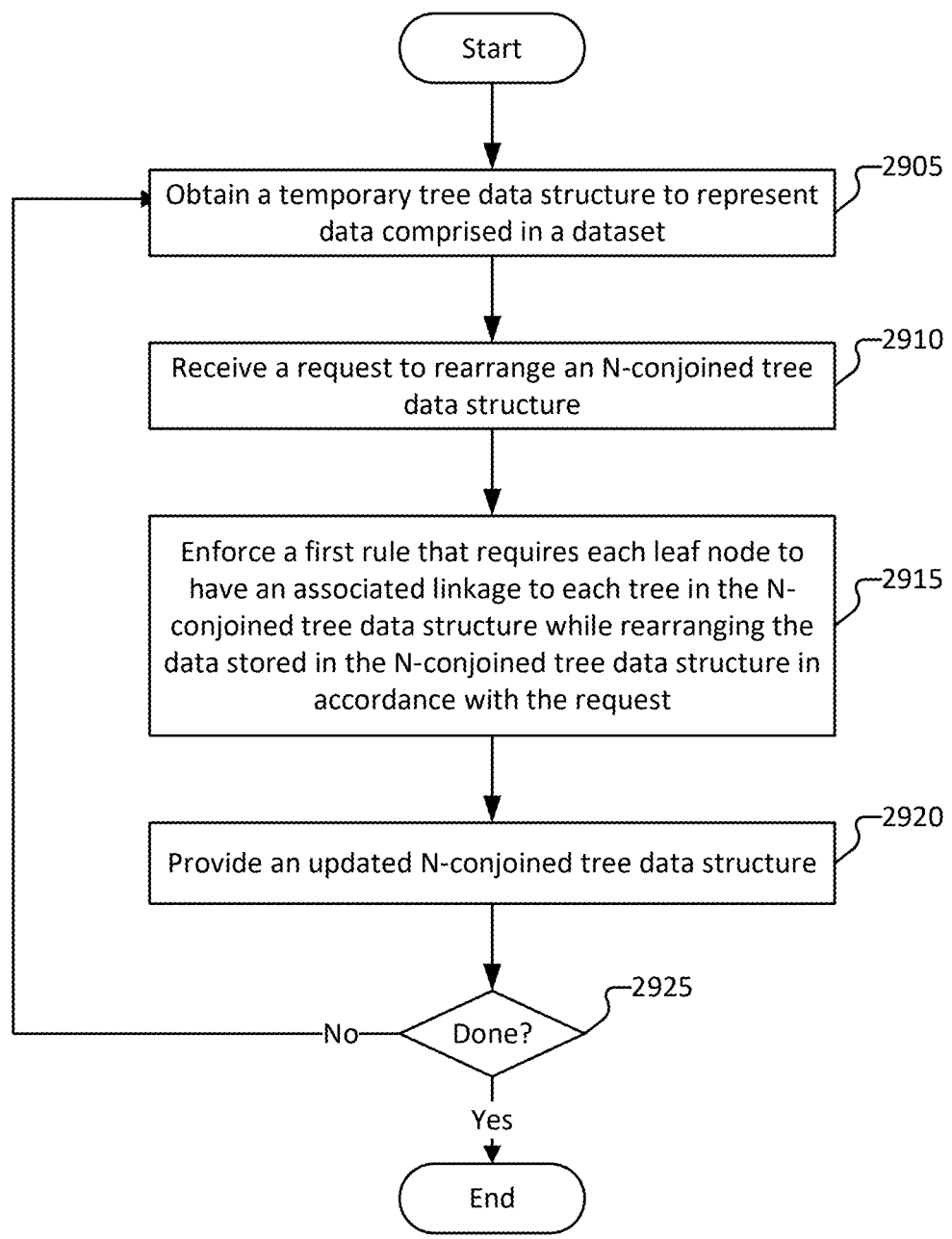
FIG. 29 is a flow diagram of a method for modifying or restructuring data in a data structure for manipulation or representation of the data in a dataset according to various embodiments of the present application.

FIG. 29 is a flow diagram of a method for modifying or restructuring data in a data structure for manipulation or representation of the data in a dataset according to various embodiments of the present application. In some embodiments, process 2900 is implemented at least in part by system 100 of FIG. 1 and/or system 200 of FIG. 2. The process of FIG. 29 addresses adding, deleting, sorting, and filtering. The process does not address inserting.

At 2905, the system obtains a tree data structure to represent the data comprised in a dataset. The tree data structure can correspond to an N-conjoined tree data structure, such as a tree data structure similar to data structure 400 of FIG. 4. For example, the system obtains the N-conjoined tree data structure that is provided at 1925 of process 1900.

At 2910, the system obtains a request to rearrange an N-conjoined tree data structure. The request to rearrange the N-conjoined tree data structure can correspond to a request to perform a sort, filter, or other similar operation with respect to the N-conjoined tree data structure. As an example, the system obtains a request to sort a set of branch nodes (e.g., branch nodes having a same branch level in the hierarchy for the particular tree) in a particular tree in the N-conjoined tree data structure and/or to sort leaf nodes in the N-conjoined tree data structure along at least one dimension of the N-conjoined tree data structure (e.g., a dimension corresponding to a branch in a particular tree, etc.). As another example, the system obtains a request to filter one or more nodes from the N-conjoined tree data structure (e.g., one or more specific leaf nodes, a set of leaf nodes along a particular dimension of the N-conjoined tree data structure, etc.)

The system can obtain a request to rearrange an N-conjoined tree data structure based at least in part on a request received by user interface in connection with a manipulation or rearrangement of the data stored in the N-conjoined tree data structure (or to a user interface providing a table generated based on the N-conjoined tree data structure.

At 2915, the system enforces a first rule that requires each leaf node in the N-conjoined tree data structure to have an associated linkage to each tree in the N-conjoined tree data structure while rearranging the data stored in the N-conjoined tree data structure in accordance with the request.

At 2920, the system provides an updated N-conjoined tree data structure. The updated N-conjoined tree data structure reflects the rearrangement made to the N-conjoined tree data structure in accordance with the received request. In some embodiments, the updated N-conjoined tree data structure is provided in connection with generating a representation of the data in the dataset, such as in the form of a table or other visualization to be presented on a user interface. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 2925, a determination is made as to whether process 2900 is complete. In some embodiments, process 2900 is determined to be complete in response to a determination that no further data structures are to be updated to represent the data based on a manipulation of the data or a request to rearrange the data in the N-conjoined tree data structure, no further requests for manipulating or representing the data are received, the updated N-conjoined tree data structure(s) has been generated and provided, a user has exited the system, an administrator indicates that process 2900 is to be paused or stopped, etc. In response to a determination that process 2900 is complete, process 2900 ends. In response to a determination that process 2900 is not complete, process 2900 returns to 2905.

Figure 30:
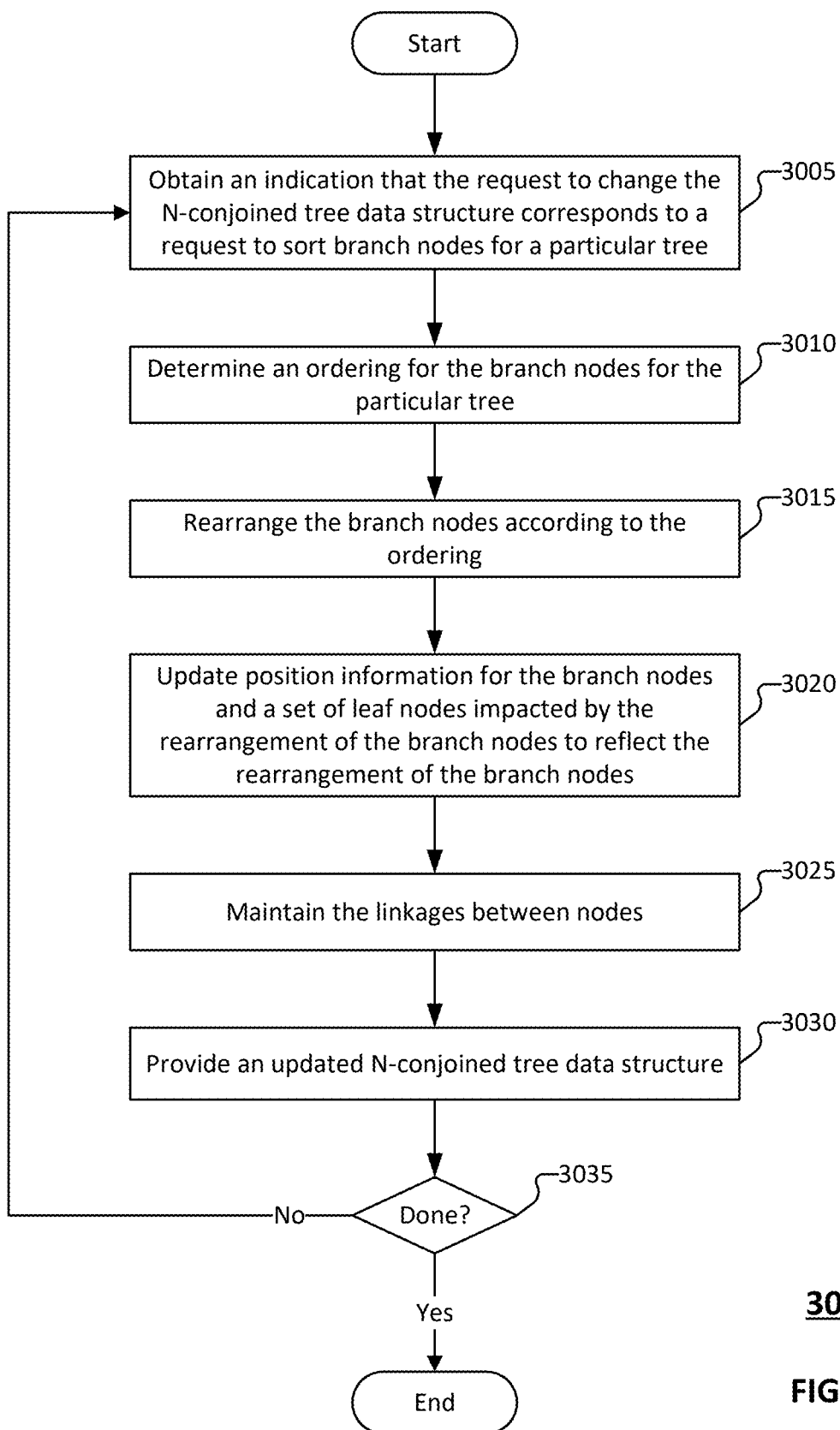
FIG. 30 is a flow diagram of a method for sorting a set of branch nodes in a particular tree in an N-conjoined tree data structure according to various embodiments of the present application.

FIG. 30 is a flow diagram of a method for sorting a set of branch nodes in a particular tree in an N-conjoined tree data structure according to various embodiments of the present application. In some embodiments, process 3000 is implemented at least in part by system 100 of FIG. 1 and/or system 200 of FIG. 2.

In some embodiments, process 3000 is invoked by 2915 of process 2900, such as in response to determining that the request to reorder the N-conjoined tree data structure comprises a request to sort a set of branch nodes.

At 3005, the system obtains an indication that the request to change the N-conjoined tree data structure corresponds to a request to sort branch nodes for a particular tree. In some embodiments, the branch nodes subject to the sortation request are branch nodes within a same branch-level of the hierarchy for the particular tree.

At 3010, the system determines an ordering for the branch nodes for the particular tree. The ordering is determined based on the requested sortation (e.g., highest to lowest values, lowest to highest values, alphabetical, some other desired sort, etc.).

At 3015, the system rearranges the branch nodes according to the ordering.

At 3020, the system updates position information for the branch nodes and a set of leaf nodes impacted by the rearrangement of the branch nodes to reflect the rearrangement of the branch nodes. For example, position information or order is stored by storing tree nodes as an ordered list data structure in the system (e.g., no explicit position/order information is store in the tree node). In some embodiments, the system stores the position information to enable the generation of a representation of the data (e.g., a visualization) in a manner that the data is represented according to the requested rearrangement (e.g., to reflect the requested sorting of branch nodes).

At 3025, the system maintains linkages between nodes. The system maintains the child-parent relationships in each tree of the N-conjoined tree data structure through the rearrangement operation such that any two adjacent nodes in the N-conjoined tree data structure have a same parent-child relationship/linkage before and after the rearrangement operation.

At 3030, the system provides an updated N-conjoined tree data structure. The updated N-conjoined tree data structure reflects the rearrangement of the N-conjoined tree data structure (e.g., the sorting of the leaf nodes along a dimension(s)) in accordance with the received request. In some embodiments, the updated N-conjoined tree data structure is provided in connection with generating a representation of the data in the dataset, such as in the form of a table or other visualization to be presented on a user interface. The data is represented to order the nodes in accordance with the requested sortation of leaves in the leaf nodes. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 3035, a determination is made as to whether process 3000 is complete. In some embodiments, process 3000 is determined to be complete in response to a determination that no further data structures are to be updated to represent the data based on a manipulation of the data or a request to rearrange the data in the N-conjoined tree data structure, no further requests for manipulating or representing the data are received, the updated N-conjoined tree data structure(s) has been generated and provided, a user has exited the system, an administrator indicates that process 3000 is to be paused or stopped, etc. In response to a determination that process 3000 is complete, process 3000 ends. In response to a determination that process 3000 is not complete, process 3000 returns to 3005.

Figure 31:
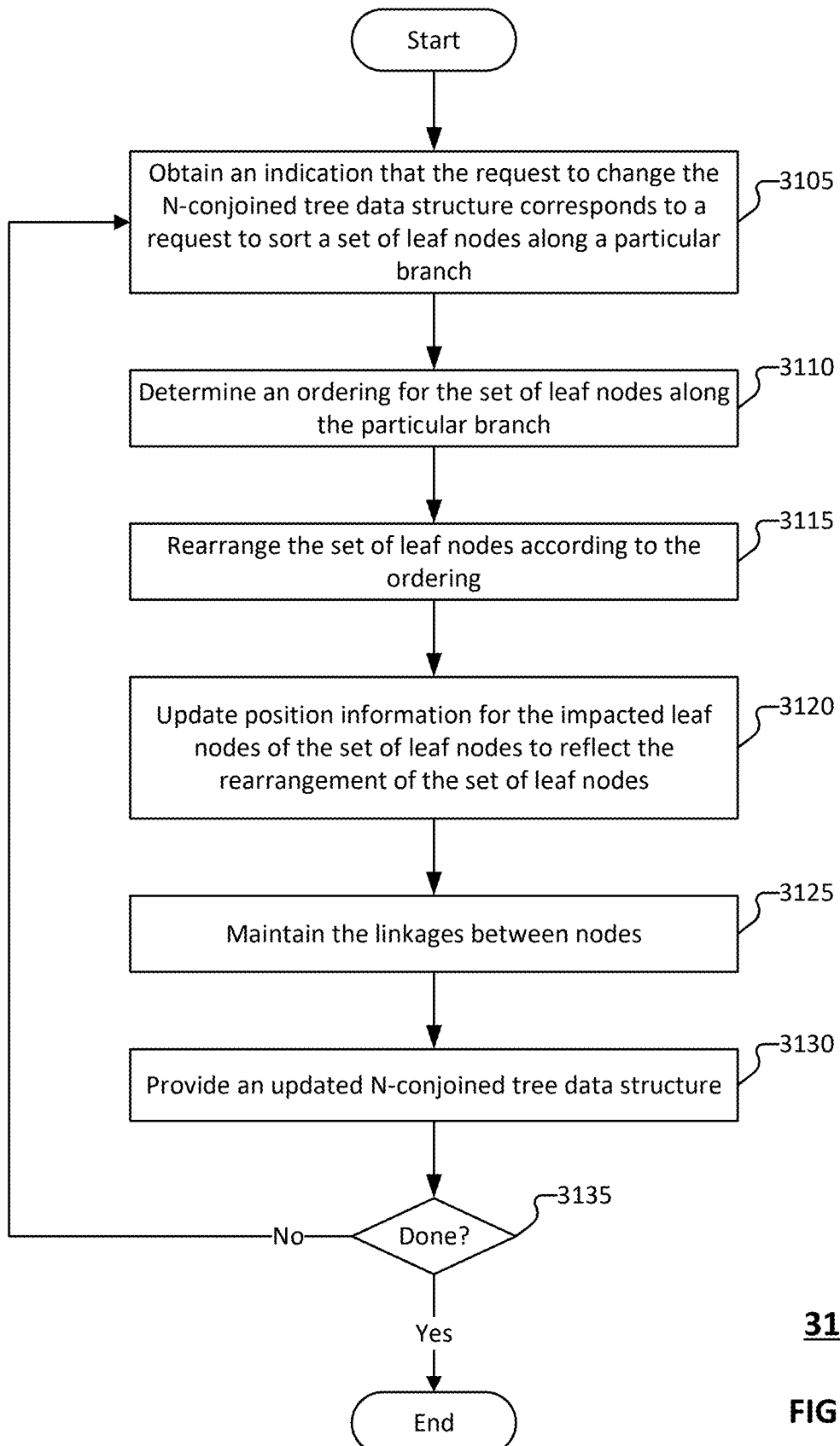
FIG. 31 is a flow diagram of a method for sorting a set of leaf nodes along a particular branch in a particular tree in an N-conjoined tree data structure according to various embodiments of the present application.

FIG. 31 is a flow diagram of a method for sorting a set of leaf nodes along a particular branch in a particular tree in an N-conjoined tree data structure according to various embodiments of the present application. In some embodiments, process 3100 is implemented at least in part by system 100 of FIG. 1 and/or system 200 of FIG. 2.

In some embodiments, process 3100 is invoked by 2915 of process 2900, such as in response to determining that the request to rearrange the N-conjoined tree data structure comprises a request to sort a set of leaf nodes along a particular dimension of the N-conjoined tree data structure (e.g., along a particular branch).

At 3105, the system obtains an indication that the request to change the N-conjoined tree data structure corresponds to a request to sort a set of leaf nodes along a particular branch (e.g., a particular dimension of the N-conjoined tree data structure).

At 3110, the system determines an ordering for the set of leaf nodes along the particular branch.

At 3115, the system rearranges the set of leaf nodes according to the ordering.

At 3120, the system updates position information for the impacted leaf nodes of the set of leaf nodes to reflect the rearrangement of the set of leaf nodes.

At 3125, the system maintains linkages between nodes. For example, the system maintains the sibling relationships for the leaf nodes in the N-conjoined tree data structure. The linkages for the leaf nodes are maintained throughout the rearrangement operation.

At 3130, the system provides an updated N-conjoined tree data structure. The updated N-conjoined tree data structure reflects the rearrangement of the N-conjoined tree data structure (e.g., the sorting of the branch nodes) in accordance with the received request. In some embodiments, the updated N-conjoined tree data structure is provided in connection with generating a representation of the data in the dataset, such as in the form of a table or other visualization to be presented on a user interface. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 3135, a determination is made as to whether process 3100 is complete. In some embodiments, process 3100 is determined to be complete in response to a determination that no further data structures are to be updated to represent the data based on a manipulation of the data or a request to rearrange the data in the N-conjoined tree data structure, no further requests for manipulating or representing the data are received, the updated N-conjoined tree data structure(s) has been generated and provided, a user has exited the system, an administrator indicates that process 3100 is to be paused or stopped, etc. In response to a determination that process 3100 is complete, process 3100 ends. In response to a determination that process 3100 is not complete, process 3100 returns to 3105.

Figure 32:
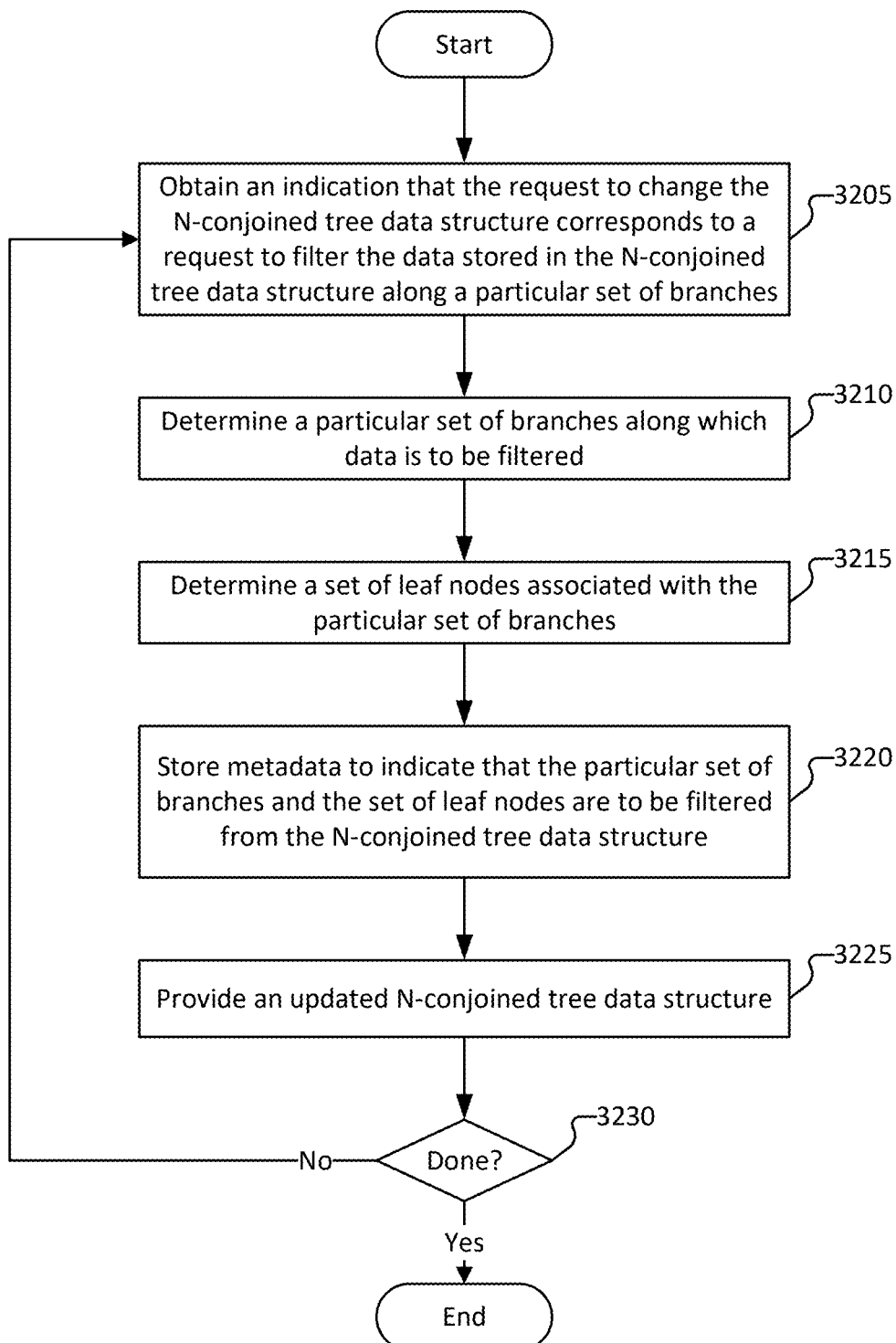
FIG. 32 is a flow diagram of a method for filtering along a set of branch data stored in a data structure according to various embodiments of the present application.

FIG. 32 is a flow diagram of a method for filtering along a set of branch data stored in a data structure according to various embodiments of the present application. In some embodiments, process 3200 is implemented at least in part by system 100 of FIG. 1 and/or system 200 of FIG. 2.

In some embodiments, process 3200 is invoked by 2915 of process 2900, such as in response to determining that the request to rearrange the N-conjoined tree data structure comprises a request to sort a set of branch nodes.

At 3205, the system obtains an indication that the request to change the N-conjoined tree data structure corresponds to a request to filter the data stored in the N-conjoined tree data structure along a particular set of branches (e.g., one or more branches, which may be in different trees of the N-trees).

At 3210, the system determines a particular set of branches along which the data is to be filtered. The system determines the particular set of branches along which the data is to be filtered based at least in part on the request to filter the N-conjoined tree data structure.

At 3215, the system determines a set of leaf nodes associated with the particular set of branches. The set of leaf nodes associated with the particular set of branches corresponds to the descendants for each of the set of branches. For example, for each of the set of branches, the system determines a corresponding set of leaf nodes that are descendants of the particular branch.

At 3220, the system stores metadata to indicate that the particular set of branches and the set of leaf nodes are to be filtered from the N-conjoined tree data structure. For example, the system stores the metadata (e.g., sets a flag) to indicate that the set of leaf nodes is to be excluded from search, retrieval, traversal, and deletion operations.

At 3225, the system provides an updated N-conjoined tree data structure. The updated N-conjoined tree data structure reflects the marking (e.g., a tree node is visible or invisible) of the N-conjoined tree data structure (e.g., the filtering of a set of branches) in accordance with the received request. In some embodiments, the updated N-conjoined tree data structure is provided in connection with generating a representation of the data in the dataset, such as in the form of a table or other visualization to be presented on a user interface. The data is represented to exclude the branches and/or leaf nodes that were filtered out during the rearrangement of the N-conjoined tree data structure. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 3230, a determination is made as to whether process 3200 is complete. In some embodiments, process 3200 is determined to be complete in response to a determination that no further data structures are to be updated to represent the data based on a manipulation of the data or a request to rearrange the data in the N-conjoined tree data structure, no further requests for manipulating or representing the data are received, the updated N-conjoined tree data structure(s) has been generated and provided, a user has exited the system, an administrator indicates that process 3200 is to be paused or stopped, etc. In response to a determination that process 3200 is complete, process 3200 ends. In response to a determination that process 3200 is not complete, process 3200 returns to 3205.

Figure 33:
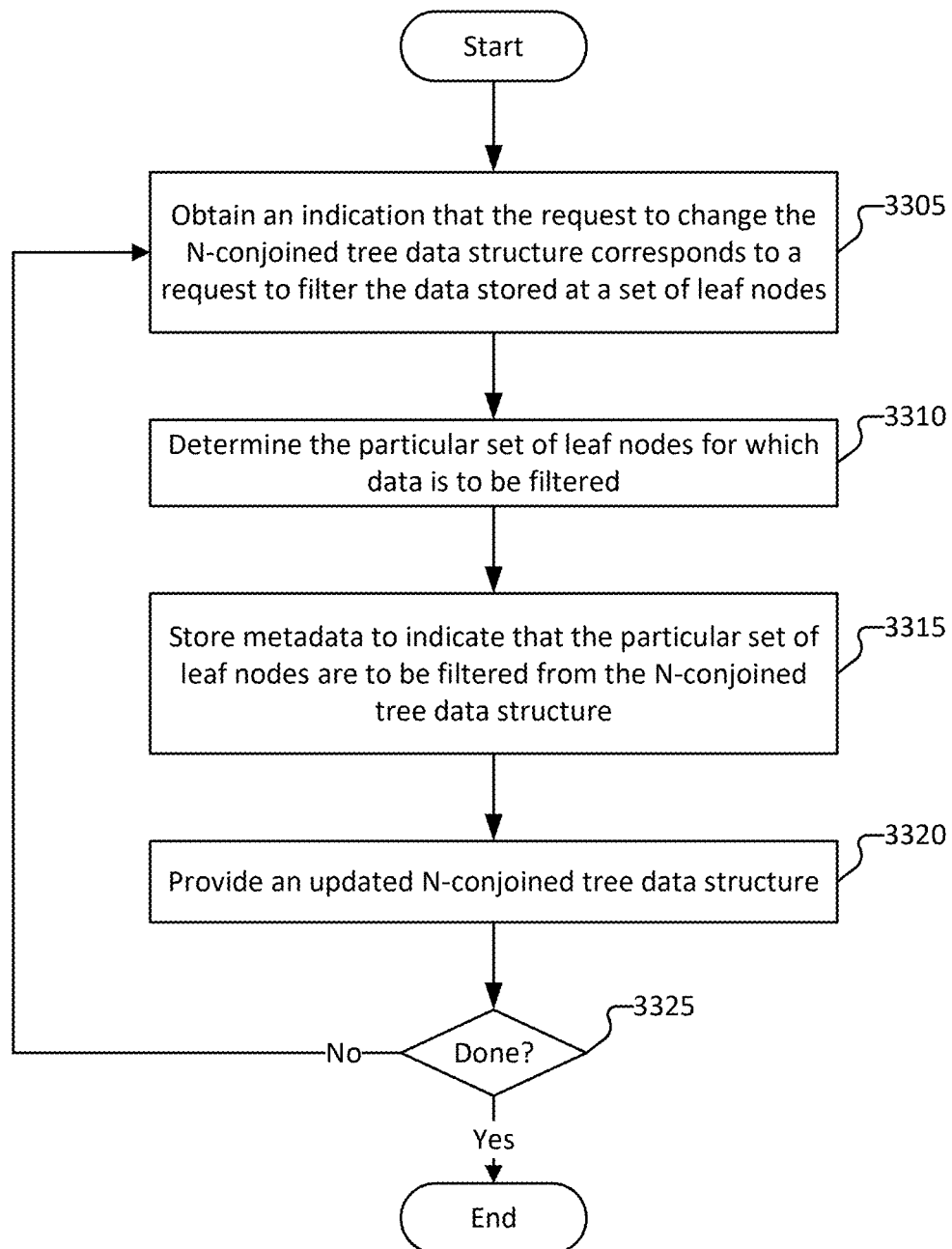
FIG. 33 is a flow diagram of a method for filtering data stored at a set of leaf nodes in a data structure according to various embodiments of the present application.

FIG. 33 is a flow diagram of a method for filtering data stored at a set of leaf nodes in a data structure according to various embodiments of the present application. In some embodiments, process 3300 is implemented at least in part by system 100 of FIG. 1 and/or system 200 of FIG. 2.

At 3305, the system obtains an indication that the request to change the N-conjoined tree data structure corresponds to (e.g., comprises) a request to filter the data stored at a set of leaf nodes.

At 3310, the system determines the particular set of leaf nodes for which data is to be filtered. The particular set of leaf nodes is determined based on the filtering request, such as the logic in the filter query.

At 3315, the system stores metadata to indicate that the particular set of leaf nodes is to be filtered from the N-conjoined tree data structure. For example, the system stores the metadata (e.g., sets a flag) to indicate that the set of leaf nodes is to be excluded from search, retrieval, traversal, and deletion operations.

At 3320, the system provides an updated N-conjoined tree data structure. The updated N-conjoined tree data structure reflects the rearrangement of the N-conjoined tree data structure (e.g., the filtering of a set of leaf nodes) in accordance with the received request. In some embodiments, the updated N-conjoined tree data structure is provided in connection with generating a representation of the data in the dataset, such as in the form of a table or other visualization to be presented on a user interface. The data is represented to exclude the leaf nodes that were filtered out during the rearrangement of the N-conjoined tree data structure. The interface via which the representation is provided may enable a user or other system to request a further manipulation of the data, and in response to a request to further manipulate the data (e.g., add/delete data, filter data, sort data, etc.), the system uses the updated N-conjoined tree data structure to manipulate the data and generate an updated representation of the data.

At 3325, a determination is made as to whether process 3300 is complete. In some embodiments, process 3300 is determined to be complete in response to a determination that no further data structures are to be updated to represent the data based on a manipulation of the data or a request to rearrange the data in the N-conjoined tree data structure, no further requests for manipulating or representing the data are received, the updated N-conjoined tree data structure(s) has been generated and provided, a user has exited the system, an administrator indicates that process 3300 is to be paused or stopped, etc. In response to a determination that process 3300 is complete, process 3300 ends. In response to a determination that process 3300 is not complete, process 3300 returns to 3305.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
  obtain a tree data structure to represent data comprised in a dataset, wherein the tree data structure is an N-conjoined tree data structure, and N is a positive integer;
  receive a request to rearrange the data stored in the N-conjoined tree data structure;
  enforce a first rule that requires each leaf node to have an associated linkage to each tree in the N-conjoined tree data structure while rearranging the data stored in the N-conjoined tree data structure in accordance with the request; and
  provide a rearranged N-conjoined tree data structure; and a memory coupled to the one or more processors and configured to provide the one or more processors with instructions.

2. The system of claim 1, wherein the request to rearrange the data comprises a sort query to sort branch nodes in a particular tree of the N-conjoined tree data structure.

3. The system of claim 2, wherein rearranging the data stored in the N-conjoined tree data structure comprises:
rearranging the branch nodes in the particular tree according to the sort query; and
updating position information for a set of leaf nodes in the N-conjoined tree data structure based on rearrangement of the branch nodes in the particular tree, the position information being updated without linkages for the set of leaf nodes being updated.

4. The system of claim 3, wherein the linkages for the set of leaf nodes is maintained through rearrangement of the branch nodes so that a traversal through a particular tree in an updated N-conjoined tree data structure is the same as a traversal through the particular tree in the N-conjoined tree data structure.

5. The system of claim 1, wherein the request to rearrange the data comprises a sort query to sort leaf nodes for a particular branch in a particular tree of the N-conjoined tree data structure.

6. The system of claim 5, wherein rearranging the data stored in the N-conjoined tree data structure comprises:
rearranging a set of leaf nodes that are children of the particular branch in the particular tree according to the sort query; and
updating position information for the set of leaf nodes in the N-conjoined tree data structure based on rearrangement of the set of leaf nodes along a dimension defined by the particular branch, the position information being updated without linkages for the set of leaf nodes being updated.

7. The system of claim 6, wherein updating the position information for the set of leaf nodes without updating the linkages for the set of leaf nodes comprises:
updating parent-child linkage information for the set of leaf nodes with respect to the particular tree in which the particular branch is comprised; and
maintaining linkages for the set of leaf nodes with respect to other trees in the N-conjoined tree data structure.

8. The system of claim 1, wherein the request to rearrange the data comprises a filter request to filter the data stored in the N-conjoined tree data structure along a particular set of branches.

9. The system of claim 8, wherein rearranging the data stored in the N-conjoined tree data structure comprises:
determining the particular set of branches along which data is to be filtered based at least in part on the filter request;
determining a set of leaf nodes associated with the particular set of branches along which the data is to be filtered; and
storing metadata to indicate that the particular set of branches and the set of leaf nodes are to be filtered from the N-conjoined tree data structure.

10. The system of claim 9, wherein storing the metadata to indicate that the particular set of branches and the set of leaf nodes are to be filtered from the N-conjoined tree data structure comprises:
storing the metadata to indicate that the particular set of branches and the set of leaf nodes are to be excluded from search, retrieval, traversal, and deletion operations.

11. The system of claim 9, wherein the set of leaf nodes associated with the particular set of branches along which the data is to be filtered corresponds to leaf nodes that are descendants of the particular set of branches.

12. The system of claim 9, wherein providing a rearranged N-conjoined tree data structure comprises:
traversing the rearranged N-conjoined tree data structure in connection with manipulating or representing the data, wherein the traversing the rearranged N-conjoined tree data structure comprises scanning a set of nodes in the rearranged N-conjoined tree data structure, wherein the set of nodes excludes the particular set of branches and the set of leaf nodes are to be filtered from the N-conjoined tree data structure.

13. The system of claim 1, wherein the request to rearrange the data comprises a request to filter the data stored in the N-conjoined tree data structure along a particular set of leaf nodes.

14. The system of claim 12, wherein rearranging the data stored in the N-conjoined tree data structure comprises:
determining the particular set of leaf nodes for which data is to be filtered based at least in part on the filter request; and
storing metadata to indicate that the particular set of leaf nodes is to be filtered from the N-conjoined tree data structure.

15. The system of claim 12, wherein storing metadata to indicate that the particular set of leaf nodes is to be filtered from the N-conjoined tree data structure comprises:
storing the metadata to indicate that the particular set of leaf nodes is to be excluded from search, retrieval, traversal, and deletion operations.

16. The system of claim 13, wherein providing the rearranged N-conjoined tree data structure comprises:
traversing the rearranged N-conjoined tree data structure in connection with manipulating or representing data, wherein traversing the rearranged N-conjoined tree data structure comprises scanning a set of nodes in the rearranged N-conjoined tree data structure, wherein the set of nodes excludes the particular set of leaf nodes for which corresponding metadata indicates the particular set of leaf nodes is to be filtered from the N-conjoined tree data structure.

17. The system of claim 1, wherein the rearranged N-conjoined tree data structure is used to provide the data for generating a report or visualization of the data.

18. A method, comprising:
obtaining a tree data structure to represent data comprised in a dataset, wherein the tree data structure is an N-conjoined tree data structure, and N is a positive integer;
receiving a request to rearrange the data stored in the N-conjoined tree data structure;
enforcing a first rule that requires each leaf node to have an associated linkage to each tree in the N-conjoined tree data structure while rearranging the data stored in the N-conjoined tree data structure in accordance with the request; and
providing a rearranged N-conjoined tree data structure.

19. A computer program product embodied in a non-transitory computer readable medium and comprising computer instructions for:
obtaining a tree data structure to represent data comprised in a dataset, wherein the tree data structure is an N-conjoined tree data structure, and N is a positive integer;

receiving a request to rearrange the data stored in the N-conjoined tree data structure;

enforcing a first rule that requires each leaf node to have an associated linkage to each tree in the N-conjoined tree data structure while rearranging the data stored in the N-conjoined tree data structure in accordance with the request; and providing a rearranged N-conjoined tree data structure.

* * * * *